US011245510B2

(12) United States Patent
Cirik et al.

(10) Patent No.: US 11,245,510 B2
(45) Date of Patent: Feb. 8, 2022

(54) BEAM FAILURE RECOVERY PROCEDURE FOR BANDWIDTH PARTS

(71) Applicant: Ofinno, LLC, Reston, VA (US)

(72) Inventors: Ali Cagatay Cirik, Herndon, VA (US); Esmael Hejazi Dinan, McLean, VA (US); Yunjung Yi, Vienna, VA (US); Hua Zhou, Herndon, VA (US); Alireza Babaei, Fairfax, VA (US); Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 106 days.

(21) Appl. No.: 16/849,357

(22) Filed: Apr. 15, 2020

(65) Prior Publication Data
US 2020/0351066 A1     Nov. 5, 2020

Related U.S. Application Data

(60) Provisional application No. 62/842,273, filed on May 2, 2019.

(51) Int. Cl.
| | |
|---|---|
| *H04L 5/00* | (2006.01) |
| *H04B 7/06* | (2006.01) |
| *H04W 76/27* | (2018.01) |
| *H04W 80/02* | (2009.01) |

(52) U.S. Cl.
CPC ......... *H04L 5/0092* (2013.01); *H04B 7/0617* (2013.01); *H04B 7/0695* (2013.01); *H04W 76/27* (2018.02); *H04W 80/02* (2013.01)

(58) Field of Classification Search
CPC .... H04L 5/0092; H04W 76/27; H04W 80/02; H04B 7/0617; H04B 7/0695
See application file for complete search history.

(56) References Cited

U.S. PATENT DOCUMENTS

| | | | |
|---|---|---|---|
| 2019/0098655 A1* | 3/2019 | Shih | H04W 72/0413 |
| 2021/0058285 A1* | 2/2021 | Wu | H04B 7/0695 |

OTHER PUBLICATIONS

3GPP TS 38.1.33 V15.5.0 (Mar. 2019) Release 15.
3GPP TS 38.211 V15.5.0 (Mar. 2019); Technical Specification; 3rd Generation Partnership Project; Technical Specification Group Radio Access Network; NR; Physical channels and modulation; (Release 15).

(Continued)

*Primary Examiner* — Ricky Q Ngo
*Assistant Examiner* — Stephen N Steiner
(74) *Attorney, Agent, or Firm* — Jacob L. Mangan; Kavon Nasabzadeh; Philip R. Smith

(57) ABSTRACT

A wireless device receives one or more messages comprising one or more configuration parameters of a plurality of cells. The plurality of cells comprise: a first cell comprising a first bandwidth part (BWP); and a second cell comprising a second BWP and a third BWP. The first BWP and the second BWP are bundled. A beam failure recovery (BFR) procedure for the third BWP is initiated. A switch is made to the first BWP as an active BWP of the first cell during the BFR procedure. Based on the switching: the BFR procedure is aborted; and a switch is made to the second BWP as an active BWP of the second cell.

20 Claims, 25 Drawing Sheets

(56) References Cited

OTHER PUBLICATIONS

3GPP TS 38.212 V15.5.0 (Mar. 2019); Technical Specification; 3rd Generation Partnership Project; Technical Specification Group Radio Access Network; NR; Multiplexing and channel coding; (Release 15).
"3GPP TS 38.213 V15.5.0 (Mar. 2019); Technical Specification; 3rd Generation Partnership Project; Technical Specification Group Radio Access Network; NR;Physical layer procedures for control (Release 15); / /".
3GPP TS 38.214 V15.5.0 (Mar. 2019); Technical Specification; 3rd Generation Partnership Project; Technical Specification Group Radio Access Network; NR; Physical layer procedures for data; (Release 15).
3GPP TS 38.300 V15.5.0 (Mar. 2019); Technical Specification; 3rd Generation Partnership Project; Technical Specification Group Radio Access Network; NR; NR and NG-RAN Overall Description; Stage 2; (Release 15).
3GPP TS 38.321 V15.5.0 (Mar. 2019); Technical Specification; 3rd Generation Partnership Project; Technical Specification Group Radio Access Network; NR; Medium Access Control (MAC) protocol specification; (Release 15).
3GPP TS 38.331 V15.5.0 (Mar. 2019); Technical Specification; 3rd Generation Partnership Project; Technical Specification Group Radio Access Network; NR; Radio Resource Control (RRC) protocol specification; (Release 15).
"R1-1903971; 3GPP TSG RAN WG1 Meeting #96bis; Xi'an, China, Apr. 8-12, 2019; ; Agenda Item:7.2.8.3; Source:Huawei, HiSilicon; Title:Enhancements on multi-beam operation;".
"R1-1903974; 3GPP TSG RAN WG1 Meeting #96bis; Xi'an, China, Apr. 8-12, 2019; ; Agenda Item:7.2.8.6; Source:Huawei, HiSilicon; Title:UL/DL BM for latency/overhead reduction;".
"R1-1903977; 3GPP TSG RAN WG1 Meeting #96bis ; Xi'an, China, Apr. 8-12, 2019; ; Agenda Item:7.2.8.6; Source:Huawei, HiSilicon; Title:Beam failure recovery for SCell;".
"R1-1903978; 3GPP TSG RAN WG1 Meeting #96bis; Xi'an, China, Apr. 8-12, 2019; ; Agenda Item:7.2.8.6; Source:Huawei, HiSilicon; Title:Evaluation results of multi-beam operation;".
"R1-1903986; 3GPP TSG RAN WG1 Meeting #96bis; Xi'an, China, Apr. 8-12, 2019; ; Agenda Item:7.2.8.6; Source:Huawei, HiSilicon; Title:Evaluation methodology for multi-beam enhancements;".
"R1-1904014 Enhancements on Multi-beam Operation; 3GPP TSG RAN WG1 Meeting #96bis; Xi'an, China, Apr. 8-12, 2019; Source:ZTE; Title: Enhancements on multi-beam operation; Agenda Item: 7.2.8.3; Document for: Discussion and Decision;".
"R1-1904021 Considerations on beam management for multi-TRP; 3GPP TSG RAN WG1 #96bis; Xi'an, China, Apr. 8-12, 2019; ; Source: ZTE; Title:Considerations on beam management for multi-TRP; Agenda Item:7.2.8.6;".
"R1-1904022 Details of latency and overhead reduction for beam; 3GPP TSG RAN WG1 #96bis; Xi'an, China, Apr. 8-12, 2019; ; Source: ZTE; Title: Details of latency and overhead reduction for beam management; Agenda item: 7.2.8.6; ".
"R1-1904038; 3GPP TSG RAN WG1 #96bis; Xi'an, China, Apr. 8-12, 2019; ; Source:OPPO; Title:Discussion on Multi-beam Operation Enhancements; Agenda Item:7.2.8.3;".
"R1-1904097_Further discussion on multi-beam operation; 3GPP TSG RAN WG1 #96bis; Xi'an, China, Apr. 8-12, 2019; ; Source:vivo; Title:Further discussion on Multi-Beam Operation; Agenda Item:7.2.8.3;".
"R1-1904191_Panasonic_NR_MIMO_multi_beam_enhancements_vfinal; 3GPP TSG RAN WG1 #96bis; Xi'an, China, Apr. 8-12, 2019; ; Source:Panasonic; Title: On enhancements for multi-beam operations for NR MIMO in Rel. 16; Agenda Item: 7.2.8.3;".
"R1-1904191 Multi-beam final; 3GPP TSG TN WG1 Meeting #96bis; Xi'an, China, Apr. 8-12, 2019; Agenda item: 7.2.8.3; Source: LG Electronics; Title: Discussion on multi-beam based operations and enhancements; Document for: Discussion and Decision;".
"R1-1904217-UE_multi_beam_final; 3GPP TSG RAN WG1 Meeting #96-Bis; Xi'an, China Apr. 8-12, 2019; ; Agenda Item: 7.2.8.3—Enhancements on Multi-beam Operation; Source: Fraunhofer IIS, Fraunhofer HHI; Title:Enhancements on UE multi-beam operation;".
"R1-1904241 Enhancements on multi-beam operation; 3GPP TSG RAN WG1 #96bis; Xi'an, China, Apr. 8-12, 2019; ; Agenda Item:7.2.8.3; Source:Sony; Title:Enhancements on multi-beam operation;".
"R1-1904314 On Beam Management Enhancement; 3GPP TSG RAN WG1 Meeting #96bis; Xi'an, China, Apr. 8-12, 2019; ; Source: Intel Corporation; Title:On Beam Management Enhancement; Agenda Item:7.2.8.3;".
"R1-1904450 R16 Multi-Beam; 3GPP TSG RAN WG1 96bis; Xi'an, China, Apr. 12-16, 2019; ; Agenda item:7.2.8.3; Source: Samsung; Title: Enhancements on multi-beam operations;".
"R1-1904476 multi-beam operation_final; 3GPP TSG RAN WG1 #96bis; Xi'an, China, Apr. 8-12, 2019; ; Agenda Item: 7.2.8.3; Source: MediaTek Inc.; Title:Enhancements on multi-beam operations;".
"R1-1904562; 3GPP TSG RAN WG1 #96bis; Xi'an, China, Apr. 8-12, 2019; ; Source:CATT; Title:Consideration on multi-beam operation enhancement; Agenda Item:7.2.8.3;".
"R1-1904573_multi_beam_final; 3GPP TSG RAN WG1 #96bisR1-19004573 Xi'an, China, Apr. 8-12, 2019; ; Agenda Item:7.2.8.3; Source:Lenovo, Motorola Mobility; Title:Discussion of multi-beam operation;".
"R1-1904598 Enhancements on multi-beam operation; 3GPP TSG RAN WG1 Meeting #96bis; Xi'an, China, Apr. 8-12, 2019; ; Source:Fujitsu; Title:Enhancements on multi-beam operation; Agenda Item:7.2.8.3;".
"R1-1904664 Discussion on multi-beam operation; 3GPP TSG RAN WG1 #96bis; Xi'an, China, Apr. 8-12, 2019; ; Agenda item:7.2.8.3; Source:NEC; Title:Discussion on multi-beam operation;".
"R1-1904736; 3GPP TSG RAN WG1 #96bis ; Xi'an, China, Apr. 8-12, 2019; Agenda item:7.2.8.3; Source: CMCC; Title: Enhancements on multi-beam operation; Document for:Discussion and Decision;".
"R1-1904781_Discussion on multi-beam operation-final; 3GPP TSG RAN WG1 #96bis; Xi'an, China, Apr. 8-12, 2019; Agenda Item: 7.2.8.3; Source:Spreadtrum Communications; Title:Discussion on multi-beam operation; Document for:Discussion and decision;".
"R1-1904840_On_Beam_Failure_Recovery_for_SCell; 3GPP TSG-RAN WG1 #96bis; Xi'an, China, Apr. 8-12, 2019; ; Agenda item:7.2.8.3; Title:On Beam Failure Recovery for SCell; Source:Convida Wireless;".
"R1-1904861 MPUE and Panel Specific Uplink Transmission; 3GPP TSG RAN WG1 #96b; Xi'an, China, Apr. 8-12, 2019; ; Agenda Item:7.2.8.3; Source:InterDigital, Inc.; Title:MPUE and Panel Specific Uplink Transmission ;".
"R1-1904915; 3GPP TSG RAN WG1 #96bis; Xi'an, China, Apr. 8-12, 2019; ; Agenda item:7.2.8.3; Source:China Telecom; Title:Enhancements on multi-beam operation;".
"R1-1904967; 3GPP TSG RAN WG1 #96bis ; Xi'an, China, Apr. 8-12, 2019; ; Source:NTT DOCOMO, Inc.; Title:Discussion on multi-beam enhancement ; Agenda Item:7.2.8.3;".
"R1-1905027 Enhancements on Multi-beam Operation; 3GPP TSG-RAN WG1 Meeting #96-Bis; Xi'an, China, Apr. 8-12, 2019; ; ; Agenda item:7.2.8.3; Source: Qualcomm Incorporated;".
"R1-1905065; 3GPP TSG RAN WG1 #96bis Meeting; Xi'an, China, Apr. 8-12, 2019; ; Agenda item:7.2.8.3; Source:Nokia, Nokia Shanghai Bell; Title: Enhancements on Multi-beam Operation;".
"R1-1905073 Enhancements on Multi-beam Operations; 3GPP TSG-RAN WG1 Meeting #96-Bis; Xi'an, China, Apr. 8-12, 2019; ; Source: Asia Pacific Telecom; Title: Enhancements on Multi-beam Operations Agenda item:7.2.8.3;".
"R1-1905075 beam; 3GPP TSG RAN WG1 #96bis ; Xi'an, China, Apr. 8-12, 2019 ; ; Agenda Item:7.2.8.3; Source:Xiaomi ; Title: Enhancements on beam management;".

(56) References Cited

OTHER PUBLICATIONS

"R1-1905156 Enhancements to multi-beam operation; 3GPP TSG-RAN WG1 Meeting #96bisTdoc ; Xi'an, China, Apr. 8-12, 2019; ; Agenda Item:7.2.8.3; Source:Ericsson; Title:Enhancements to multi-beam operation;".

"R1-1905159 Latency analysis of SCell BFR solutions; 3GPP TSG-RAN WG1 Meeting #96bisTdoc ; Xi'an, China, Apr. 8-12, 2019; ; Agenda Item:7.2.8.6; Source:Ericsson; Title:Latency analysis of SCell BFR solutions;".

"R1-1905821 Summary On SCell BFR and L1-SINR_v6 (002); 3GPP TSG RAN WG1 Meeting #96bR1-1905821 Xi'an, China, Apr. 8-12, 2019; ; Source: Intel Corporation; Title:Summary 2 on SCell BFR and L1-SINR; Agenda item:7.2.8.3; ".

* cited by examiner

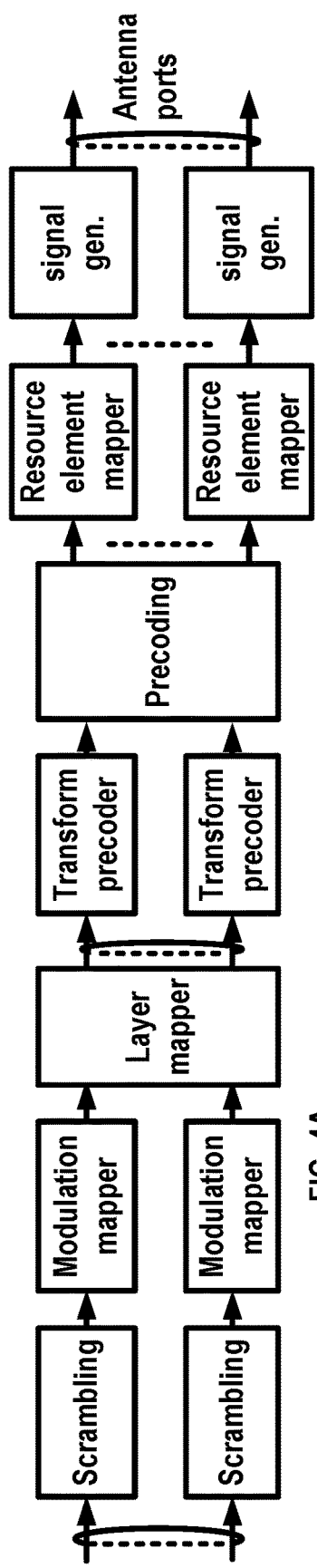
FIG. 4A
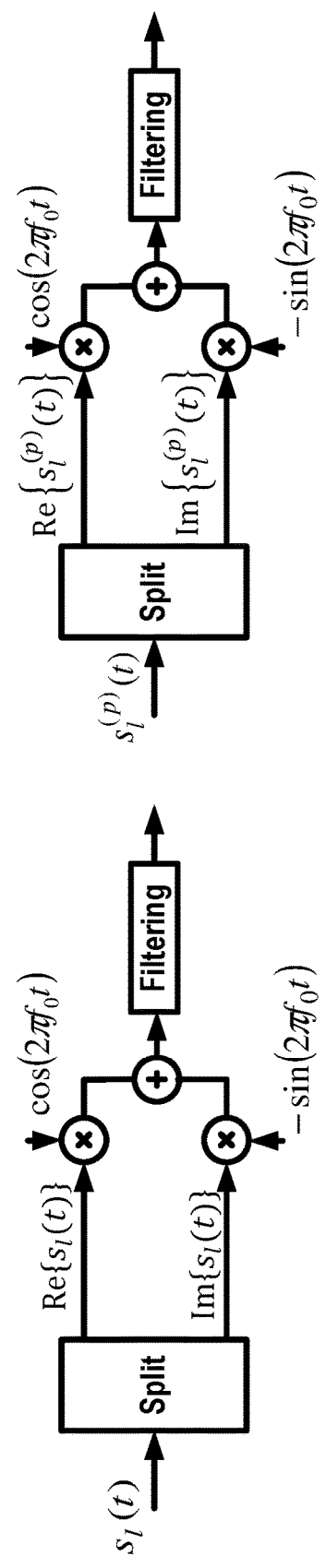
FIG. 4B
FIG. 4D
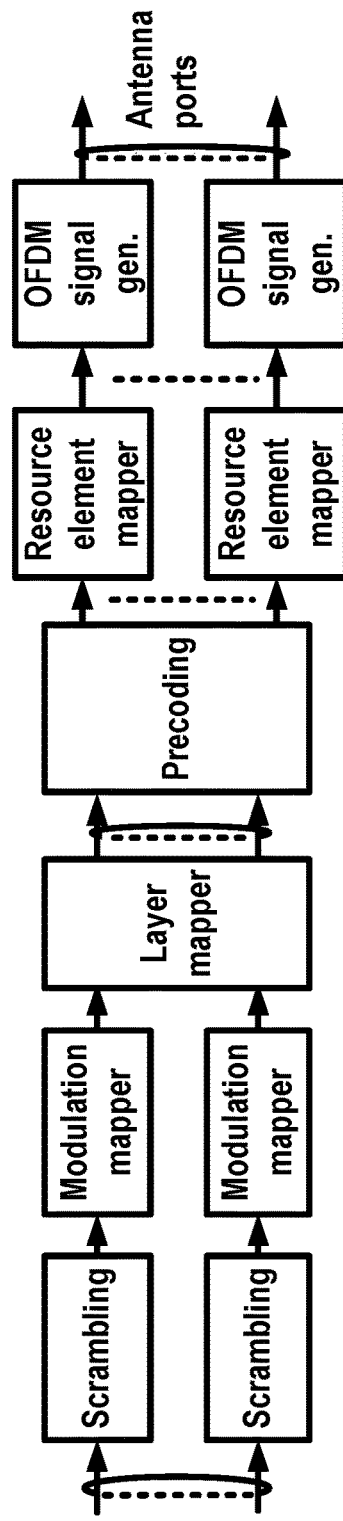
FIG. 4C

BEAM FAILURE RECOVERY PROCEDURE FOR BANDWIDTH PARTS

CROSS-REFERENCE TO RELATED APPLICATIONS

This application claims the benefit of U.S. Provisional Application No. 62/842,273, filed May 2, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

DETAILED DESCRIPTION OF EMBODIMENTS

Figure 1:
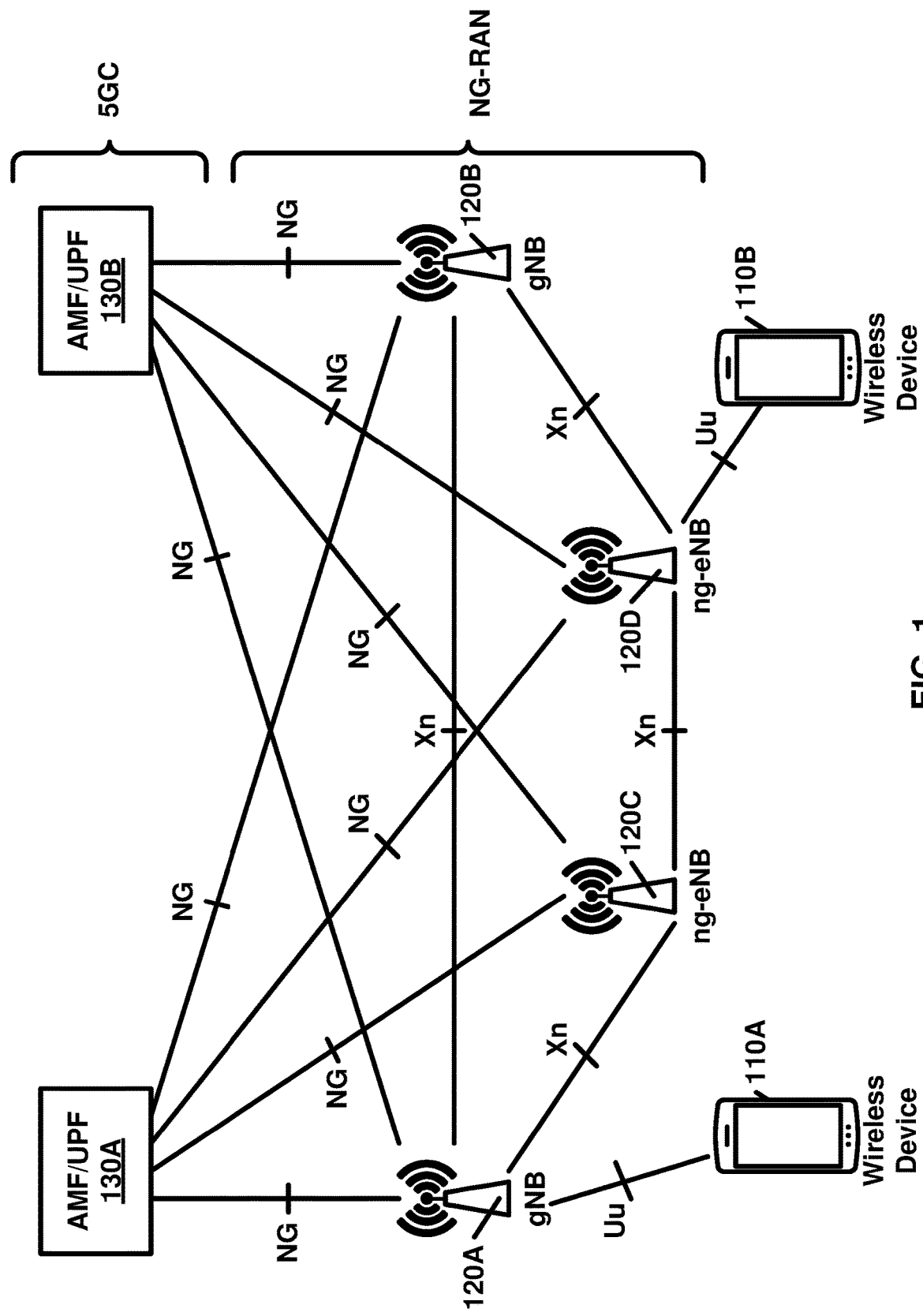
FIG. 1 is a diagram of an example RAN architecture as per an aspect of an embodiment of the present disclosure.

Example embodiments of the present disclosure enable operation of beam failure recovery procedure. Embodiments of the technology disclosed herein may be employed in the technical field of multicarrier communication systems. More particularly, the embodiments of the technology disclosed herein may relate to beam failure recovery procedure in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB TransportBlock
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
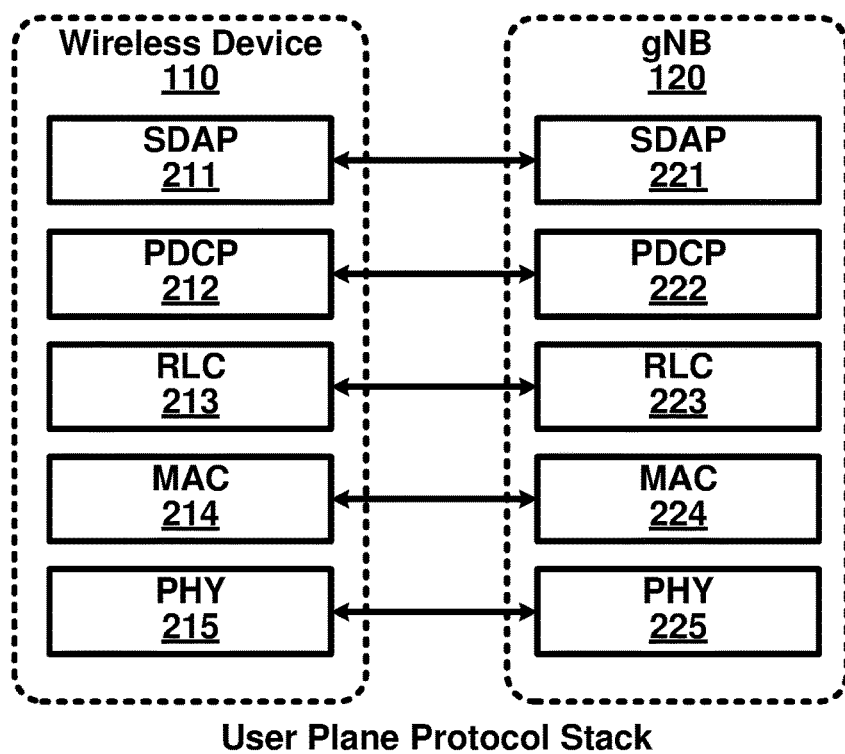
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
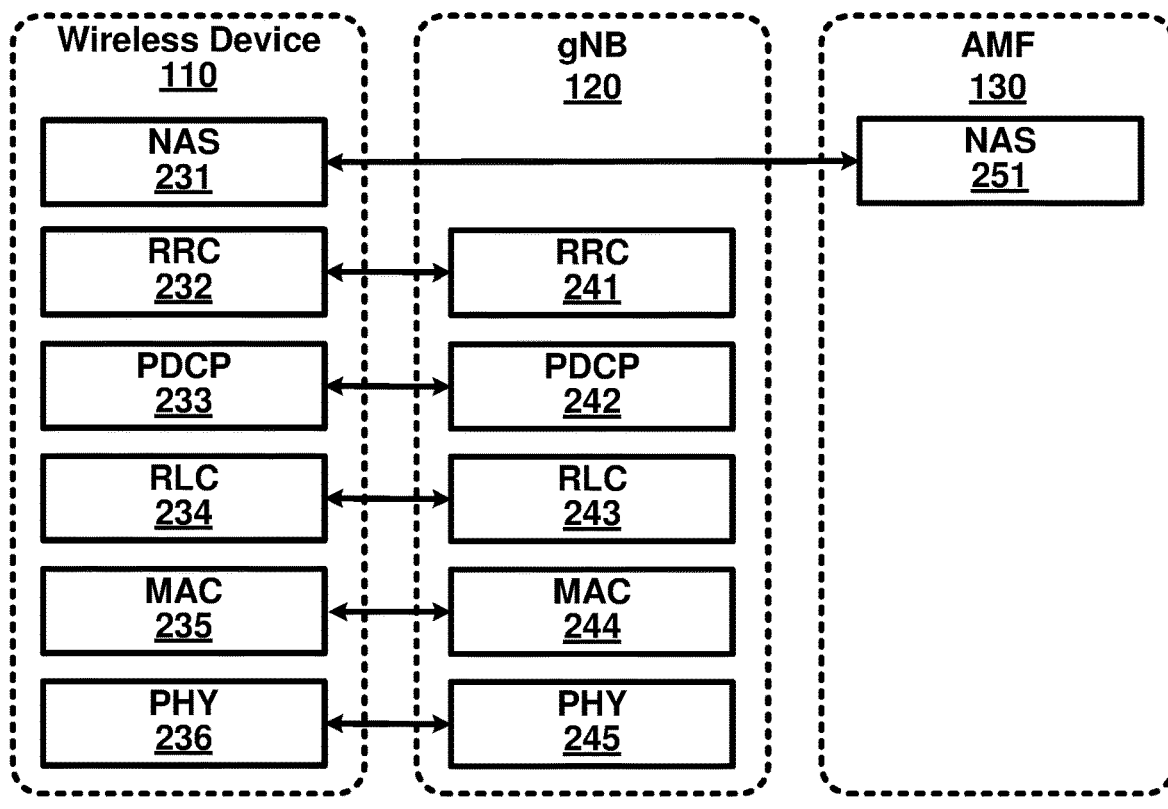
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
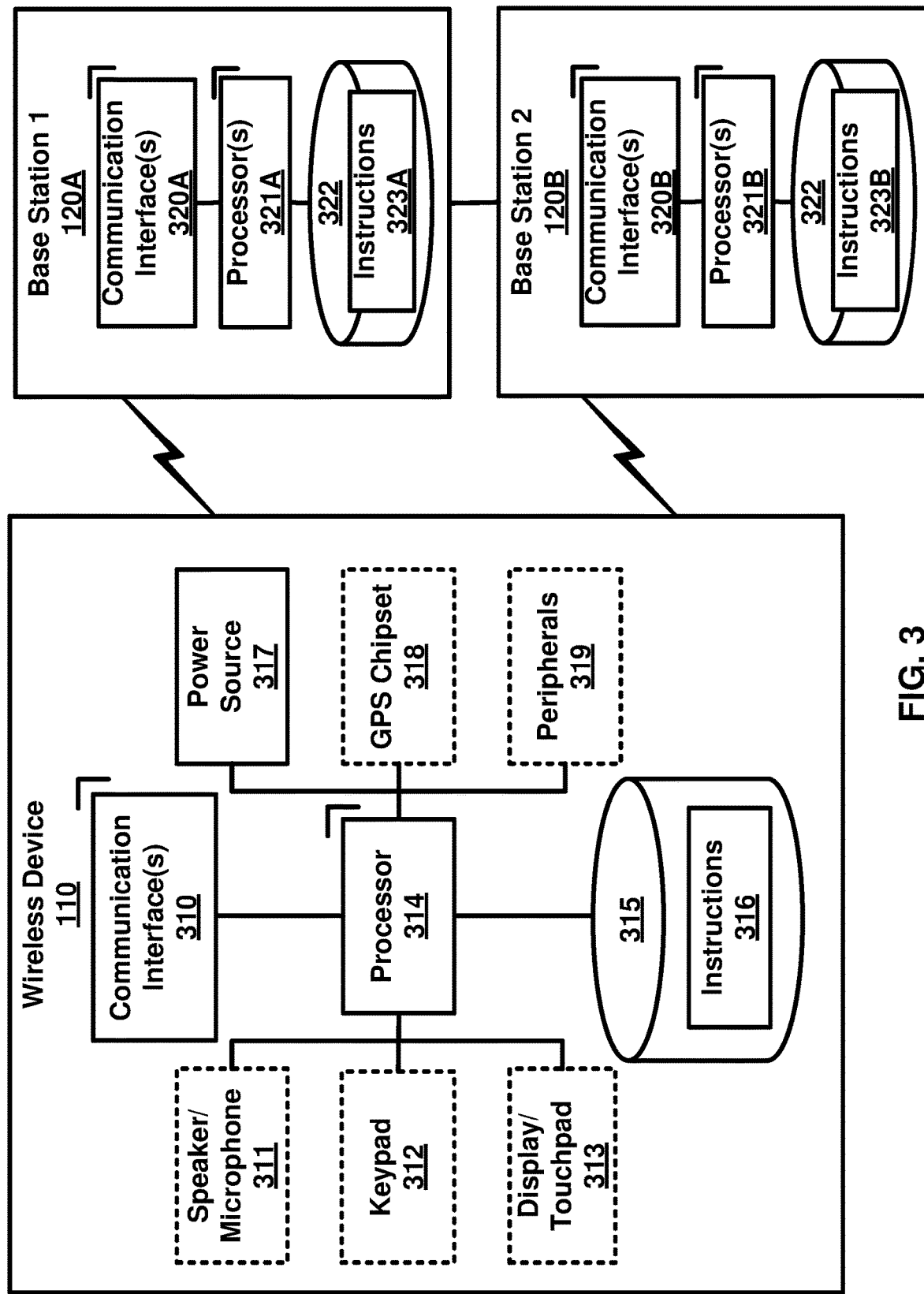
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG.

4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
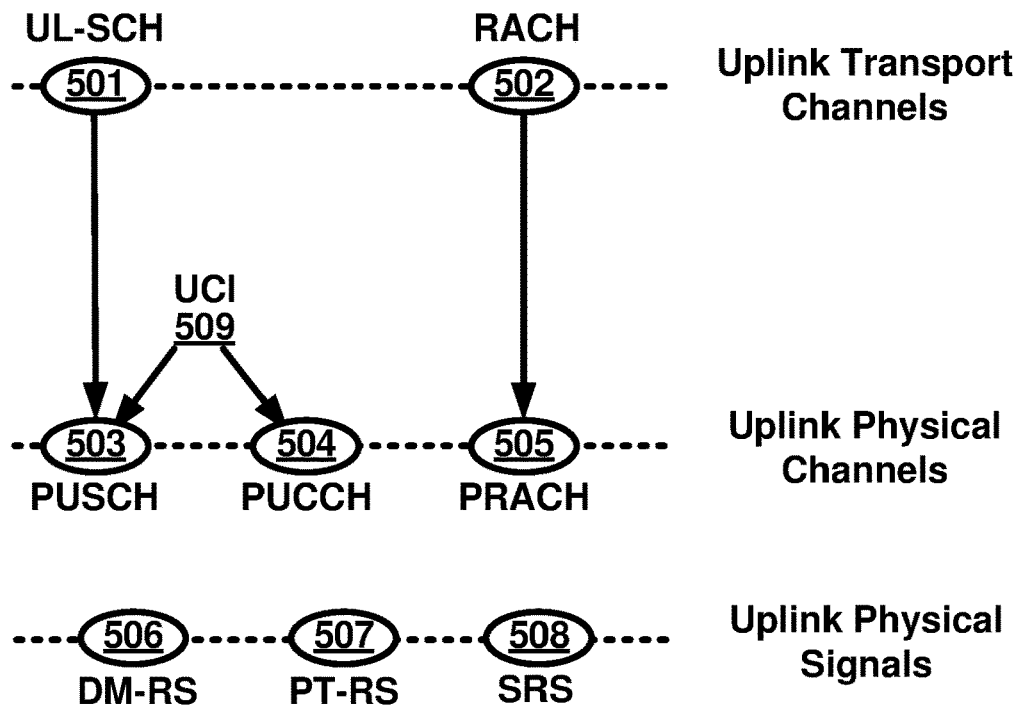
FIG. 5A is a diagram of an example uplink channel mapping and example uplink physical signals as per an aspect of an embodiment of the present disclosure.
Figure 5B:
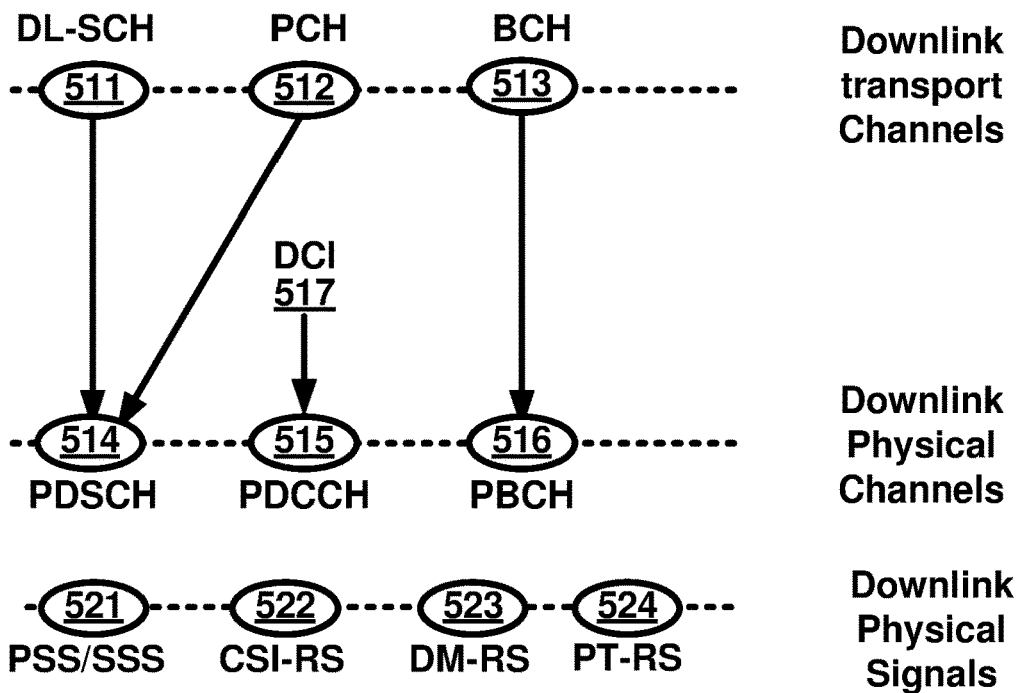
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
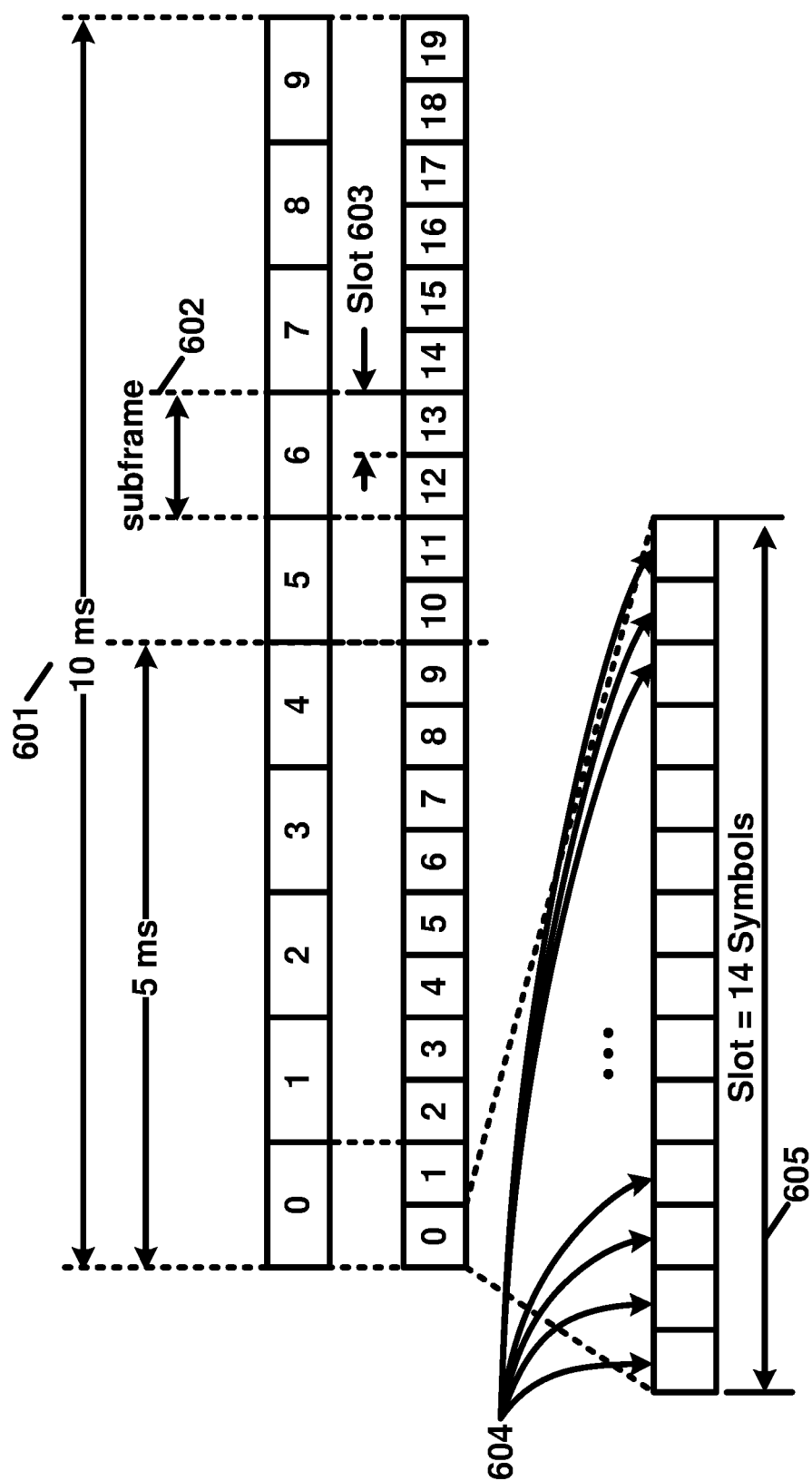
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
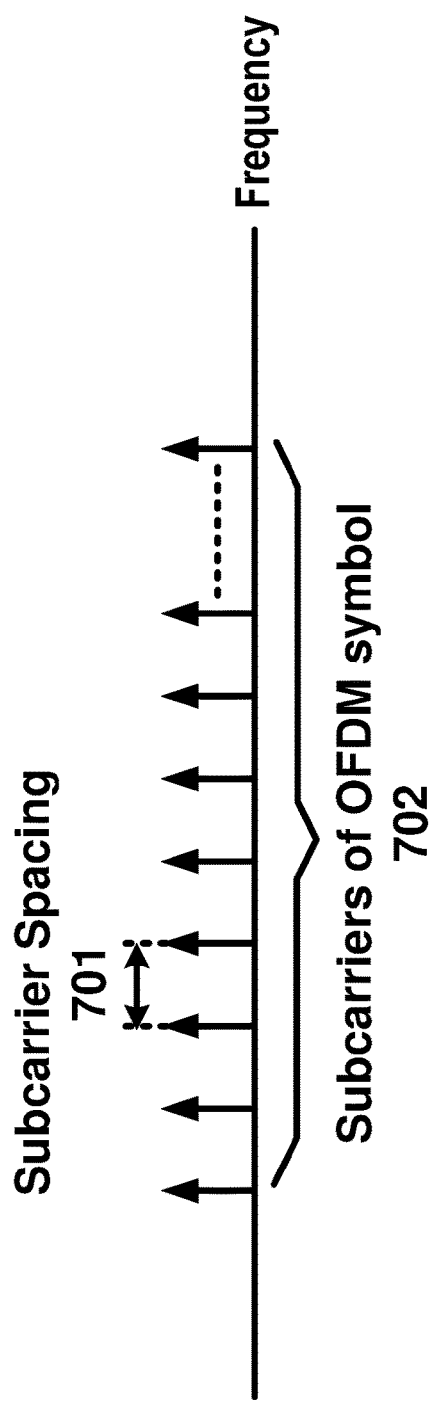
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
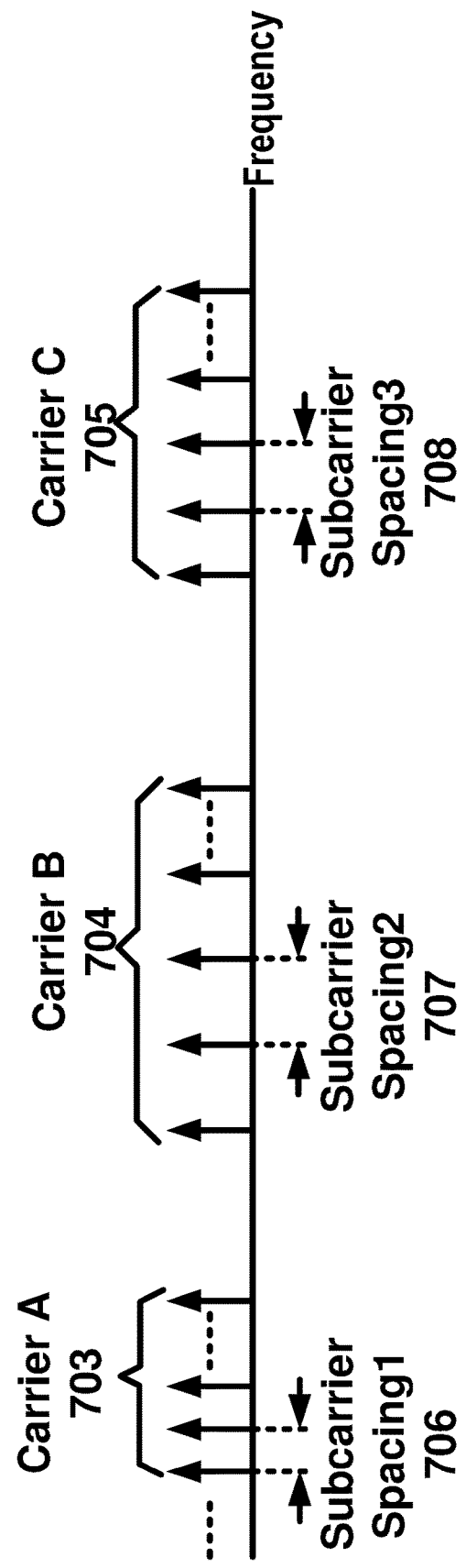

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
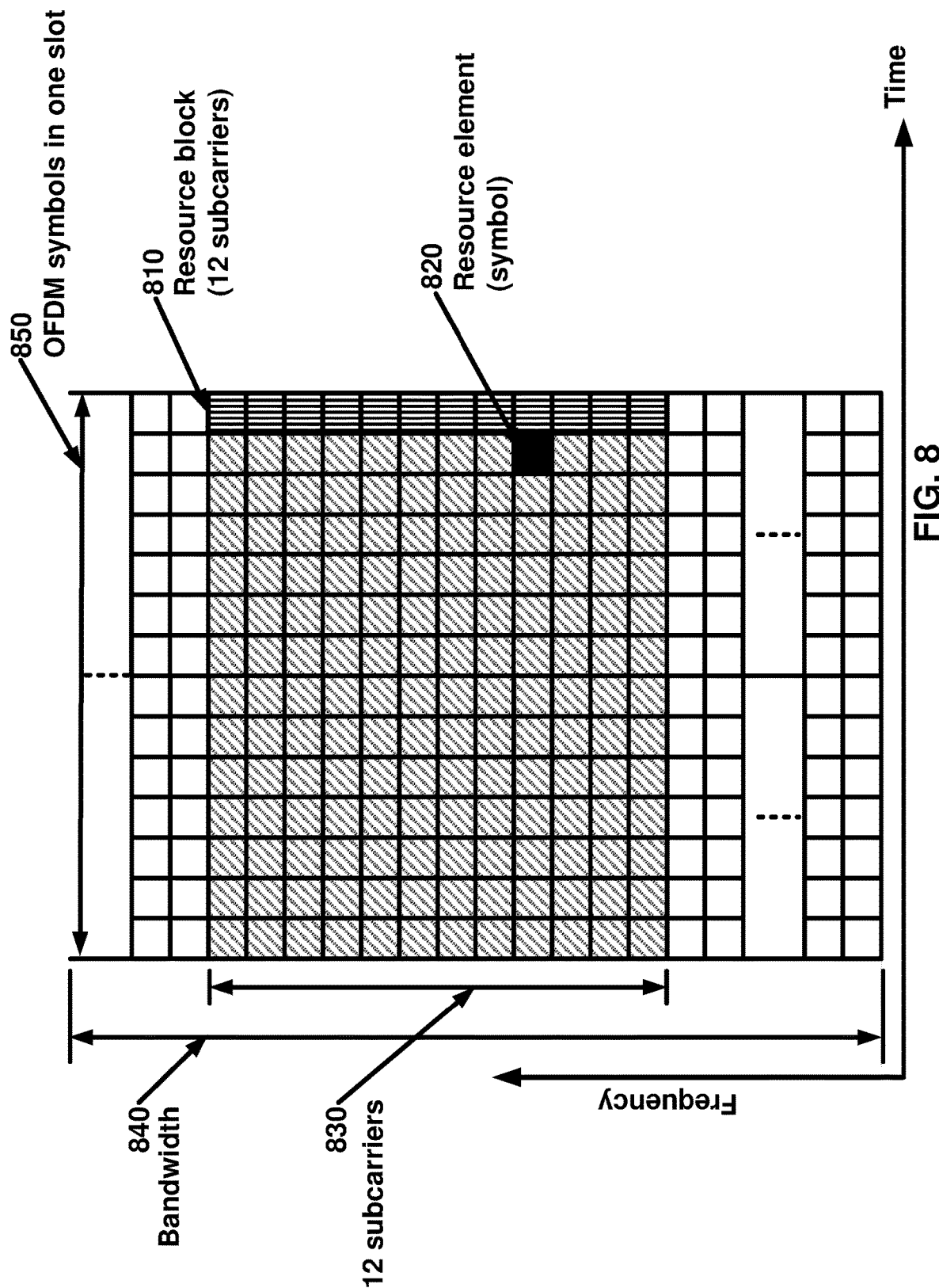
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
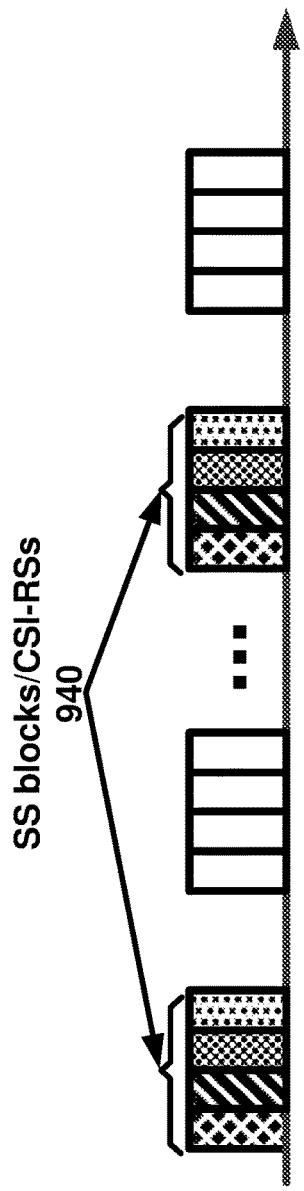
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
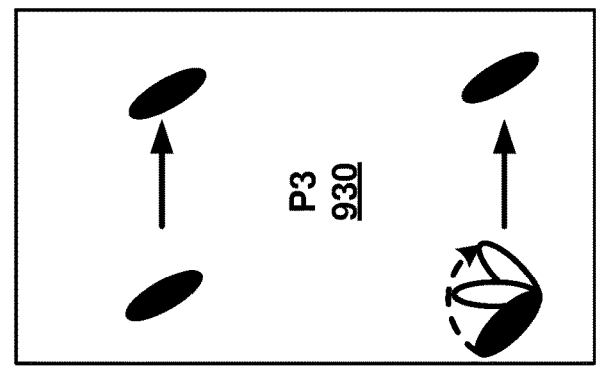
FIG. 9B is a diagram depicting an example downlink beam management procedure as per an aspect of an embodiment of the present disclosure.
Figure 9B:
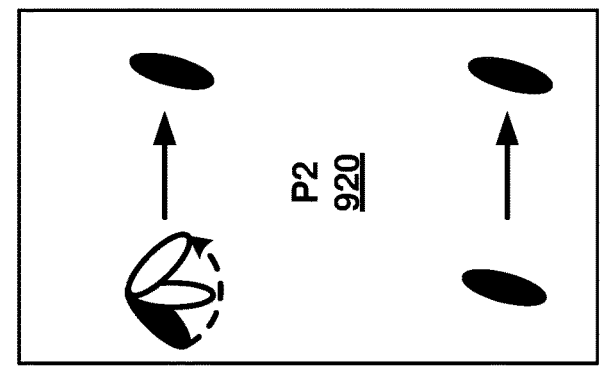
Figure 9B:
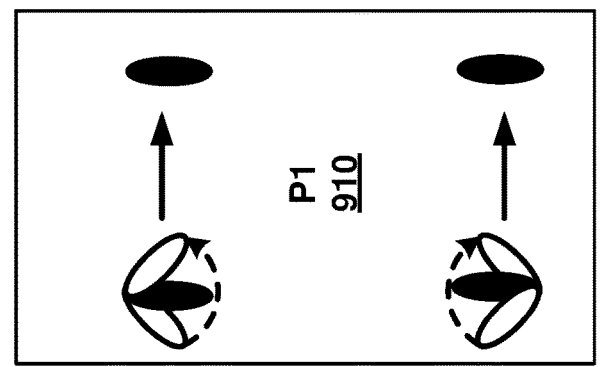
Figure 9B:
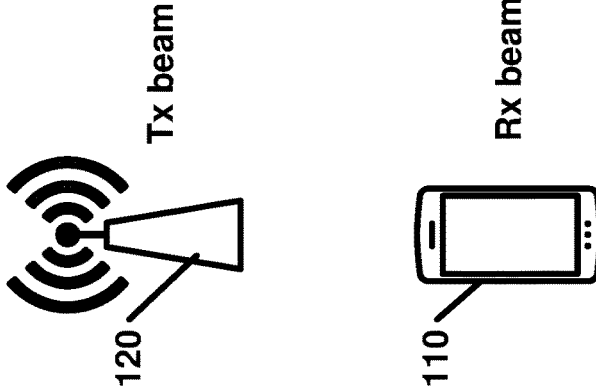

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
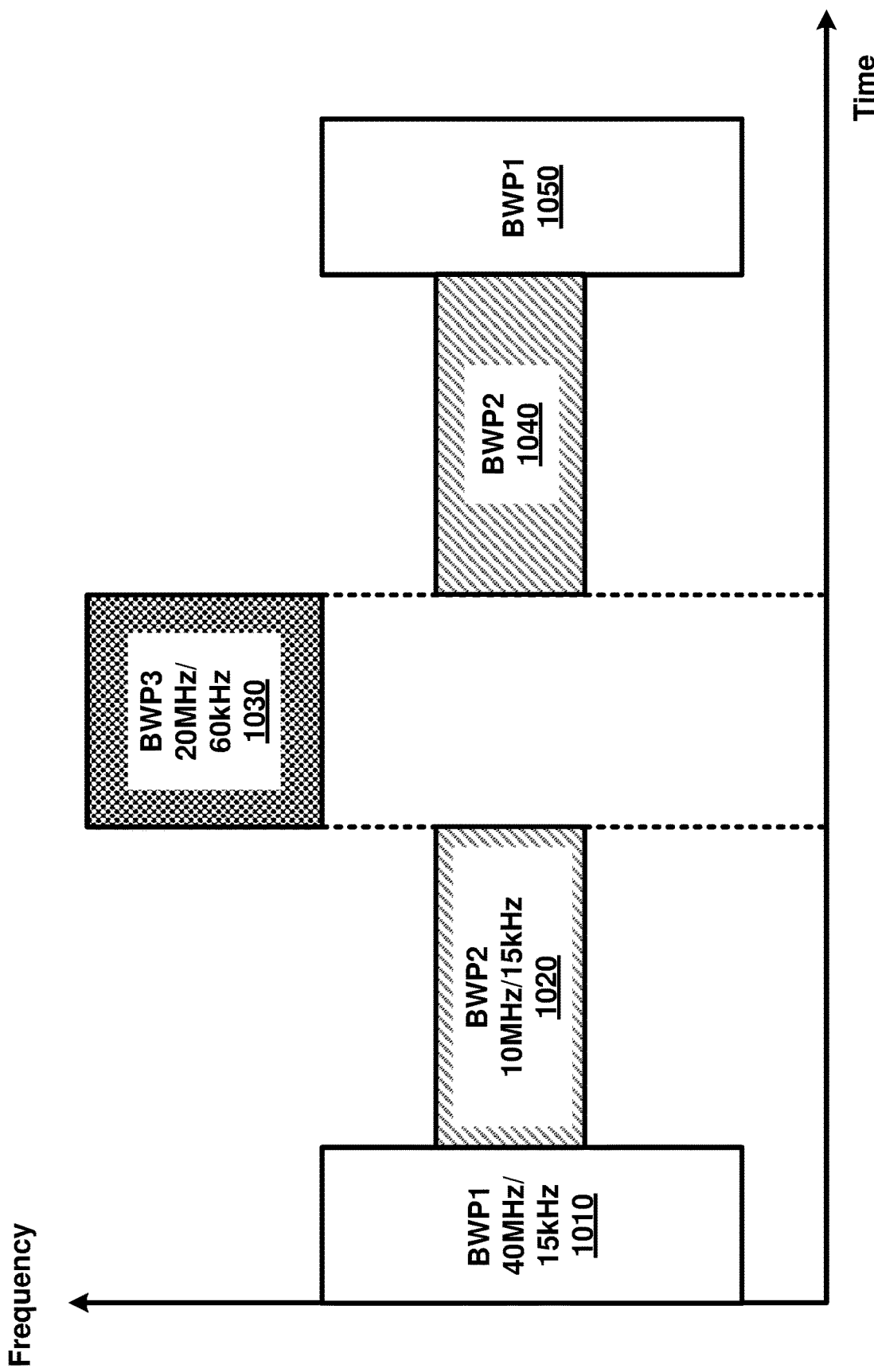
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
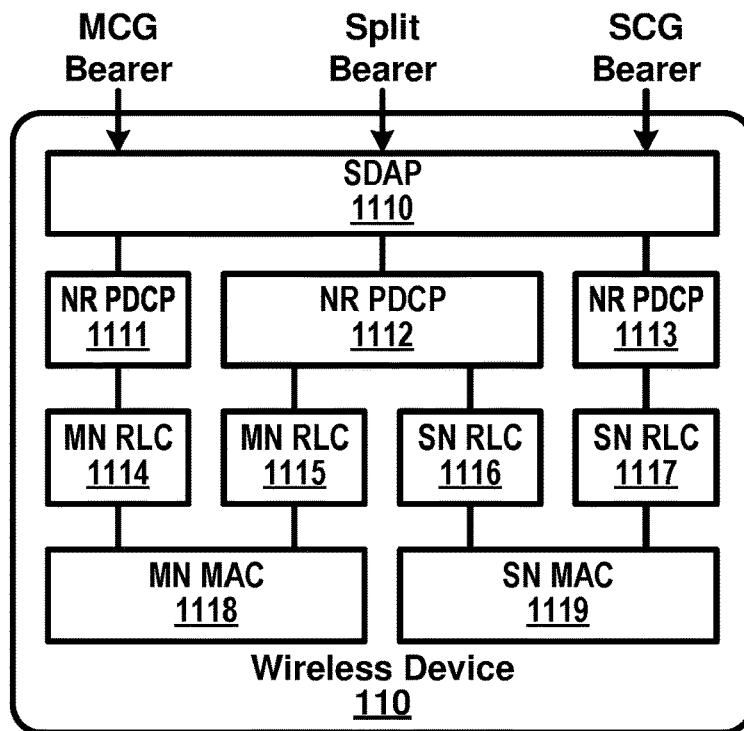
FIG. 11A, and FIG. 11B are diagrams of an example multi connectivity as per an aspect of an embodiment of the present disclosure.
Figure 11B:
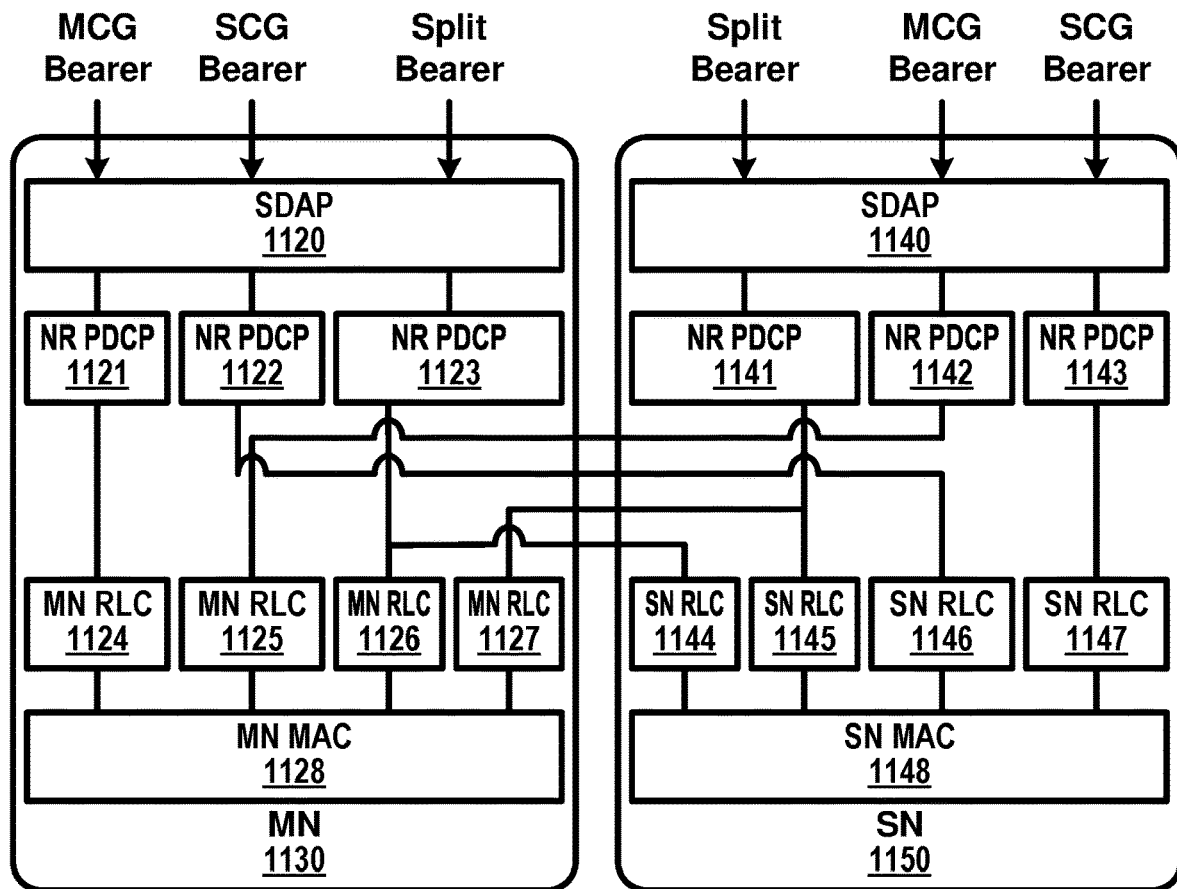

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
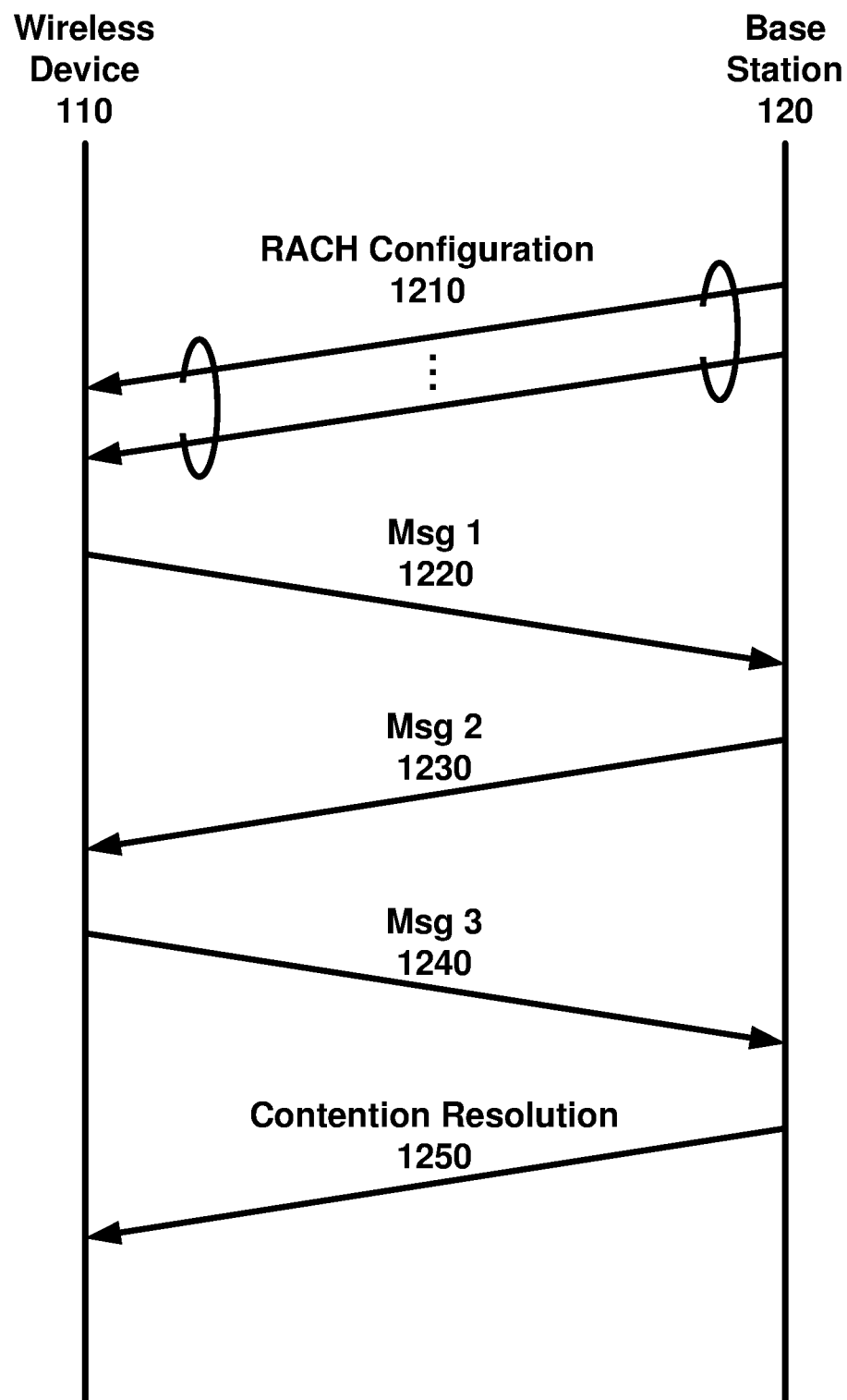
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
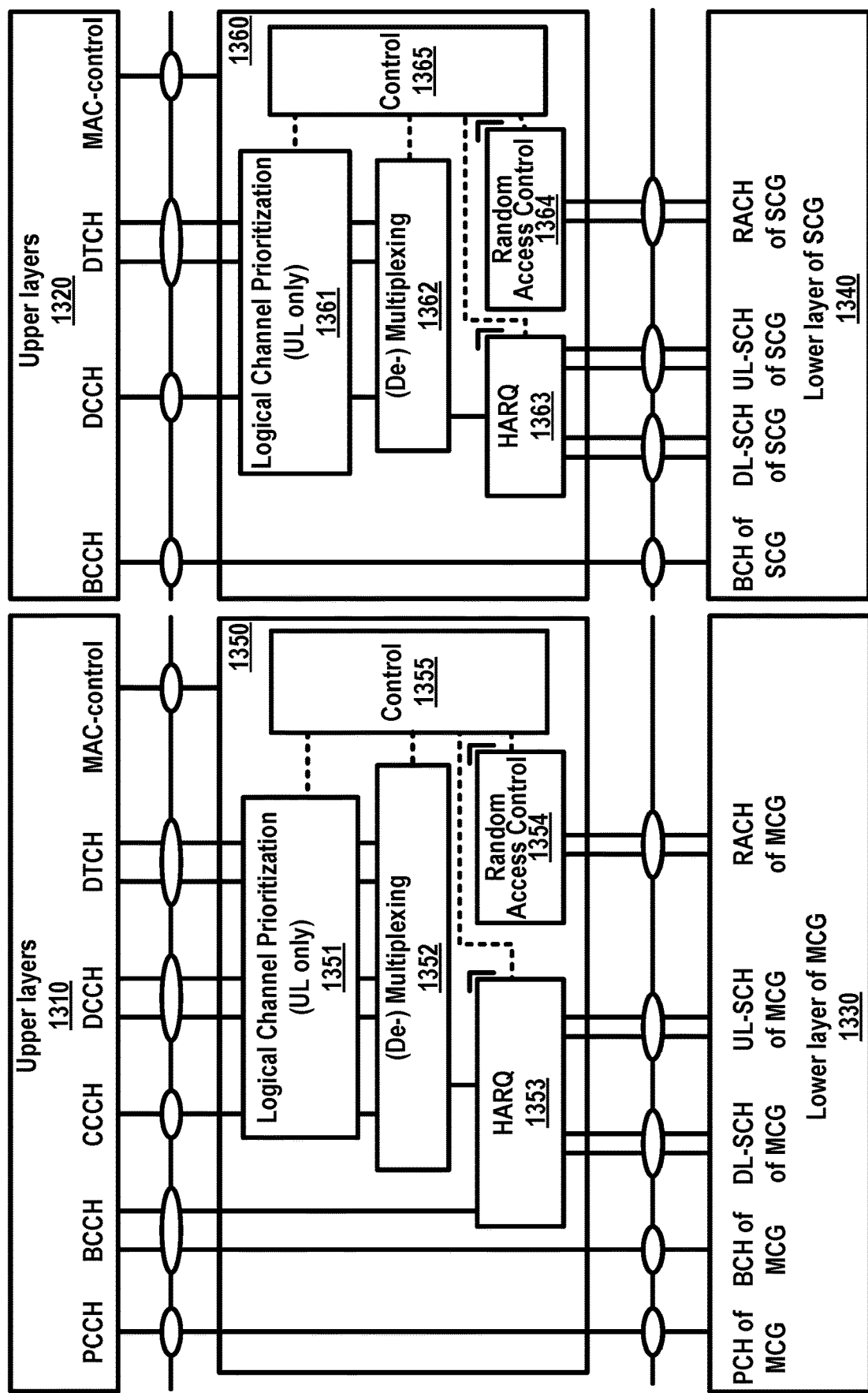
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
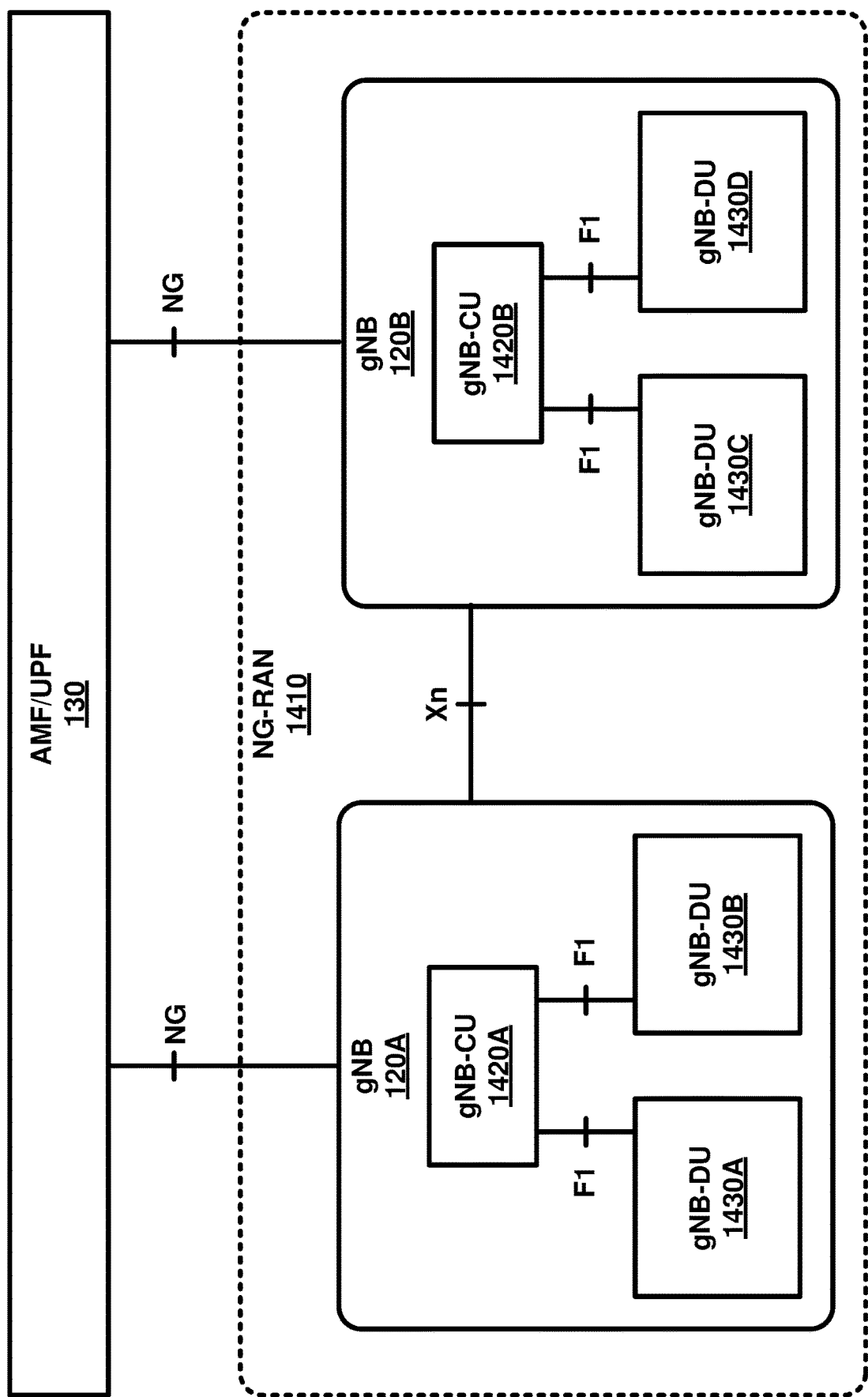
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
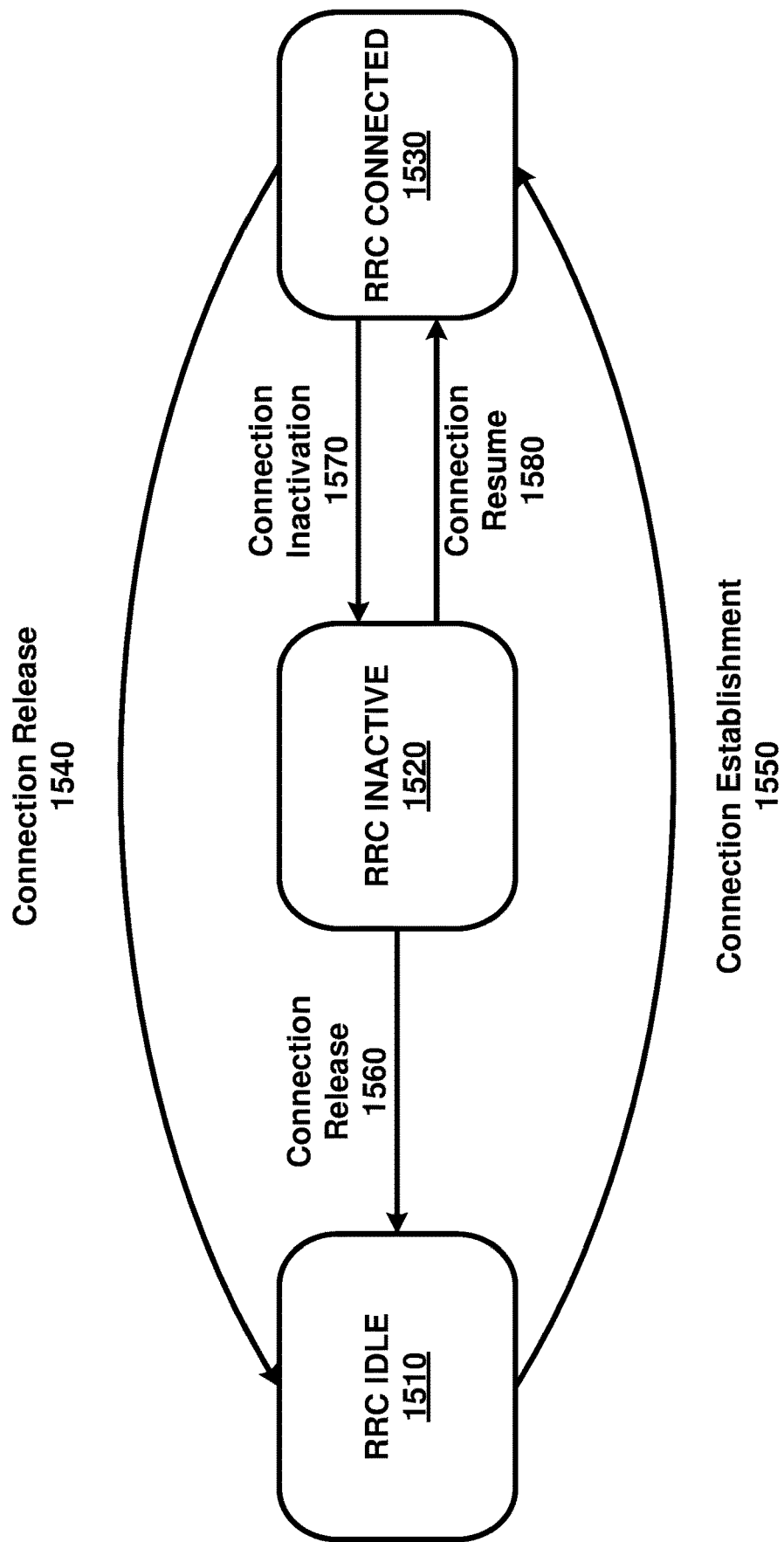
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Example MAC PDU Structure.

A gNB may transmit one or more MAC PDU to a wireless device. In an example, a MAC PDU may be a bit string that is byte aligned (e.g., multiple of eight bits) in length. In an example, bit strings may be represented by tables in which the most significant bit is the leftmost bit of the first line of the table, and the least significant bit is the rightmost bit on the last line of the table, and more generally, the bit string may be read from the left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., multiple of eight bits) in length. In an example, a MAC SDU may be included into a MAC PDU from the first bit onward.

In an example, a MAC CE may be a bit string that is byte aligned (e.g., multiple of eight bits) in length.

In an example, a MAC subheader may be a bit string that is byte aligned (e.g., multiple of eight bits) in length. In an example, a MAC subheader may be placed immediately in front of the corresponding MAC SDU, or MAC CE, or padding.

In an example, a MAC entity may ignore a value of reserved bits in a DL MAC PDU.

In an example, a MAC PDU may comprise one or more MAC subPDUs. a MAC subPDU of the one or more MAC subPDUs may comprise at least one of: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, or a MAC CE, or padding.

In an example, a MAC subheader may comprise: an R field with one bit; a F field with one bit in length; a LCID field with multiple bits in length; a L field with multiple bits in length, when the MAC subheader corresponds to a MAC SDU, or a variable-sized MAC CE, or padding.

In an example of a MAC subheader with an eight-bit L field, the LCID field may have six bits in length, and the L field may have eight bits in length. In an example of a MAC subheader with a sixteen-bit L field, the LCID field may have six bits in length, and the L field may have sixteen bits in length.

In an example, a MAC subheader may comprise: a R field with two bits in length; and a LCID field with multiple bits in length, when the MAC subheader corresponds to a fixed sized MAC CE, or padding. In an example of the MAC subheader, the LCID field may have six bits in length, and the R field may have two bits in length.

In an example of a DL MAC PDU, multiple MAC CEs may be placed together. A MAC subPDU comprising MAC CE may be placed before any MAC subPDU comprising a MAC SDU, or a MAC subPDU comprising padding.

In an example of a UL MAC PDU, multiple MAC CEs may be placed together. A MAC subPDU comprising MAC CE may be placed after all MAC subPDU comprising a MAC SDU. The MAC subPDU may be placed before a MAC subPDU comprising padding.

In an example, a MAC entity of a gNB may transmit to a MAC entity of a wireless device one or more MAC CEs. In an example of multiple LCIDs associated with the one or more MAC CEs, the one or more MAC CEs may comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; a SCell activation/deactivation MAC CE (1 Octet); a SCell activation/deactivation MAC CE (4 Octet); and/or a duplication activation/deactivation MAC CE. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a long DRX command MAC CE.

In an example, the MAC entity of the wireless device may transmit to the MAC entity of the gNB one or more MAC CEs. In an example of the one or more MAC CEs, the one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a short-truncated command MAC CE.

Example of Carrier Aggregation

In a carrier aggregation (CA), two or more component carriers (CCs) may be aggregated. A wireless device may simultaneously receive or transmit on one or more CCs depending on capabilities of the wireless device. In an example, the CA may be supported for contiguous CCs. In an example, the CA may be supported for non-contiguous CCs.

When configured with CA, a base station and/or a wireless device may employ an activation/deactivation mechanism of an SCell for an efficient battery consumption. When a wireless device is configured with one or more SCells, a gNB may activate or deactivate at least one of the one or more SCells. Upon configuration of an SCell, the SCell may be deactivated.

In an example, a wireless device may activate/deactivate an SCell in response to receiving an SCell Activation/Deactivation MAC CE.

In an example, a base station may transmit, to a wireless device, one or more messages comprising an sCellDeactivationTimer timer. In an example, a wireless device may deactivate an SCell in response to an expiry of the sCellDeactivationTimer timer.

When a wireless device receives an SCell Activation/Deactivation MAC CE activating an SCell, the wireless device may activate the SCell. In response to the activating the SCell, the wireless device may perform operations comprising SRS transmissions on the SCell, CQI/PMI/RI/CRI reporting for the SCell on a PCell, PDCCH monitoring on the SCell, PDCCH monitoring for the SCell on the PCell, and/or PUCCH transmissions on the SCell.

In an example, in response to the activating the SCell, the wireless device may start or restart an sCellDeactivationTimer timer associated with the SCell. The wireless device may start the sCellDeactivationTimer timer in the slot when the SCell Activation/Deactivation MAC CE has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

In an example, when a wireless device receives an SCell Activation/Deactivation MAC CE deactivating an activated SCell, the wireless device may deactivate the activated SCell.

In an example, when an sCellDeactivationTimer timer associated with an activated SCell expires, the wireless device may deactivate the activated SCell. In response to the deactivating the activated SCell, the wireless device may stop the sCellDeactivationTimer timer associated with the activated SCell. In response to the deactivating the activated SCell, the wireless device may stop the BWP inactivity timer associated with the activated SCell. In response to the deactivating the activated SCell, the wireless device may deactivate any active BWP associated with the activated SCell.

In an example, when at least one first PDCCH on an activated SCell indicates an uplink grant or a downlink assignment, a wireless device may restart an sCellDeactivationTimer timer associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart an sCellDeactivationTimer timer associated with the activated SCell.

In an example, when an SCell is deactivated, if there is an ongoing random access procedure on the SCell, a wireless device may abort the ongoing random access procedure on the SCell.

Example of SCell Activation/Deactivation MAC-CE

In an example of an SCell Activation/Deactivation MAC CE of one octet, a first MAC PDU subheader with a first LCID may identify the SCell Activation/Deactivation MAC CE of one octet. The SCell Activation/Deactivation MAC CE of one octet may have a fixed size. In an example of the first LCID, the SCell Activation/Deactivation MAC CE of one octet may comprise a single octet. The single octet may comprise a first number of C-fields (e.g. seven) and a second number of R-fields (e.g. one).

In an example of an SCell Activation/Deactivation MAC CE of four octets, a second MAC PDU subheader with a second LCID may identify the SCell Activation/Deactivation MAC CE of four octets. In an example of the second LCID, the SCell Activation/Deactivation MAC CE of four octets may have a fixed size. The SCell Activation/Deactivation MAC CE of four octets may comprise four octets. The four octets may comprise a third number of C-fields (e.g. 31) and a fourth number of R-fields (e.g. 1).

In an example, a $C_i$ field may indicate an activation/deactivation status of an SCell with an SCell index i, if a SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In an example, an R field may indicate a reserved bit. The R field may be set to zero.

Example of TCI

In an example, a wireless device may receive higher layer parameter TCI-States for PDCCH receptions. In an example, the higher layer parameter TCI-States may contain a single TCI state. In response to the higher layer parameter TCI-States may containing the single TCI state, the wireless device may assume that the DM-RS antenna port associated with the PDCCH receptions is quasi co-located with the one or more DL RS configured by the single TCI state.

In an example, a base station may indicate, to a wireless device, a TCI state for PDCCH reception for a coreset of a serving cell by sending a TCI state indication for UE-specific PDCCH MAC CE. In an example, if a MAC entity of the wireless device receives a TCI state indication for UE-specific PDCCH MAC CE on/for a serving cell, the MAC entity may indicate to lower layers (e.g., PHY) the information regarding the TCI state indication for the UE-specific PDCCH MAC CE.

In an example, a TCI state indication for UE-specific PDCCH MAC CE may be identified by a MAC PDU subheader with LCID. The TCI state indication for UE-specific PDCCH MAC CE may have a fixed size of 16 bits comprising one or more fields. In an example, the one or more fields may comprise a serving cell ID, coreset ID, TCI state ID and a reserved bit.

In an example, the serving cell ID may indicate the identity of the serving cell for which the TCI state indication for the UE-specific PDCCH MAC CE applies. The length of the serving cell ID may be n bits (e.g., n=5 bits).

In an example, the coreset ID may indicate a control resource set. The control resource set may be identified with a control resource set ID (e.g., ControlResourceSetId). The TCI State is being indicated to the control resource set ID for which. The length of the coreset ID may be n3 bits (e.g., n3=4 bits).

In an example, the TCI state ID may indicate the TCI state identified by TCI-StateId. The TCI state may be applicable to the control resource set identified by the coreset ID. The length of the TCI state ID may be n4 bits (e.g., n4=6 bits).

Example of SR

In an example, a wireless device may trigger a SR for requesting UL-SCH resource when the wireless device has new transmission. A gNB may transmit to a wireless device at least one message comprising parameters indicating zero, one or more SR configurations. A SR configuration may comprise a set of PUCCH resources for SR on one or more BWPs, and/or one or more cells. On a BWP, at most one PUCCH resource for SR may be configured. Each SR configuration may correspond to one or more logical channels. Each logical channel may be mapped to zero or one SR configuration configured by the at least one message. A SR configuration of a logical channel (LCH) that triggers a buffer status report (BSR) may be considered as a corresponding SR configuration for a triggered SR.

In an example, for each SR configuration, the at least one message may further comprise one or more parameters indicating at least one of: a SR prohibit timer; a maximum number of SR transmission; a parameter indicating a periodicity and offset of SR transmission; and/or a PUCCH resource. In an example, the SR prohibit timer may be a duration during which the wireless device may be not allowed to transmit the SR. In an example, the maximum number of SR transmission may be a transmission number for which the wireless device may be allowed to transmit the SR at most.

In an example, a PUCCH resource may be identified by at least: frequency location (e.g., starting PRB); a PUCCH format associated with initial cyclic shift of a base sequence and time domain location (e.g., starting symbol index).

In an example, a wireless device may maintain a SR transmission counter (e.g., SR_COUNTER) associated with a SR configuration.

In an example, if an SR of a SR configuration is triggered, and there are no other SRs pending corresponding to the same SR configuration, a wireless device may set the SR_COUNTER of the SR configuration to a first value (e.g., 0).

In an example, when an SR is triggered, a wireless device may consider the SR pending until it is cancelled. In an example, when one or more UL grants accommodate all pending data available for transmission, all pending SR(s) may be cancelled.

In an example, a wireless device may determine one or more PUCCH resources on an active BWP as valid PUCCH resources at a time of SR transmission occasion.

In an example, a wireless device may transmit a PUCCH in a PUCCH resource associated with a SR configuration when the wireless device transmits a positive SR. In an example, a wireless device may transmit the PUCCH using PUCCH format 0, or PUCCH format 1, according to the PUCCH configuration.

In an example, a wireless device may receive one or more RRC message comprising parameters of one or more SR configurations. In an example, for each of the one or more SR configurations, the parameters may indicate at least one of: a SR prohibit timer; a maximum number of SR transmission; a parameter indicating a periodicity and offset of SR transmission; and/or a PUCCH resource identified by a PUCCH resource index. In an example, when a SR of a SR configuration triggered (therefore in pending now) in response to a BSR being triggered on a LCH corresponding to the SR configuration, a wireless device may set a SR_COUNTER to a first value (e.g., 0), if there is no other pending SRs corresponding to the SR configuration.

In an example, a wireless device may determine whether there is at least one valid PUCCH resource for the pending SR at the time of SR transmission occasion. If there is no valid PUCCH resource for the pending SR, the wireless device may initiate a random access procedure on a PCell. The wireless device may cancel the pending SR in response to no valid PUCCH resource for the pending SR.

In an example, if there is at least one valid PUCCH resource for the pending SR, a wireless device may determine an SR transmission occasion on the at least one valid PUCCH resource based on the periodicity and the offset of SR transmission. In an example, if the SR prohibit timer is running, the wireless device may wait for another SR transmission occasion. In an example, if the SR prohibit timer is not running; and if the at least one valid PUCCH resource for the SR transmission occasion does not overlap with a measurement gap; and if the at least one valid PUCCH resource for the SR transmission occasion does not overlap with an uplink shared channel (UL-SCH) resource; if the SR_COUNTER is less than the maximum number of SR transmission, the wireless device may increment the SR_COUNTER (e.g., by one), instruct the physical layer of the wireless device to signal the SR on the at least one valid PUCCH resource for the SR. The physical layer of the wireless device may transmit a PUCCH on the at least one valid PUCCH resource for the SR. The wireless device may monitor a PDCCH for detecting a DCI for uplink grant in response to transmitting the PUCCH.

In an example, if a wireless device receives one or more uplink grants which may accommodate all pending data available for transmission, the wireless device may cancel the pending SR, and/or stop the SR prohibit timer.

In an example, if the wireless device does not receive one or more uplink grants which may accommodate all pending data available for transmission, the wireless device may repeat one or more actions comprising: determining the at least one valid PUCCH resource; checking whether the SR prohibit timer is running; whether the SR_COUNTER is equal or greater than the maximum number of SR transmission; incrementing the SR_COUNTER, transmitting the SR and starting the SR prohibit timer; monitoring a PDCCH for uplink grant.

In an example, if the SR_COUNTER indicates a number equal to or greater than the maximum number of SR transmission, a wireless device may release PUCCH for one or more serving cells, and/or release SRS for the one or more serving cells, and/or clear one or more configured downlink assignments and uplink grants, and/or initiate a random access procedure on a PCell, and/or cancel all the pending SRs.

Example Bandwidth Parts (BWPs)

In an example, with Bandwidth Adaptation (BA), a receive and a transmit bandwidth of a wireless device may not be as large as a bandwidth of a cell. The receive bandwidth and/or the transmit bandwidth of the wireless device may be adjusted. In an example, the width of the receive bandwidth and/or the transmit bandwidth may be ordered to change (e.g. or to shrink during period of low activity to save power). In an example, the location of the receive bandwidth and/or the transmit bandwidth may move in the frequency domain (e.g. to increase scheduling flexibility). In an example, the subcarrier spacing of the receive bandwidth and/or the transmit bandwidth may be ordered to change (e.g. to allow different services). A subset of the total cell bandwidth of a cell may be referred to as a Bandwidth Part (BWP). The BA may be achieved by configuring the wireless device with one or more BWPs and telling the wireless device which of the configured one or more BWPs is currently the active BWP.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may configure the UE with at least DL BWP(s) (i.e. there may be no UL BWPS in the UL) to enable BA on an SCell.

For the PCell, an initial BWP may be a BWP used for initial access. In an example, the wireless device may operate on the initial BWP (e.g., initial UL/DL BWP) during the initial access.

For the SCell, an initial BWP may be a BWP configured for the UE to first operate at the SCell when the SCell is activated. In an example, in response to the SCell being activated, the wireless device may operate on the initial BWP.

In an example, a base station may configure a wireless device with one or more BWPs. In paired spectrum (e.g. FDD), a wireless device may switch a first DL BWP and a first UL BWP of the one or more BWPs independently. In unpaired spectrum (e.g. TDD), a wireless device may switch a second DL BWP and a second UL BWP of the one or more BWPs simultaneously. Switching between the configured one or more BWPs may happen via a DCI or an inactivity timer (e.g., BWP inactivity timer). In an example, when the inactivity timer is configured for a serving cell, an expiry of the inactivity timer associated to that cell may switch an active BWP of the serving cell to a default BWP. The default BWP may be configured by the network.

In an example, for FDD systems, when configured with BA, one UL BWP for each uplink carrier (e.g., SUL, NUL) and one DL BWP may be active at a time in an active serving cell. BWPs other than the one UL BWP and the one DL BWP that the UE may be configured with may be deactivated.

In an example, for TDD systems, one DL/UL BWP pair may be active at a time in an active serving cell. BWPs other than the one DL/UL BWP pair that the UE may be configured with may be deactivated.

In an example, operating on the one UL BWP and the one DL BWP (or the one DL/UL pair) may enable reasonable UE battery consumption. On deactivated BWPs, the UE may not monitor PDCCH, may not transmit on PUCCH, PRACH and UL-SCH.

In an example, when configured with BA, a wireless device may monitor a first PDCCH on an active BWP of a serving cell. In an example, the wireless device may not monitor a second PDCCH on an entire DL frequency/bandwidth of the cell. In an example, the wireless device may not monitor the second PDCCH on deactivated BWPs. In an example, a BWP inactivity timer may be used to switch the active BWP to a default BWP of the serving cell. In an example, the wireless device may (re)-start the BWP inactivity timer in response to successful PDCCH decoding on the serving cell. In an example, the wireless device may switch to the default BWP in response to an expiry of the BWP inactivity timer.

In an example, a wireless device may be configured with one or more BWPs for a serving cell (e.g., PCell, SCell). In an example, the serving cell may be configured with at most a first number (e.g., four) BWPs. In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by an inactivity timer (e.g. bwp-InactivityTimer). In an example, the BWP switching may be controlled by a MAC entity in response to initiating a Random Access procedure. In an example, the BWP switching may be controlled by an RRC signalling.

In an example, in response to RRC (re-)configuration of firstActiveDownlinkBWP-Id (e.g., included in RRC signaling) and/or firstActiveUplinkBWP-Id (e.g., included in RRC signaling) for a serving cell (e.g., SpCell), the wireless device may activate a DL BWP indicated by the firstActiveDownlinkBWP-Id and/or an UL BWP indicated by the firstActiveUplinkBWP-Id, respectively without receiving a PDCCH indicating a downlink assignment or an uplink grant. In an example, in response to an activation of an SCell, the wireless device may activate a DL BWP indicated by the firstActiveDownlinkBWP-Id and/or an UL BWP indicated by the firstActiveUplinkBWP-Id, respectively without receiving a PDCCH indicating a downlink assignment or an uplink grant.

In an example, an active BWP for a serving cell may be indicated by RRC signaling and/or PDCCH. In an example, for unpaired spectrum (e.g., time-division-duplex (TDD)), a DL BWP may be paired with a UL BWP, and BWP switching may be common (e.g., simultaneous) for the UL BWP and the DL BWP.

In an example, for an active BWP of an activated serving cell (e.g., PCell, SCell) configured with one or more BWPs, a wireless device may perform, on the active BWP, at least one of: transmitting on UL-SCH on the active BWP; transmitting on RACH on the active BWP if PRACH occasions are configured; monitoring a PDCCH on the active BWP; transmitting, if configured, PUCCH on the active BWP; reporting CSI for the active BWP; transmitting, if configured, SRS on the active BWP; receiving DL-SCH on the active BWP; (re-)initializing any suspended configured uplink grants of configured grant Type 1 on the active BWP according to a stored configuration, if any, and to start in a symbol based on some procedures.

In an example, for a deactivated BWP of an activated serving cell configured with one or more BWPs, a wireless device may not perform at least one of: transmitting on UL-SCH on the deactivated BWP; transmitting on RACH on the deactivated BWP; monitoring a PDCCH on the deactivated BWP; transmitting PUCCH on the deactivated BWP; reporting CSI for the deactivated BWP; transmitting SRS on the deactivated BWP, receiving DL-SCH on the deactivated BWP. In an example, for a deactivated BWP of an activated serving cell configured with one or more BWPs, a wireless device may clear any configured downlink assignment and configured uplink grant of configured grant Type 2 on the deactivated BWP; may suspend any configured uplink grant of configured Type 1 on the deactivated (or inactive) BWP.

In an example, a wireless device may initiate a random-access procedure (e.g., contention-based random access, contention-free random access) on a serving cell (e.g., PCell, SCell).

In an example, the base station may configure PRACH occasions for an active UL BWP of the serving cell of the wireless device. In an example, the active UL BWP may be identified with an uplink BWP ID (e.g., bwp-Id configured by higher layers (RRC)). In an example, the serving cell may be an SpCell. In an example, an active DL BWP of the serving cell of the wireless device may be identified with a downlink BWP ID (e.g., bwp-Id configured by higher layers (RRC)). In an example, the uplink BWP ID may be different from the downlink BWP ID. In an example, when the wireless device initiates the random-access procedure and the base station configures PRACH occasions for the active UL BWP and the serving cell is an SpCell, in response to the downlink BWP ID of the active DL BWP being different from the uplink BWP ID of the active UL BWP, a MAC entity of the wireless device may switch from the active DL BWP to a DL BWP, of the serving cell, identified with a second downlink BWP ID. In an example, the switching from the active DL BWP to the DL BWP may comprise setting the DL BWP as a second active DL BWP of the serving cell. In an example, the second downlink BWP ID may be the same as the uplink BWP ID. In response to the switching, the MAC entity may perform the random-access procedure on the DL BWP (e.g., the second active DL BWP) of the serving cell (e.g., SpCell) and the active UL BWP of the serving cell. In an example, in response to the initiating the random-access procedure, the wireless device may stop, if running, a BWP inactivity timer (e.g., bwp-InactivityTimer configured by higher layers (RRC)) associated with the DL BWP of the serving cell.

In an example, the base station may configure PRACH occasions for an active UL BWP of the serving cell of the wireless device. In an example, the serving cell may not be an SpCell. In an example, the serving cell may be an SCell. In an example, when the wireless device initiates the random-access procedure and the base station configures PRACH occasions for the active UL BWP and the serving cell is not an SpCell, a MAC entity of the wireless device may perform the random-access procedure on a first active DL BWP of an SpCell (e.g., PCell) and the active UL BWP of the serving cell. In an example, in response to the initiating the random-access procedure, the wireless device may stop, if running, a second BWP inactivity timer (e.g., bwp-InactivityTimer configured by higher layers (RRC)) associated with a second active DL BWP of the serving cell. In an example, in response to the initiating the random-access procedure and the serving cell being the SCell, the wireless device may stop, if running, a first BWP inactivity timer (e.g., bwp-InactivityTimer configured by higher layers (RRC)) associated with the first active DL BWP of the SpCell.

In an example, the base station may not configure PRACH occasions for an active UL BWP of the serving cell of the wireless device. In an example, when the wireless device initiates the random-access procedure on the serving cell, in response to the PRACH occasions not being configured for the active UL BWP of the serving cell, a MAC entity of the wireless device may switch from the active UL BWP to an uplink BWP (initial uplink BWP) of the serving cell. In an example, the uplink BWP may be indicated by an RRC signaling (e.g., initialUplinkBWP). In an example, the switching from the active UL BWP to the uplink BWP may comprise setting the uplink BWP as a current active UL BWP of the serving cell. In an example, the serving cell may be an SpCell. In an example, when the wireless device initiates the random-access procedure on the serving cell and the PRACH occasions are not configured for the active UL BWP of the serving cell, in response to the serving cell being an SpCell, the MAC entity may switch from an active DL BWP of the serving cell to a downlink BWP (e.g., initial downlink BWP) of the serving cell. In an example, the downlink BWP may be indicated by an RRC signaling (e.g., initialDownlinkBWP). In an example, the switching from the active DL BWP to the downlink BWP may comprise setting the downlink BWP as a current active DL BWP of the serving cell. In response to the switching, the MAC entity may perform the random-access procedure on the uplink BWP of the serving cell and the downlink BWP of the serving cell. In an example, in response to the initiating the random-access procedure, the wireless device may stop, if running, a BWP inactivity timer (e.g., bwp-InactivityTimer configured by higher layers (RRC)) associated with the downlink BWP (e.g., the current active DL BWP) of the serving cell.

In an example, the base station may not configure PRACH occasions for an active UL BWP of the serving cell (e.g., SCell) of the wireless device. In an example, when the wireless device initiates the random-access procedure on the serving cell, in response to the PRACH occasions not being configured for the active UL BWP of the serving cell, a MAC entity of the wireless device may switch from the active UL BWP to an uplink BWP (initial uplink BWP) of the serving cell. In an example, the uplink BWP may be indicated by an RRC signaling (e.g., initialUplinkBWP). In an example, the switching from the active UL BWP to the uplink BWP may comprise setting the uplink BWP as a current active UL BWP of the serving cell. In an example, the serving cell may not be an SpCell. In an example, the serving cell may be an SCell. In an example, in response to the serving cell not being the SpCell, the MAC entity may perform the random-access procedure on the uplink BWP of the serving cell and an active downlink BWP of an SpCell. In an example, in response to the initiating the random-access procedure, the wireless device may stop, if running, a second BWP inactivity timer (e.g., bwp-InactivityTimer configured by higher layers (RRC)) associated with a second active DL BWP of the serving cell. In an example, in response to the initiating the random-access procedure and the serving cell being the SCell, the wireless device may stop, if running, a first BWP inactivity timer (e.g., bwp-InactivityTimer configured by higher layers (RRC)) associated with the active DL BWP of the SpCell.

In an example, a MAC entity of a wireless device may receive a PDCCH for a BWP switching (e.g., UL BWP and/or DL BWP switching) of a serving cell. In an example, there may not be an ongoing random-access procedure associated with the serving cell when the MAC entity receives the PDCCH. In an example, in response to not being an ongoing random-access procedure associated with the serving cell when the MAC entity receives the PDCCH for the BWP switching of the serving cell, the MAC entity may perform the BWP switching to a BWP, of the serving cell, indicated by the PDCCH.

In an example, a MAC entity of a wireless device may receive a PDCCH for a BWP switching (e.g., UL BWP and/or DL BWP switching) of a serving cell. In an example, the PDCCH may be addressed to C-RNTI of the wireless device. In an example, there may be an ongoing random-access procedure associated with the serving cell. In an example, the wireless device may complete the ongoing random-access procedure associated with the serving cell (successfully) in response to the receiving the PDCCH addressed to the C-RNTI. In an example, in response to the completing the ongoing random-access procedure associated with the serving cell (successfully), the MAC entity may perform the BWP switching to a BWP, of the serving cell, indicated by the PDCCH.

In an example, a MAC entity of a wireless device may receive a PDCCH for a BWP switching (e.g., UL BWP and/or DL BWP switching) for a serving cell. In an example, there may be an ongoing random-access procedure associated with the serving cell in the MAC entity when the MAC entity receives the PDCCH. In an example, in response to being an ongoing random-access procedure associated with the serving cell when the MAC entity receives the PDCCH for the BWP switching of the serving cell, it may be up to UE implementation whether to perform the BWP switching or ignore the PDCCH for the BWP switching.

In an example, the MAC entity may perform the BWP switching in response to the receiving the PDCCH for the BWP switching (other than successful contention resolution for the random-access procedure). In an example, the performing the BWP switching may comprise switching to a BWP indicated by the PDCCH. In an example, in response to the performing the BWP switching, the MAC entity may stop the ongoing random access procedure and may initiate a second random-access procedure after the performing the BWP switching.

In an example, the MAC entity may ignore the PDCCH for the BWP switching. In an example, in response to the ignoring the PDCCH for the BWP switching, the MAC entity may continue with the ongoing random access procedure on the serving cell.

In an example, a base station may configure an activated serving cell of a wireless device with a BWP inactivity timer.

In an example, the base station may configure the wireless device with a default DL BWP ID for the activated serving cell (e.g., via RRC signaling including defaultDownlinkBWP-Id parameter). In an example, an active DL BWP of the activated serving cell may not be a BWP indicated by the default DL BWP ID.

In an example, the base station may not configure the wireless device with a default DL BWP ID for the activated serving cell (e.g., via RRC signaling including default-DownlinkBWP-Id parameter). In an example, an active DL BWP of the activated serving cell may not be an initial downlink BWP (e.g., via RRC signaling including initial-DownlinkBWP parameter) of the activated serving cell.

In an example, when the base station configures the wireless device with the default DL BWP ID and the active DL BWP of the activated serving cell is not the BWP indicated by the default DL BWP ID; or when the base station does not configure the wireless device with the default DL BWP ID and the active DL BWP is not the initial downlink BWP, the wireless device may start or restart the BWP inactivity timer associated with the active DL BWP of the activated serving cell in response to receiving a PDCCH, on the active DL BWP, indicating a downlink assignment or an uplink grant. In an example, the PDCCH may be addressed to C-RNTI. In an example, the PDCCH may be addressed to CS-RNTI.

In an example, when the base station configures the wireless device with the default DL BWP ID and the active DL BWP of the activated serving cell is not the BWP indicated by the default DL BWP ID; or when the base station does not configure the wireless device with the default DL BWP ID and the active DL BWP is not the initial downlink BWP, the wireless device may start or restart the BWP inactivity timer associated with the active DL BWP of the activated serving cell in response to receiving a PDCCH, for the active DL BWP, indicating a downlink assignment or an uplink grant. In an example, the PDCCH may be addressed to C-RNTI. In an example, the PDCCH may be addressed to CS-RNTI.

In an example, the wireless device may receive the PDCCH when there is no ongoing random-access procedure associated with the activated serving cell. In an example, the wireless device may receive the PDCCH when there is an ongoing random-access procedure associated with the activated serving cell and the ongoing random-access procedure is completed successfully in response to the receiving the PDCCH addressed to a C-RNTI of the wireless device.

In an example, when the base station configures the wireless device with the default DL BWP ID and the active DL BWP of the activated serving cell is not the BWP indicated by the default DL BWP ID; or when the base station does not configure the wireless device with the default DL BWP ID and the active DL BWP is not the initial downlink BWP, the wireless device may start or restart the BWP inactivity timer associated with the active DL BWP of the activated serving cell in response to transmitting a first MAC PDU in a configured uplink grant or receiving a second MAC PDU in a configured downlink assignment.

In an example, the wireless device may transmit the first MAC PDU and/or receive the second MAC PDU when there is no ongoing random-access procedure associated with the activated serving cell.

In an example, the BWP inactivity timer associated with the active DL BWP of the activated serving cell may expire.

In an example, the base station may configure the wireless device with the default DL BWP ID. In an example, when the base station configures the wireless device with the default DL BWP ID, in response to the BWP inactivity timer expiring, a MAC entity of the wireless device may perform BWP switching to a BWP indicated by the default DL BWP ID.

In an example, the base station may not configure the wireless device with the default DL BWP ID. In an example, when the base station does not configure the wireless device with the default DL BWP ID, in response to the BWP inactivity timer expiring, a MAC entity of the wireless device may perform BWP switching to the initial downlink BWP (e.g., initialDownlinkBWP in RRC signalling).

In an example, a wireless device may initiate a random-access procedure on a secondary cell (e.g., SCell). In an example, the wireless device may monitor for a random-access response for the random-access procedure on a SpCell. In an example, when the wireless device initiates the random-access procedure on the secondary cell, the secondary cell and the SpCell may be associated with the random-access procedure in response to the monitoring the random-access response to the SpCell.

In an example, a wireless device may receive a PDCCH for a BWP switching (e.g., UL and/or DL BWP switching). In an example, a MAC entity of the wireless device may switch from a first active DL BWP of the activated serving cell to a BWP (e.g., DL BWP) of the activated serving cell in response to the receiving the PDCCH. In an example, the switching from the first active DL BWP to the BWP may comprise setting the BWP as a current active DL BWP of the activated serving cell. In an example, the wireless device may deactivate the first active DL BWP in response to the switching.

In an example, the base station may configure the wireless device with a default DL BWP ID. In an example, the BWP may not be indicated (or identified) by the default DL BWP ID. In an example, when the base station configures the wireless device with the default DL BWP ID and the MAC entity of the wireless device switches from the first active DL BWP of the activated serving cell to the BWP, the wireless device may start or restart the BWP inactivity timer associated with the BWP (e.g., the current active DL BWP) in response to the BWP not being the default DL BWP (or the BWP not being indicated by the default DL BWP ID).

In an example, the base station may not configure the wireless device with a default DL BWP ID. In an example, the BWP may not be the initial downlink BWP of the activated serving cell. In an example, when the base station does not configure the wireless device with the default DL BWP ID and the MAC entity of the wireless device switches from the first active DL BWP of the activated serving cell to the BWP, the wireless device may start or restart the BWP inactivity timer associated with the BWP (e.g., the current active DL BWP) in response to the BWP not being the initial downlink BWP.

In an example, when configured with carrier aggregation (CA), a base station may configure a wireless device with a secondary cell (e.g., SCell). In an example, a wireless device may receive an SCell Activation/Deactivation MAC CE activating the secondary cell. In an example, the secondary cell may be deactivated prior to the receiving the SCell Activation/Deactivation MAC CE. In an example, when a wireless device receives the SCell Activation/Deactivation MAC CE activating the secondary cell, the wireless device may activate a downlink BWP of the secondary cell and activate an uplink BWP of the secondary cell in response to the secondary cell being deactivated prior to the receiving the SCell Activation/Deactivation MAC CE. In an example, the downlink BWP may be indicated by the firstActive-DownlinkBWP-Id. In an example, the uplink BWP may be indicated by the firstActiveUplinkBWP-Id.

In an example, the base station may configure a wireless device with a BWP inactivity timer for the activated secondary cell. In an example, an sCellDeactivationTimer associated with the activated secondary cell may expire. In an example, in response to the sCellDeactivationTimer expiring, the wireless device may stop the BWP inactivity timer associated with the activated secondary cell. In an example, in response to the sCellDeactivationTimer expiring, the wireless device may deactivate an active downlink BWP (e.g., and an active UL BWP if exists) associated with the activated secondary cell.

In an example, when configured for operation in bandwidth parts (BWPs) of a serving cell, a wireless device (e.g., a UE) may be configured, by higher layers with a parameter BWP-Downlink, a first set of BWPs (e.g., at most four BWPs) for receptions, by the UE, (e.g., DL BWP set) in a downlink (DL) bandwidth for the serving cell.

In an example, when configured for operation in bandwidth parts (BWPs) of a serving cell, a wireless device (e.g., a UE) may be configured, by higher layers with a parameter BWP-Uplink, a second set of BWPs (e.g., at most four BWPs) for transmissions, by the UE, (e.g., UL BWP set) in a uplink (UL) bandwidth for the serving cell.

In an example, the base station may not provide a wireless device with a higher layer parameter initialDownlinkBWP. In response to the not providing the wireless device with the higher layer parameter initialDownlinkBWP, an initial active DL BWP may be defined, for example, by a location and a number of contiguous PRBs, and a subcarrier spacing (SCS) and a cyclic prefix for PDCCH reception in a control resource set (CORESET) for Type-PDCCH common search space (CSS) set. In an example, the contiguous PRBs may start from a first PRB with a lowest index among PRBs of the CORESET for the Type0-PDCCH CSS set.

In an example, the base station may provide a wireless device with a higher layer parameter initialDownlinkBWP. In an example, an initial active DL BWP may be provided by the higher layer parameter initialDownlinkBWP in response to the providing.

In an example, for operation on a cell (e.g., primary cell, secondary cell), a base station may provide a wireless device with an initial active UL BWP by a higher layer parameter (e.g., initialUplinkBWP). In an example, when configured with a supplementary uplink carrier (SUL), the base station may provide the wireless device with a second initial active uplink BWP on the supplementary uplink carrier by a second higher layer parameter (e.g., initialUplinkBWP in supplementaryUplink).

In an example, a wireless device may have a dedicated BWP configuration.

In an example, in response to the wireless device having the dedicated BWP configuration, the wireless device may be provided by a higher layer parameter (e.g., firstActive-DownlinkBWP-Id). The higher layer parameter may indicate a first active DL BWP for receptions.

In an example, in response to the wireless device having the dedicated BWP configuration, the wireless device may be provided by a higher layer parameter (e.g., firstActiveUplinkBWP-Id). The higher layer parameter may indicate a first active UL BWP for transmissions on a carrier (e.g., SUL, NUL) of a serving cell (e.g., primary cell, secondary cell).

In an example, for a DL BWP in a first set of BWPs or an UL BWP in a second set of BWPs, a base station may configure a wireless device for a serving cell with at least one of: a subcarrier spacing provided by a higher layer parameter subcarrierSpacing; a cyclic prefix provided by a higher layer parameter cyclicPrefix; an index in the first set of BWPs or in the second set of BWPs by a higher layer parameter bwp-Id (e.g., bwp-Id); a third set of BWP-common and a fourth set of BWP-dedicated parameters by a higher layer parameter bwp-Common and a higher layer parameter bwp-Dedicated, respectively. In an example, the base station may further configure the wireless device for the serving cell with a common RB $N_{BWP}^{start} = O_{carrier} + RB_{start}$ and a number of contiguous $N_{BWP}^{size} = L_{RB}$ provided by a higher layer parameter locationAndBandwidth. In an example, the higher layer parameter locationAndBandwidth may indicate an offset $RB_{start}$ and a length $L_{RB}$ as Resource indicator value (RIV), setting $N_{BWP}^{size} = 275$, and a value $O_{carrier}$ provided by a higher layer parameter offsetToCarrier for the higher layer parameter subcarrierSpacing In an example, for an unpaired spectrum operation, a DL BWP, from a first set of BWPs, with a DL BWP index provided by a higher layer parameter bwp-Id (e.g., bwp-Id) may be linked with an UL BWP, from a second set of BWPs, with an UL BWP index provided by a higher layer parameter bwp-Id (e.g., bwp-Id) when the DL BWP index of the DL BWP is same as the UL BWP index of the UL BWP.

In an example, a DL BWP index of a DL BWP may be same as an UL BWP index of an UL BWP. In an example, for an unpaired spectrum operation, a wireless device may not expect to receive a configuration (e.g., RRC configuration), where a first center frequency for the DL BWP is different from a second center frequency for the UL BWP in response to the DL BWP index of the DL BWP being the same as the UL BWP index of the UL BWP.

In an example, for a DL BWP in a first set of BWPs on a serving cell (e.g., primary cell), a base station may configure a wireless device with one or more control resource sets (CORESETs) for every type of common search space (CSS) sets and for UE-specific search space (USS). In an example, the wireless device may not expect to be configured without a common search space set on a primary cell (or on the PSCell), in an active DL BWP.

In an example, a base station may provide a wireless device with a higher layer parameter controlResourceSetZero and a higher layer parameter searchSpaceZero in a higher layer parameter PDCCH-ConfigSIB1 or a higher layer parameter PDCCH-ConfigCommon. In an example, in response to the providing, the wireless device may determine a CORESET for a search space set from the higher layer parameter controlResourcesetZero, and may determine corresponding PDCCH monitoring occasions. An active DL BWP of a serving cell may not be an initial DL BWP of the serving cell. When the active DL BWP is not the initial DL BWP of the serving cell, the wireless device may determine the PDCCH monitoring occasions for the search space set in response to a bandwidth of the CORESET being within the active DL BWP and the active DL BWP having the same SCS configuration and same cyclic prefix as the initial DL BWP.

In an example, for an UL BWP in a second set of BWPs of a serving cell (e.g., primary cell or PUCCH SCell), a base station may configure a wireless device with one or more resource sets (e.g., time-frequency resources/occasions) for PUCCH transmissions.

In an example, a UE may receive PDCCH and PDSCH in a DL BWP according to a configured subcarrier spacing and CP length for the DL BWP.

In an example, a UE may transmit PUCCH and PUSCH in an UL BWP according to a configured subcarrier spacing and CP length for the UL BWP.

In an example, a bandwidth part indicator field may be configured in a DCI format (e.g., DCI format 1_1). In an example, a value of the bandwidth part indicator field may indicate an active DL BWP, from a first set of BWPs, for one or more DL receptions. In an example, the bandwidth part indicator field may indicate a DL BWP different from the active DL BWP. In an example, in response to the bandwidth part indicator field indicating the DL BWP different from the active DL BWP, the wireless device may set the DL BWP as a current active DL BWP. In an example, the setting the DL BWP as a current active DL BWP may comprise activating the DL BWP and deactivating the active DL BWP.

In an example, a bandwidth part indicator field may be configured in a DCI format (e.g., DCI format 0_1). In an example, a value of the bandwidth part indicator field may indicate an active UL BWP, from a second set of BWPs, for one or more UL transmissions. In an example, the bandwidth part indicator field may indicate an UL BWP different from the active UL BWP. In an example, in response to the bandwidth part indicator field indicating the UL BWP different from the active UL BWP, the wireless device may set the UL BWP as a current active UL BWP. In an example, the setting the UL BWP as a current active UL BWP may comprise activating the UL BWP and deactivating the active UL BWP.

In an example, a DCI format (e.g., DCI format 1_1) indicating an active DL BWP change may comprise a time domain resource assignment field. The time domain resource assignment field may provide a slot offset value for a PDSCH reception. In an example, the slot offset value may be smaller than a delay required by a wireless device for the active DL BWP change. In an example, in response to the slot offset value being smaller than the delay required by the wireless device for the active DL BWP change, the wireless device may not expect to detect the DCI format indicating the active DL BWP change.

In an example, a DCI format (e.g., DCI format 0_1) indicating an active UL BWP change may comprise a time domain resource assignment field. The time domain resource assignment field may provide a slot offset value for a PUSCH transmission. In an example, the slot offset value may be smaller than a delay required by a wireless device for the active UL BWP change. In an example, in response to the slot offset value being smaller than the delay required by the wireless device for the active UL BWP change, the wireless device may not expect to detect the DCI format indicating the active UL BWP change.

In an example, a wireless device may receive a PDCCH in a slot of a scheduling cell. In an example, the wireless device may detect a DCI format (e.g., DCI format 1_1), in the PDCCH of the scheduling cell, indicating an active DL BWP change for a serving cell. In an example, the DCI format may comprise a time domain resource assignment field. The time domain resource assignment field may provide a slot offset value for a PDSCH transmission. In an example, the slot offset value may indicate a second slot. In an example, in response to the detecting the DCI format indicating the active DL BWP change, the wireless device may not be required to receive or transmit in the serving cell during a time duration from the end of a third symbol of the slot until the beginning of the second slot.

In an example, a wireless device may receive a PDCCH in a slot of a scheduling cell. In an example, the wireless device may detect a DCI format (e.g., DCI format 0_1), in the PDCCH of the scheduling cell, indicating an active UL BWP change for a serving cell. In an example, the DCI format may comprise a time domain resource assignment field. The time domain resource assignment field may provide a slot offset value for a PUSCH transmission. In an example, the slot offset value may indicate a second slot. In an example, in response to the detecting the DCI format indicating the active UL BWP change, the wireless device may not be required to receive or transmit in the serving cell during a time duration from the end of a third symbol of the slot until the beginning of the second slot.

In an example, a UE may expect to detect a DCI format 0_1 indicating active UL BWP change/switch, or a DCI format 1_1 indicating active DL BWP change/switch, when a corresponding PDCCH for the detected DCI format 0_1 or the detected DCI format 11 is received within first 3 symbols of a slot. In an example, a UE may not expect to detect a DCI format 0_1 indicating active UL BWP change/switch, or a DCI format 1_1 indicating active DL BWP change/switch, if a corresponding PDCCH is received after first 3 symbols of a slot.

In an example, an active DL BWP change may comprise switching from the active DL BWP of a serving cell to a DL BWP of the serving cell. In an example, the switching from the active DL BWP to the DL BWP may comprise setting the DL BWP as a current active DL BWP and deactivating the active DL BWP.

In an example, an active UL BWP change may comprise switching from the active UL BWP of a serving cell to a UL BWP of the serving cell. In an example, the switching from the active UL BWP to the UL BWP may comprise setting the UL BWP as a current active UL BWP and deactivating the active UL BWP.

In an example, for a serving cell (e.g., PCell, SCell), a base station may provide a wireless device with a higher layer parameter defaultDownlinkBWP-Id. In an example, the higher layer parameter defaultDownlinkBWP-Id may indicate a default DL BWP among the first set of (configured) BWPs of the serving cell.

In an example, a base station may not provide a wireless device with a higher layer parameter defaultDownlinkBWP-Id. In response to not being provided by the higher layer parameter defaultDownlinkBWP-Id, the wireless device may set the initial active DL BWP as a default DL BWP. In an example, in response to not being provided by the higher layer parameter defaultDownlinkBWP-Id, the default DL BWP may be the initial active DL BWP.

In an example, a base station may provide a wireless device with a higher layer parameter BWP-InactivityTimer. In an example, the higher layer parameter BWP-InactivityTimer may indicate a BWP inactivity timer with a timer value for a serving cell (e.g., primary cell, secondary cell). In an example, when provided with the higher layer parameter BWP-InactivityTimer and the BWP inactivity timer is running, the wireless device may decrement the BWP inactivity timer at the end of a subframe for frequency range 1 (e.g., FR1, sub-6 GHz) or at the end of a half subframe for frequency range 2 (e.g., FR2, millimeter-waves) in response to not restarting the BWP inactivity timer during an interval of the subframe for the frequency range 1 or an interval of the half subframe for the frequency range 2.

In an example, a wireless device may perform an active DL BWP change for a serving cell in response to an expiry of a BWP inactivity timer associated with the serving cell. In an example, the wireless device may not be required to receive or transmit in the serving cell during a time duration from the beginning of a subframe for frequency range 1 or of half of a subframe for frequency range 2. The time duration may start/be immediately after the expiry of the BWP inactivity timer and may last until the beginning of a slot where the wireless device can receive and/or transmit.

In an example, a base station may provide a wireless device with a higher layer parameter firstActiveDownlinkBWP-Id of a serving cell (e.g., secondary cell). In an example, the higher layer parameter firstActiveDownlinkBWP-Id may indicate a DL BWP on the serving cell (e.g., secondary cell). In an example, in response to the being provided by the higher layer parameter firstActiveDownlinkBWP-Id, the wireless device may use the DL BWP as a first active DL BWP on the serving cell.

In an example, a base station may provide a wireless device with a higher layer parameter firstActiveUplinkBWP-Id on a carrier (e.g., SUL, NUL) of a serving cell (e.g., secondary cell). In an example, the higher layer parameter firstActiveUplinkBWP-Id may indicate an UL BWP. In an example, in response to the being provided by the higher layer parameter firstActiveUplinkBWP-Id, the wireless device may use the UL BWP as a first active UL BWP on the carrier of the serving cell.

In an example, for paired spectrum operation, a UE may not expect to transmit a PUCCH with HARQ-ACK information on a PUCCH resource indicated by a DCI format 1_0 or a DCI format 1_1 if the UE changes its active UL BWP on a primary cell between a time of a detection of the DCI format 1_0 or the DCI format 1_1 and a time of a corresponding PUCCH transmission with the HARQ-ACK information.

In an example, a UE may not monitor PDCCH when the UE performs RRM measurements over a bandwidth that is not within the active DL BWP for the UE.

In an example, a DL BWP index (ID) may be an identifier for a DL BWP. One or more parameters in an RRC configuration may use the DL BWP-ID to associate the one or more parameters with the DL BWP. In an example, the DL BWP ID=0 may be associated with the initial DL BWP.

In an example, an UL BWP index (ID) may be an identifier for an UL BWP. One or more parameters in an RRC configuration may use the UL BWP-ID to associate the one or more parameters with the UL BWP. In an example, the UL BWP ID=0 may be associated with the initial UL BWP.

If a higher layer parameter firstActiveDownlinkBWP-Id is configured for an SpCell, a higher layer parameter firstActiveDownlinkBWP-Id indicates an ID of a DL BWP to be activated upon performing the reconfiguration.

If a higher layer parameter firstActiveDownlinkBWP-Id is configured for an SCell, a higher layer parameter firstActiveDownlinkBWP-Id indicates an ID of a DL BWP to be used upon MAC-activation of the SCell.

If a higher layer parameter firstActiveUplinkBWP-Id is configured for an SpCell, a higher layer parameter firstActiveUplinkBWP-Id indicates an ID of an UL BWP to be activated upon performing the reconfiguration.

If a higher layer parameter firstActiveUplinkBWP-Id is configured for an SCell, a higher layer parameter firstActiveUplinkBWP-Id indicates an ID of an UL BWP to be used upon MAC-activation of the SCell.

In an example, a wireless device, to execute a reconfiguration with sync, may consider an uplink BWP indicated in a higher layer parameter firstActiveUplinkBWP-Id to be an active uplink BWP.

In an example, a wireless device, to execute a reconfiguration with sync, may consider a downlink BWP indicated in a higher layer parameter firstActiveDownlinkBWP-Id to be an active downlink BWP.

Example of a BFR Procedure.

In an example, a wireless device or a gNB may trigger a beam failure recovery mechanism. A wireless device may trigger a beam failure recovery (BFR) procedure, e.g., when at least a beam failure occurs. In an example, a beam failure may occur when quality of beam pair link(s) of at least one PDCCH falls below a threshold. The threshold may be a RSRP value (e.g., −140 dbm, −110 dbm) or a SINR value (e.g., −3 dB, −1 dB), which may be configured in a RRC message.

Figure 16A:
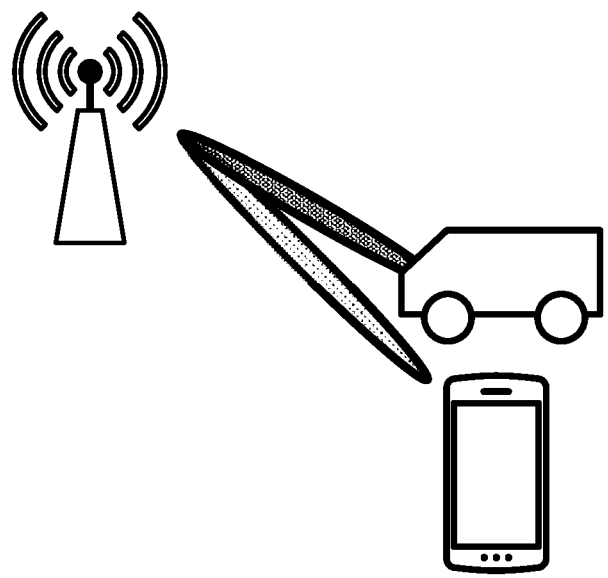
FIG. 16A and FIG. 16B are examples of downlink beam failure as per an aspect of an embodiment of the present disclosure.

FIG. 16A shows example of a first beam failure scenario. In the example, a gNB may transmit a PDCCH from a transmission (Tx) beam to a receiving (Rx) beam of a wireless device from a TRP. When the PDCCH on the beam pair link (between the Tx beam of the gNB and the Rx beam of the wireless device) have a lower-than-threshold RSRP/SINR value due to the beam pair link being blocked (e.g., by a moving car or a building), the gNB and the wireless device may start a beam failure recovery procedure on the TRP.

Figure 16B:
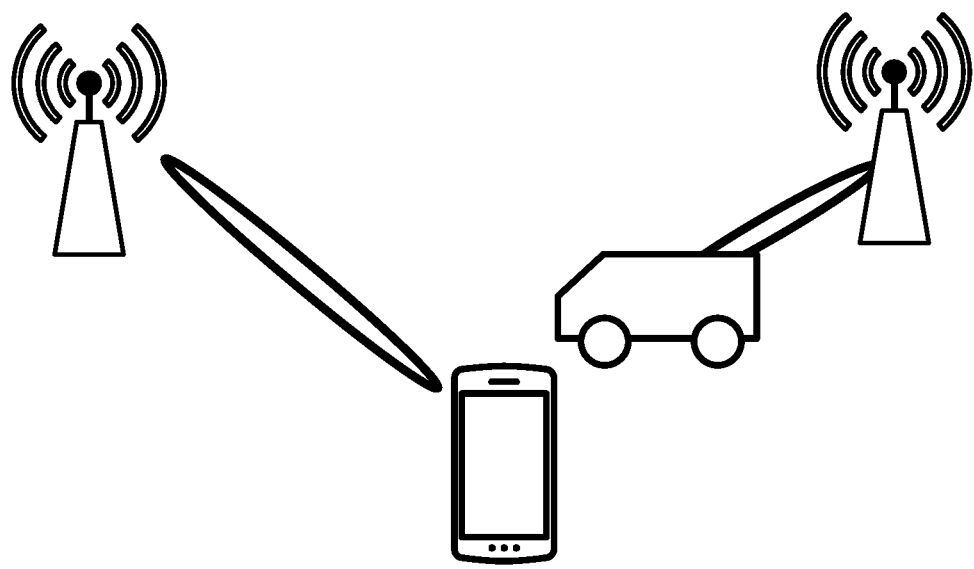

FIG. 16B shows example of a second beam failure scenario. In the example, the gNB may transmit a PDCCH from a beam to a wireless device from a first TRP. When the PDCCH on the beam is blocked, the gNB and the wireless device may start a beam failure recovery procedure on a new beam on a second TRP.

In an example, a wireless device may measure quality of beam pair link using one or more RSs. The one or more RSs may be one or more SSBs, or one or more CSI-RS resources. A CSI-RS resource may be identified by a CSI-RS resource index (CRI). In an example, quality of beam pair link may be defined as a RSRP value, or a reference signal received quality (e.g. RSRQ) value, and/or a CSI (e.g., SINR) value measured on RS resources. In an example, a gNB may indicate whether an RS resource, used for measuring beam pair link quality, is QCLed (Quasi-Co-Located) with DM-RSs of a PDCCH. The RS resource and the DM-RSs of the PDCCH may be called QCLed when the channel characteristics from a transmission on an RS to a wireless device, and that from a transmission on a PDCCH to the wireless device, are similar or same under a configured criterion. In an example, The RS resource and the DM-RSs of the PDCCH may be called QCLed when doppler shift and/or doppler shift of the channel from a transmission on an RS to a wireless device, and that from a transmission on a PDCCH to the wireless device, are same.

In an example, a gNB may transmit one or more messages comprising configuration parameters of an uplink physical channel or signal for transmitting a beam failure recovery request. The uplink physical channel or signal may be based on one of: a contention-free PRACH (BFR-PRACH), which may be a resource orthogonal to resources of other PRACH transmissions; a PUCCH (BFR-PUCCH); a PUSCH (e.g., BFR MAC-CE) and/or a contention-based PRACH resource (CF-PRACH). Combinations of these candidate signal/channels may be configured by the gNB. In an example, when configured with multiple resources for a BFR signal, a wireless device may autonomously select a first resource for transmitting the BFR signal. In an example, when configured with a BFR-PRACH resource, a BFR-PUCCH resource, and a CF-PRACH resource, the wireless device may select the BFR-PRACH resource for transmitting the BFR signal. In an example, when configured with a BFR-PRACH resource, a BFR-PUCCH resource, and a CF-PRACH resource, the gNB may transmit a message to the wireless device indicating a resource for transmitting the BFR signal.

Example of a BFR Procedure.

Figure 17:
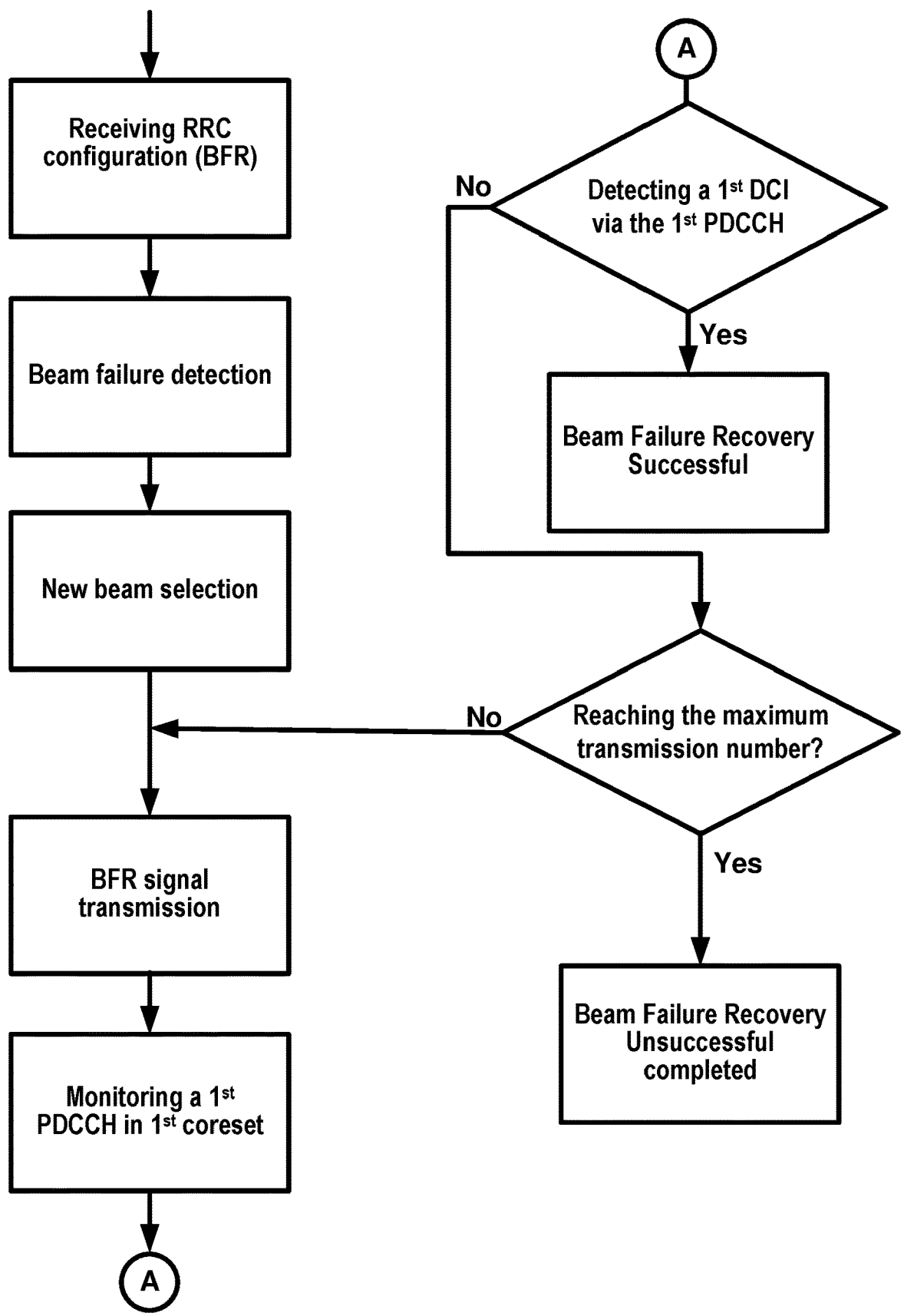
FIG. 17 is an example flowchart of a downlink beam failure recovery procedure as per an aspect of an embodiment of the present disclosure.

FIG. 17 shows an example flowchart of a BFR procedure. A wireless device may receive one or more RRC messages comprising BFR parameters. The one or more RRC messages may comprise an RRC message (e.g. RRC connection reconfiguration message, or RRC connection reestablishment message, or RRC connection setup message). The wireless device may detect at least one beam failure according to at least one of BFR parameters. The wireless device may start a first timer if configured in response to detecting the at least one beam failure. The wireless device may select a selected beam in response to detecting the at least one beam failure. The selected beam may be a beam with good channel quality (e.g., RSRP, SINR, or BLER) from a set of candidate beams. The candidate beams may be identified by a set of reference signals (e.g., SSBs, or CSI-RSs). The wireless device may transmit at least a first BFR signal to a gNB in response to the selecting the selected beam. The at least first BFR signal may be associated with the selected beam. The at least first BFR signal may be a preamble transmitted on a PRACH resource, or a beam failure recovery request (e.g., similar to scheduling request) signal transmitted on a PUCCH resource, or a beam indication (e.g., BFR MAC CE) transmitted on a PUSCH resource. The wireless device may transmit the at least first BFR signal with a transmission beam corresponding to a receiving beam associated with the selected beam. The wireless device may start a response window in response to transmitting the at least first BFR signal. In an example, the response window may be a timer with a value configured by the gNB. When the response window is running, the wireless device may monitor a PDCCH in a first coreset (e.g., UE specific or dedicated to the wireless device or wireless device specific). The first coreset may be associated with the BFR procedure. In an example, the wireless device may monitor the PDCCH in the first coreset in response to transmitting the at least first BFR signal. The wireless device may receive a first DCI via the PDCCH in the first coreset when the response window is running. The wireless device may consider the BFR procedure successfully completed when receiving the first DCI via the PDCCH in the first coreset before the response window expires. The wireless device may stop the first timer if configured in response to the BFR procedure successfully being completed. The wireless device may stop the response window in response to the BFR procedure successfully being completed.

In an example, when the response window expires, and the wireless device does not receive the DCI, the wireless device may increment a transmission number, wherein, the transmission number is initialized to a first number (e.g., 0, 1) before the BFR procedure is initiated. If the transmission number indicates a number less than the configured maximum transmission number, the wireless device may repeat one or more actions comprising at least one of: a BFR signal transmission; starting the response window; monitoring the PDCCH; incrementing the transmission number if no response received during the response window is running. If the transmission number indicates a number equal or greater than the configured maximum transmission number, the wireless device may declare the BFR procedure is unsuccessfully completed.

Example of BFR Procedure

In an example, a base station may configure a wireless device with one or more first reference signals (e.g., SS/PBCH block, CSI-RS, etc.) for beam failure detection. In an example, the wireless device may declare/detect a beam failure based on the one or more first reference signals (RSs) when a number of beam failure instance indications from a physical layer of the wireless device to a higher layer (e.g., MAC layer) of the wireless device reaches a configured threshold (e.g., beamFailureInstanceMaxCount) before an expiry of a configured timer (e.g., beamFailureDetectionTimer).

In an example, an SSB (e.g., cell-defining SSB) may be associated with an initial downlink BWP of a cell. The wireless device may detect a beam failure based on the SSB in response to the SSB being associated with the initial downlink BWP. In an example, the base station may configure the SSB, for detecting the beam failure, for the initial downlink BWP. In an example, a downlink BWP of the cell may comprise the SSB. The base station may configure the SSB, for detecting the beam failure, for the downlink BWP based on the downlink BWP comprising the SSB. The one or more first RSs may comprise the SSB.

In an example, a downlink BWP of the cell may not comprise the SSB. In response to the downlink BWP not comprising the SSB, the wireless device may detect a beam failure for the downlink BWP based on one or more CSI-RSs. The one or more first RSs may comprise the one or more CSI-RSs.

In an example, a wireless device may trigger a beam failure recovery by initiating a random-access procedure on a primary cell based on detecting a beam failure. In an example, a wireless device may select a suitable/candidate beam for a beam failure recovery based on detecting a beam failure. In an example, the wireless device may determine that the beam failure recovery is complete based on completion of the random-access procedure.

Figure 18:
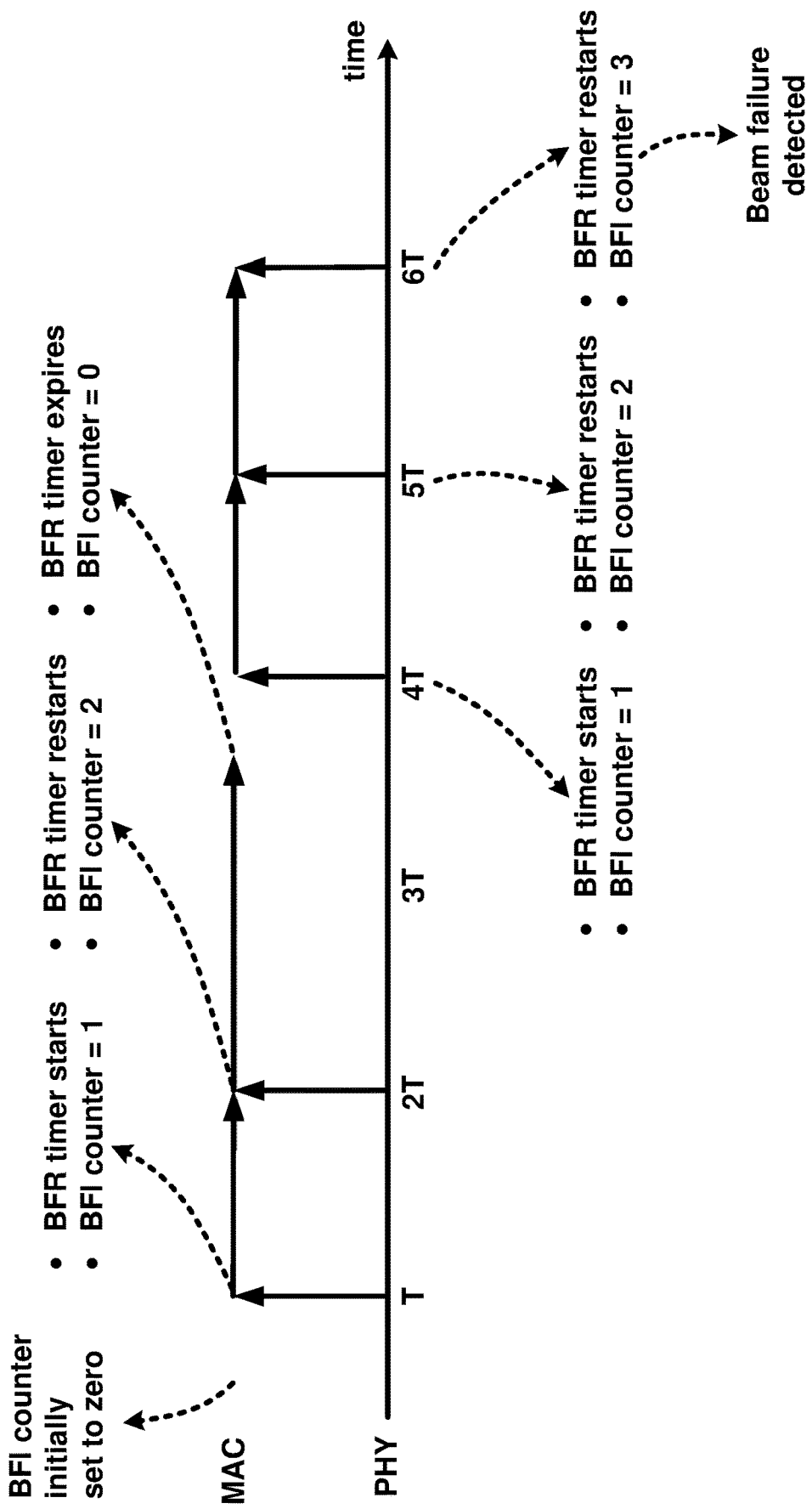
FIG. 18 is an example of downlink beam failure instance indication as per an aspect of an embodiment of the present disclosure.

FIG. 18 shows an example of a downlink beam failure recovery procedure as per an aspect of an embodiment of the present disclosure.

In an example, a base station may configure a medium-access control (MAC) entity of a wireless device with a beam failure recovery procedure by an RRC. The wireless device may detect a beam failure based on one or more first RSs (e.g., SSB, CSI-RS). The beam failure recovery procedure may be used for indicating to the base station of a candidate RS (e.g., SSB or CSI-RS) when the wireless device detects the beam failure. In an example, the wireless device may detect the beam failure based on counting a beam failure instance indication from a lower layer of the wireless device (e.g. PHY layer) to the MAC entity.

In an example, a base station may reconfigure an information element (IE) beamFailureRecoveryConfig during an ongoing random-access procedure for a beam failure recovery. In response to the reconfiguring the IE beamFailureRecoveryConfig, the MAC entity may stop the ongoing random-access procedure. Based on the stopping the ongoing random-access procedure, the wireless device may initiate a second random-access procedure for the beam failure recovery using/with the reconfigured IE beamFailureRecoveryConfig.

In an example, an RRC may configure a wireless device with one or more parameters in an IE BeamFailureRecoveryConfig and an IE RadioLinkMonitoringConfig for a beam failure detection and recovery procedure. The one or more parameters may comprise at least: beamFailureInstanceMaxCount for a beam failure detection; beamFailureDetectionTimer for the beam failure detection; beamFailureRecoveryTimer for a beam failure recovery; rsrp-ThresholdSSB: an RSRP threshold for the beam failure recovery; PowerRampingStep for the beam failure recovery; powerRampingStepHighPriority for the beam failure recovery; preambleReceivedTargetPower for the beam failure recovery; preambleTransMax for the beam failure recovery; scalingFactorBI for the beam failure recovery; ssb-per-RACH-Occasion for the beam failure recovery; ra-OccasionList for the beam failure recovery; ra-ssb-OccasionMaskIndex for the beam failure recovery; prach-ConfigurationIndex for the beam failure recovery; and ra-ResponseWindow. The ra-ResponseWindow may be a time window to monitor at least one response (e.g., random-access response, BFR response) for the beam failure recovery. In an example, the wireless device may use a contention-free random-access preamble for the beam failure recovery.

FIG. 18 shows an example of a beam failure instance (BFI) indication. In an example, a wireless device may use at least one UE variable for a beam failure detection. In an example, BFI_COUNTER may be one of the at least one UE variable. The BFI_COUNTER may be a counter for a beam failure instance indication. The wireless device may set the BFI_COUNTER initially to zero.

In an example, a MAC entity of a wireless device may receive a beam failure instance (BFI) indication from a lower layer (e.g. PHY) of the wireless device. Based on the receiving the BFI indication, the MAC entity of the wireless device may start or restart the beamFailureDetectionTimer (e.g., BFR timer in FIG. 18). Based on the receiving the BFI indication, the MAC entity of the wireless device may increment BFI_COUNTER by one (e.g., at time T, 2T, 5T in FIG. 18).

In an example, the BFI_COUNTER may be equal to or greater than the beamFailureInstanceMaxCount. Based on the BFI_COUNTER being equal to or greater than the beamFailureInstanceMaxCount, the MAC entity of the wireless device may initiate a random-access procedure (e.g. on an SpCell) for a beam failure recovery.

In an example, in FIG. 18, the wireless device may initiate the random-access procedure at time 6T, when the BFI_COUNTER is equal to or greater than the beamFailureInstanceMaxCount (e.g., 3).

In an example, the wireless device may select an uplink carrier (e.g., SUL, NUL) to perform the random-access procedure for the beam failure recovery. In an example, the base station may configure an active uplink BWP of the selected uplink carrier with IE beamFailureRecoveryConfig. When the wireless device initiates the random-access procedure for the beam failure recovery, based on the active uplink BWP of the selected uplink carrier being configured with the IE beamFailureRecoveryConfig, the wireless device may start, if configured, the beamFailureRecoveryTimer. When the wireless device initiates the random-access procedure for the beam failure recovery, based on the active uplink BWP of the selected uplink carrier being configured with the IE beamFailureRecoveryConfig, the wireless device may apply one or more parameters (e.g., powerRampingStep, preambleReceivedTargetPower, and preambleTransMax) configured in the IE BeamFailureRecoveryConfig for the random-access procedure.

In an example, the base station may configure powerRampingStepHighPriority in the IE beamFailureRecoveryConfig. When the wireless device initiates the random-access procedure for the beam failure recovery and the active uplink BWP of the selected uplink carrier is configured with the IE beamFailureRecoveryConfig, based on the powerRampingStepHighPriority being configured in the IE beamFailureRecoveryConfig, the wireless device may set PREAMBLE_POWER_RAMPING_STEP to the powerRampingStepHighPriority.

In an example, the base station may not configure powerRampingStepHighPriority in the IE beamFailureRecoveryConfig. When the wireless device initiates the random-access procedure for the beam failure recovery and the active uplink BWP of the selected uplink carrier is configured with the IE beamFailureRecoveryConfig, based on the powerRampingStepHighPriority not being configured in the IE beamFailureRecoveryConfig, the wireless device may set PREAMBLE_POWER_RAMPING_STEP to the powerRampingStep.

In an example, the base station may configure scalingFactorBI in the IE beamFailureRecoveryConfig. When the wireless device initiates the random-access procedure for the beam failure recovery and the active uplink BWP of the selected uplink carrier is configured with the IE beamFailureRecoveryConfig, based on the scalingFactorBI being configured in the IE beamFailureRecoveryConfig, the wireless device may set SCALING_FACTOR_BI to the scalingFactorBI.

In an example, the base station may configure the active uplink BWP of the selected uplink carrier with the IE beamFailureRecoveryConfig. Based on the active uplink BWP of the selected uplink carrier being configured with the IE beamFailureRecoveryConfig, the random-access procedure may be a contention-free random-access procedure.

In an example, the base station may not configure the active uplink BWP of the selected uplink carrier with the IE beamFailureRecoveryConfig. Based on the active uplink BWP of the selected uplink carrier not being configured with the IE beamFailureRecoveryConfig, the random-access procedure may be a contention-based random-access procedure.

In an example, the beamFailureDetectionTimer may expire. Based on the beamFailureDetectionTimer expiring, the MAC entity of the wireless device may set the BFI_COUNTER to zero (e.g., in FIG. 18, between time 3T and 4T).

In an example, a base station may configure a wireless device with one or more first RSs (e.g., SS/PBCH block, CSI-RS, etc.) for a beam failure detection (e.g., by RadioLinkMonitoringRS in the IE RadioLinkMonitoringConfig). In an example, the base station may reconfigure the beamFailureDetectionTimer or the beamFailureInstanceMaxCount or at least one RS of the one or more first RSs by higher layers (e.g., RRC). Based on the reconfiguring, the MAC entity of the wireless device may set the BFI_COUNTER to zero.

In an example, the wireless device may complete the random-access procedure (e.g., contention-free random-access or contention-based random-access) for the beam failure recovery successfully. Based on the completing the random-access procedure successfully, the wireless device may determine/consider that the beam failure recovery is successfully completed.

In an example, the wireless device may complete the random-access procedure for the beam failure recovery successfully. Based on the completing the random-access procedure successfully, the wireless device may, if configured, stop the beamFailureRecoveryTimer. Based on the completing the random-access procedure successfully, the wireless device may set the BFI_COUNTER to zero.

In an example, the beamFailureRecovery Timer may be running. In an example, the base station may not configure the wireless device with the beamFailureRecoveryTimer. In an example, the base station may provide the wireless device with one or more second RSs (e.g., SS/PBCH blocks, periodic CSI-RSs, etc.) for a beam failure recovery by a higher layer parameter candidateBeamRSList in the IE beamFailureRecoveryConfig. In an example, the base station may provide the wireless device with one or more uplink resources (e.g., contention-free random-access resources) for a beam failure recovery request (BFRQ) used in the beam failure recovery by a higher layer (e.g., RRC) parameter (e.g., candidateBeamRSList, ssb-perRACH-Occasion, ra-ssb-OccasionMaskIndex in the IE beamFailureRecoveryConfig). An uplink resource of the one or more uplink resources may be associated with a candidate RS (e.g., SSB, CSI-RS) of the one or more second RSs. In an example, the association between the uplink resource and the candidate RS may be one-to-one.

In an example, at least one RS among the one or more second RSs may have a RSRP (e.g., SS-RSRP, CSI-RSRP) higher than a second threshold (e.g., rsrp-ThresholdSSB, rsrp-ThresholdCSI-RS). In an example, the wireless device may select a candidate RS among the at least one RS for the beam failure recovery.

In an example, the candidate RS may be a CSI-RS. In an example, there may be no ra-PreambleIndex associated with the candidate RS. Based on the candidate RS being the CSI-RS and no ra-PreambleIndex being associated with the candidate RS, the MAC entity of the wireless device may set PREAMBLE_INDEX to an ra-PreambleIndex. The ra-PreambleIndex may be associated/corresponding to an SSB in the one or more second RSs (e.g., indicated candidateBeamRSList). The SSB may be quasi-collocated with the candidate RS.

In an example, the candidate RS may be a CSI-RS and there may be ra-PreambleIndex associated with the candidate RS. In an example, the candidate RS may be an SSB. The MAC entity of the wireless device may set PREAMBLE_INDEX to a ra-PreambleIndex, associated/corresponding to the candidate RS, from a set of random-access preambles for the BFRQ. In an example, a higher layer (RRC) parameter may configure the set of random-access preambles for the BFRQ for the random-access procedure for the beam failure recovery.

In an example, a MAC entity of a wireless device may transmit an uplink signal (e.g., contention-free random-access preamble) for the BFRQ. Based on the transmitting the uplink signal, the MAC entity may start a response window (e.g., ra-ResponseWindow configured in the IE BeamFailureRecoveryConfig) at a first PDCCH occasion from the end of the transmitting the uplink signal. Based on the transmitting the uplink signal, the wireless device may, while the response window is running, monitor at least one PDCCH on a search space indicated by recoverySearchSpaceId (e.g. of an SpCell) for a DCI. The DCI may be identified by an RNTI (e.g., C-RNTI, MCS-C-RNTI) of the wireless device.

In an example, the MAC entity of the wireless device may receive, from a lower layer (e.g., PHY) of the wireless device, a notification of a reception of the DCI on the search space indicated by the recoverySearchSpaceId. In an example, the wireless device may receive the DCI on a serving cell. In an example, the wireless device may transmit the uplink signal via the serving cell. In an example, the DCI may be addressed to the RNTI (e.g., C-RNTI) of the wireless device. In an example, based on the receiving the notification and the DCI being addressed to the RNTI, the wireless device may determine/consider the random-access procedure being successfully completed.

In an example, the wireless device may transmit the uplink signal on an SpCell. In an example, the response window configured in the IE BeamFailureRecoveryConfig may expire. In an example, the wireless device may not receive a DCI (or a PDCCH transmission) addressed to the RNTI of the wireless device on the search space indicated by recoverySearchSpaceId on the serving cell (e.g., before the response window expires). Based on the response window expiring and not receiving the DCI, the wireless device may consider a reception of a random-access response (e.g., BFR response) unsuccessful. Based on the response window expiring and not receiving the DCI, the wireless device may increment a transmission counter (e.g., PREAMBLE_TRANSMISSION_COUNTER) by one. In an example, the transmission counter may be equal to preambleTransMax plus one. Based on the transmission counter being equal to the preambleTransMax plus one and transmitting the uplink signal on the SpCell, the wireless device may indicate a random-access problem to upper layers (e.g., RRC).

In an example, the MAC entity of the wireless device may stop the response window (and hence monitoring for the random access response) after successful reception of the random-access response (e.g., the DCI addressed to the RNTI of the wireless device, BFR response) in response to the random access response comprising a random access preamble identifier that matches the transmitted PREAMBLE_INDEX.

In an example, based on completion of a random-access procedure, a MAC entity of a wireless device may discard explicitly signaled contention-free random-access resources except one or more uplink resources (e.g., contention-free random-access resources) for BFRQ.

Example of BFR Procedure

In an example, a base station may provide a wireless device, for a serving cell (e.g., primary cell, secondary cell), with a first set of resource configuration indexes (e.g., periodic CSI-RS resource configuration indexes) by a higher layer parameter failureDetectionResources (e.g., explicit beam failure detection configuration). The first set of resource configuration indexes may indicate one or more first RSs (e.g., CSI-RS, SS/PBCH block, etc.). The base station may configure the higher layer parameter failureDetectionResources for a downlink BWP (of configured downlink BWPs) of the serving cell. In an example, the base station may provide the wireless device, for the serving cell, with a second set of resource configuration indexes (e.g., periodic CSI-RS resource configuration indexes, SS/PBCH block indexes) by a higher layer parameter candidateBeamRSList. The second set of resource configuration indexes may indicate one or more second RSs (e.g., CSI-RS, SS/PBCH block, etc.). The base station may configure the higher layer parameter candidateBeamRSList for an uplink BWP (of configured uplink BWPs) of the serving cell. In an example, the wireless device may use the one or more first RSs and/or the one or more second RSs for radio link quality measurements on the serving cell.

In an example, a base station may not provide a wireless device with a higher layer parameter failureDetectionResources. Based on not being provided with the higher layer parameter failureDetectionResources, the wireless device may determine a first set of resource configuration indexes to include a resource configuration index (e.g., periodic CSI-RS resource configuration indexes) (e.g., implicit beam failure detection configuration). In an example, the resource configuration index may be same as an RS index in a RS set. In an example, the RS index may be indicated by a TCI state (e.g., via a higher layer parameter TCI-state). In an example, the TCI state may be used for a control resource set (coreset) that the wireless device is configured to monitor at least one PDCCH. In an example, the base station may configure the TCI state for the coreset. In an example, the TCI state may comprise two RS indexes. Based on the TCI state comprising two RS indexes, the first set of resource configuration indexes may include an RS index, of the two RS indexes, with QCL-TypeD configuration. In an example, the base station may configure the TCI state for the coreset.

In an example, the wireless device may expect the first set of resource configuration indexes to include up to two RS indexes. The wireless device may expect a single port RS in the first set of resource configuration indexes. In an example, the one or more first RSs may comprise up to two RSs indicated by the two RS indexes.

In an example, a first threshold (e.g. Qout,LR) may correspond to a default value of higher layer parameter rlmInSyncOutOfSyncThreshold. In an example, a second threshold (e.g. Qin,LR) may correspond to a value provided by higher layer parameter rsrp-ThresholdSSB in the IE BeamFailureRecoveryConfig.

In an example, a physical layer in a wireless device may assess a first radio link quality of the one or more first RSs (or the first set of resource configuration indexes) against the first threshold. In an example, a first RS of the one or more first RSs may be associated (e.g. quasi co-located) with at least one DM-RS of a PDCCH monitored by the wireless device.

In an example, the wireless device may apply the second threshold to a first L1-RSRP measurement obtained from a SS/PBCH block of the one or more second RSs (or the second set of resource configuration indexes). In an example, the wireless device may apply the second threshold to a second L1-RSRP measurement obtained from a CSI-RS of the one or more second RSs (or the second set of resource configuration indexes) after scaling a reception power of the CSI-RS with a value provided by a higher layer parameter powerControlOffsetSS.

In an example, a wireless device may assess the first radio link quality of the one or more first RSs (indicated by the first set of resource configuration indexes). A physical layer in the wireless device may provide a BFI indication to a higher layer (e.g. MAC) of the wireless device when the first radio link quality is worse than the first threshold. In non-DRX mode operation, when the first radio link quality is worse than the first threshold, the physical layer may inform the higher layer with a first periodicity. The wireless device may determine the first periodicity by the maximum between a shortest periodicity among one or more periodicities of the one or more first RSs (e.g., resource configurations in the first set) and a first value (e.g. 2 msec). The first periodicity may be defined as max (the first value, TBFD-RS,M), where TBFD-RS,M is the shortest periodicity.

In an example, in DRX mode operation, when the first radio link quality is worse than the first threshold, the physical layer may inform the higher layer with a second periodicity. N an example, the base station may configure the wireless device with a DRX_cycle_length for the DRX mode operation. The wireless device may determine the second periodicity by max (1.5*DRX_cycle_length, 1.5*TBFD-RS,M) when the DRX_cycle_length is less than or equal to 320 ms. The wireless device may determine that the second periodicity is equal to the DRX_cycle_length when the DRX_cycle_length is greater than 320 ms.

In an example, based on a request from a higher layer (e.g. MAC) of the wireless device, the wireless device may provide to the higher layer one or more candidate RSs (e.g., the periodic CSI-RS configuration indexes, the SS/PBCH blocks indexes) from the one or more second RSs (e.g., the second set) and one or more L1-RSRP measurements. In an example, each candidate RS of the one or more candidate RSs may be associated with a L1-RSRP measurement of the one or more L1-RSRP measurements. In an example, the association may be one-to-one. In an example, the one or more L1-RSRP measurements associated with the one or more candidate RSs may be larger than or equal to the second threshold. In an example, the higher layer may select a candidate RS (e.g., periodic CSI-RS resource configuration, SS/PBCH block) among the one or more candidate RSs. In an example, the candidate RS may be identified by a first RS index of the second set of resource configuration indexes. In an example, the first RS index may indicate the candidate RS.

In an example, a wireless device may be provided/configured with a control resource set (coreset) through a link to a search space set. The coreset may be UE specific or dedicated to the wireless device or wireless device specific. In an example, the wireless device may monitor the coreset for a beam failure recovery. In an example, the base station may provide the wireless device with the search space set by a higher layer parameter recoverySearchSpaceId in the IE BeamFailureRecoveryConfig. The wireless device may monitor at least one PDCCH in the control resource set.

In an example, the base station may provide the wireless device with the higher layer parameter recoverySearchSpaceId. Based on being provided with the higher layer parameter recoverySearchSpaceId, the wireless device may not expect to be provided with a second search space set for monitoring at least one PDCCH in the coreset. In an example, the coreset may be associated with the search space set provided by the higher layer parameter recoverySearchSpaceId. Based on the coreset being associated with the search space set provided by the higher layer parameter recoverySearchSpaceId, the wireless device may not expect that the coreset is associated with a second search space set.

In an example, the base station may provide the wireless device with a configuration for a transmission of an uplink signal (e.g., a PRACH transmission) by a higher layer parameter PRACH-ResourceDedicatedBFR in the IE BeamFailureRecoveryConfig. Based on the transmission of the uplink signal (e.g., the PRACH transmission) in a first slot (e.g., slot n) and, the wireless device, starting from a second slot (e.g., slot n+4), may monitor at least one PDCCH in a search space set (e.g., provided by the higher layer parameter recoverySearchSpaceId) for detection of a DCI format within a response window (e.g., ra-response-Window). In an example, the wireless device may monitor the at least one PDCCH in the search space set (or coreset) according to antenna port quasi co-location parameters associated with the candidate RS (provided by the higher layer). In an example, the response window may be configured by the IE BeamFailureRecoveryConfig. The DCI format may be configured with CRC scrambled by a RNTI (e.g., C-RNTI, MCS-C-RNTI).

In an example, when the wireless device monitors at least one PDCCH in the search space set (e.g., provided by the higher layer parameter recoverySearchSpaceId) and for a reception of corresponding PDSCH, the wireless device may assume that antenna port quasi-collocation parameters for the at least one PDCCH and the corresponding PDSCH are same as the candidate RS until the wireless device receives, by higher layers, an activation for a TCI state or a higher layer parameter TCI-StatesPDCCH-ToAddlist and/or a higher layer parameter TCI-StatesPDCCH-ToReleaseList. In an example, a DCI format received in the search space set while monitoring the at least one PDCCH may schedule the corresponding PDSCH.

In an example, after the wireless device detects the DCI format with CRC scrambled by the RNTI (e.g., C-RNTI or MCS-C-RNTI) in the search space set (e.g., provided by the higher layer parameter recoverySearchSpaceId), the wireless device may continue to monitor at least one PDCCH in the search space set until the wireless device receives an activation command (e.g., MAC CE) for a TCI state or a higher layer parameter TCI-StatesPDCCH-ToAddlist and/or a higher layer parameter TCI-StatesPDCCH-ToReleaseList.

In an example, the wireless device may perform the transmission of the uplink signal (e.g., PRACH transmission) on a serving cell (e.g., PCell, SCell). In an example, the wireless device may use a spatial filter for the transmission of the uplink signal (e.g., preamble transmission for the PRACH transmission). In an example, the wireless device may detect a DCI format, with CRC scrambled by the RNTI, in at least one PDCCH in the search space set (e.g., provided by the higher layer parameter recoverySearchSpaceId). In an example, after a first number of symbols (e.g., 28 symbols) from a last symbol of a reception of the at least one PDCCH, the wireless device may transmit a second uplink signal via PUCCH on the serving cell using the spatial filter used for the transmission of the uplink signal (e.g., the PRACH transmission) until the wireless device receives an activation command (e.g., MAC CE) for PUCCH-Spatialrelationinfo or is provided PUCCH-Spatialrelationinfo for PUCCH resource(s) for the serving cell.

In an example, after a first number of symbols (e.g., 28 symbols) from a last symbol of a reception of the at least one PDCCH, the wireless device may assume that antenna port quasi-collocation parameters for a coreset with index zero (e.g., Coreset 0) are same as the candidate RS for PDCCH monitoring in the coreset with index zero.

In an example, the base station may not provide the wireless device is with a higher layer parameter recoverySearchSpaceId. Based on not being provided with the higher layer parameter recoverySearchSpaceId, the wireless device may not initiate a contention-free random access procedure for a beam failure recovery. In an example, the wireless device may initiate a contention-based random-access procedure for a beam failure recovery based on not being provided with the higher layer parameter recoverySearchSpaceId.

In an example, a wireless device may assess a downlink link quality of a serving cell based on one or more first RSs (e.g., periodic CSI-RS, SSB, etc.) in the first set of resource configuration indexes to detect a beam failure instance (BFI).

A wireless device may estimate a first radio link quality for an RS of the one or more first RSs and compare the first radio link quality to a first threshold (Qout_LR) to access downlink radio link quality of the serving cell. The first threshold may be defined as a level at which a downlink radio level link may not be reliably received. In an example, the first threshold may correspond to a first percent (e.g., 10%) block error rate (BLER) of a hypothetical PDCCH transmission.

In an example, a wireless device may perform L1-RSRP measurements based on one or more second RSs (e.g., periodic CSI-RS, SSB, etc.) in the second set of resource configuration indexes in order to detect candidate beam (or candidate RS). An L1-RSRP measurement of the candidate beam (or candidate RS) may be better than a second threshold (e.g., indicated by higher layer parameter rsrp-ThresholdSSB, rsrp-ThresholdCSI-rs (rsrp-ThresholdSSB+power-ControlOffsetSS). UE is not required to perform candidate beam detection outside the active DL BWP.

A wireless device may perform a L1-RSRP measurement for an RS of the one or more second RSs and compare the L1-RSRP measurement to the second threshold (rsrp-ThresholdSSB, rsrp-ThresholdCSI-rs) to select at least one candidate beam (or candidate RS) for a beam failure recovery.

In an example, a wireless device may be active on a first DL BWP of a serving cell. The first DL BWP may be an active DL BWP of the serving cell based on being active on the first DL BWP. In an example, the wireless device may not perform a beam failure detection outside the active DL BWP. In an example, the wireless device may not perform a candidate beam detection outside the active DL BWP. In an example, a second DL BWP of the serving cell may be deactivated. The wireless device may not perform a beam failure detection for the second DL BWP based on the second DL BWP being deactivated. The wireless device may not perform a candidate beam detection for the second DL BWP based on the second DL BWP being deactivated.

In an example, a wireless device may estimate a first radio link quality of a CSI-RS with a first subcarrier spacing (SCS)

for a beam failure detection. In an example, a wireless device may estimate a second radio link quality of a SSB with a second subcarrier spacing (SCS) for a beam failure detection. In an example, the wireless device may not perform beam failure detection measurements based on the first SCS and the second SCS being different. In an example, the wireless device may not perform beam failure detection measurements based on the CSI-RS and the SSB being frequency division multiplexes (FDM-ed) in at least one symbol (e.g., OFDM).

Example of a Beam Failure on SCell

In existing beam failure recovery (BFR) procedures, a wireless device may perform a BFR procedure on an SpCell (e.g., PCell or PSCell). In an example, a base station may transmit, to a wireless device, one or more messages comprising configuration parameters of one or more cells. The one or more cells may comprise at least one PCell/PSCell and one or more SCells. In an example, an SpCell (e.g., PCell or PSCell) and one or more SCells may operate on different frequencies and/or different bands.

In an example, an SCell of the one or more SCells may support a multi-beam operation. In the multi-beam operation, a wireless device may perform one or more beam management procedures (e.g., a BFR procedure) on/for the SCell. The wireless device may perform a BFR procedure for the SCell when at least one of one or more beam pair links between the SCell and the wireless device fails. Existing BFR procedures may result in inefficiencies when there is a beam failure for the SCell. Existing BFR procedures may be inefficient, take a long time, or increase battery power consumption.

Example embodiments enhance existing BFR procedures to improve downlink radio efficiency and reduce uplink signaling overhead when there is a beam failure for one or more SCells. For example, an example enhanced process uses a first cell random access resources when a beam failure for an SCell of the one or more SCells occurs. In an example, downlink signaling processes are enhanced for recovery of a beam failure for an SCell. In an example, uplink signaling is enhanced for a BFR procedure of the SCell.

Example embodiments provide processes for a wireless device and a base station to enhance a BFR procedure for an SCell. Example embodiments may reduce a duration of the BFR procedure and may reduce battery power consumption.

In an example, a wireless device may be configured with an SCell by a base station. The SCell may not have uplink resources. The SCell may comprise downlink-only resources. When the wireless device detects a beam failure on the SCell. the wireless device may not transmit an uplink signal (e.g., preamble) for a BFR procedure of the SCell on the SCell in response to not having uplink resources. The wireless device may not perform a BFR procedure on the SCell. The base station may not be aware of the beam failure on the SCell in response to the wireless device not performing the BFR procedure. An example embodiment enhances BFR procedures when an SCell comprises downlink-only resources.

In an example, an SCell may operate in a high frequency (e.g. 23 GHz, 60 GHz, 70 GHz). In an example, an SpCell may operate in a low frequency (e.g. 2.4 GHz, 5 GHz). The channel condition of the SCell may be different from the channel condition of the SpCell. The wireless device may use uplink resources of the SpCell to transmit a preamble for a beam failure recovery request for the SCell, to improve robustness of transmission of the preamble. An example embodiment enhances BFR procedures when an SCell operates in a different frequency than PCell. An example embodiment enhances BFR procedures when an SCell used uplink resources (e.g., random access resources, PUCCH resources, PUSCH resources, uplink BWPs of the PCell) of the PCell for a BFR procedure of the SCell.

Figure 19:
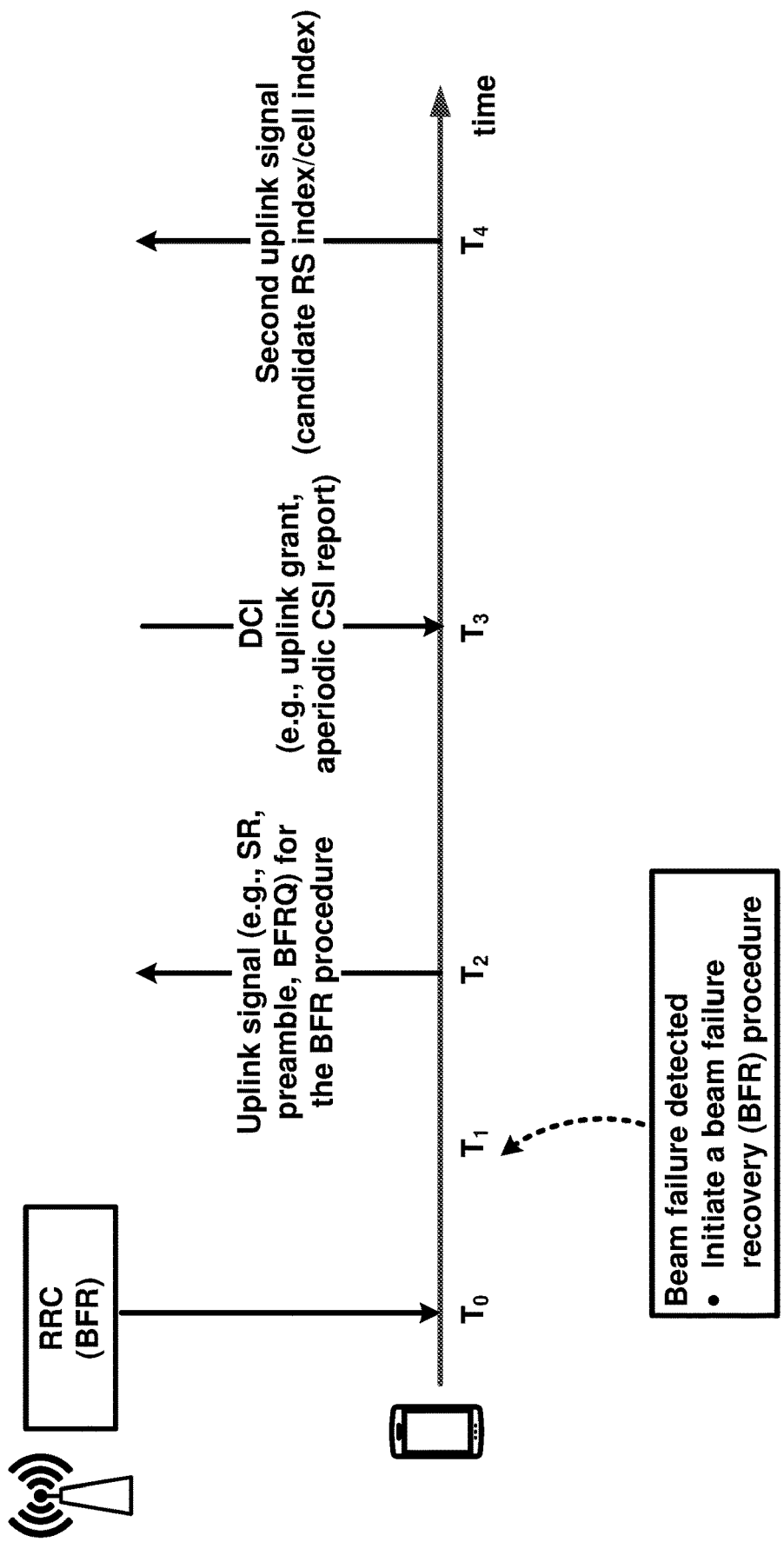
FIG. 19 is an example of downlink beam failure recovery procedure as per an aspect of an embodiment of the present disclosure.

FIG. 19 shows an example of a downlink beam failure recovery procedure of a secondary cell as per an aspect of an embodiment of the present disclosure.

In an example, a wireless device may receive, from a base station, one or more messages (at time T0 in FIG. 19). The one or more messages may comprise one or more configuration parameters for a plurality of cells. The plurality of cells may comprise a first cell (e.g., PCell, PSCell, PUCCH SCell, SCell) and one or more secondary cells. The one or more secondary cells may comprise a second cell (e.g., SCell, SCell configured with PUCCH).

In an example, the one or more messages may comprise one or more RRC messages (e.g. RRC connection reconfiguration message, or RRC connection reestablishment message, or RRC connection setup message).

In an example, the one or more configuration parameters may indicate cell-specific indices (e.g., provided by a higher layer parameter servCellIndex) for the plurality of cells. In an example, each cell of the plurality of cells may be identified by a respective one cell-specific index of the cell-specific indices. In an example, the first cell may be identified by a first cell-specific index of the cell-specific indices. In an example, the second cell may be identified by a second cell-specific index of the cell-specific indices.

In an example, the one or more configuration parameters may comprise bandwidth part (BWP) configuration parameters for a plurality of BWPs. The plurality of BWPs may comprise a first plurality of DL BWPs of the first cell and/or a first plurality of UL BWPs of the first cell. In an example, the plurality of BWPs may comprise a second plurality of DL BWPs of the second cell and/or a second plurality of UL BWPs of the second cell. In an example, the first plurality of DL BWPs may comprise a first downlink BWP of the first cell. In an example, the first plurality of UL BWPs may comprise a first uplink BWP of the first cell. In an example, the second plurality of DL BWPs may comprise a second downlink BWP of the second cell. In an example, the second plurality of UL BWPs may comprise a second uplink BWP of the second cell.

In an example, the one or more configuration parameters may further comprise BWP specific indices for the plurality of BWPs. In an example, each BWP of the plurality of BWPs may be identified by a respective one BWP specific index of the BWP specific indices (e.g., provided by a higher layer parameter bwp-ID in the one or more configuration parameters).

In an example, the first downlink BWP may be identified by a first BWP specific index of the BWP specific indices. The second downlink BWP may be identified by a second BWP specific index of the BWP specific indices.

In an example, the one or more configuration parameters (e.g., RRC (BFR) in FIG. 19) may indicate one or more first RSs (e.g., RadioLinkMonitoringRS provided in an IE RadioLinkMonitoringConfig) for the second downlink BWP of the second cell (e.g., explicit BFD configuration).

In an example, for both explicit BFD configuration and the implicit BFD configuration, at least one RS of the one or more first RSs may be transmitted/configured on/in the first cell. In an example, for both explicit BFD configuration and the implicit BFD configuration, at least one RS of the one or more first RSs may be transmitted/configured on/in the second cell. In an example, for both explicit BFD configuration and the implicit BFD configuration, at least one RS of the one or more first RSs may be transmitted/configured on/in at least one of the one or more secondary cells. In an example, transmitting/configuring the at least one RS on the first cell and/or the at least one of the one or more secondary cells may save overhead and save complexity of the wireless device for tracking a high number of RSs.

In an example, at least one RS of the one or more first RSs may be transmitted/configured on/in the first cell. In an example, the second cell and the first cell may share the at least one RS based on operating in intra-band and/or QCL-ed (e.g., cross-carrier QCL) and/or based on sharing similar channel characteristics (e.g., Doppler spread, spatial filter, etc.).

In an example, at least one RS of the one or more first RSs may be transmitted/configured on/in the second cell.

In an example, at least one RS of the one or more first RSs may be transmitted/configured on/in the at least one of the one or more secondary cells. In an example, the second cell and the at least one of the one or more secondary cells may share the at least one RS based on operating in intra-band and/or QCL-ed (e.g., cross-carrier QCL) and/or based on sharing similar channel characteristics (e.g., Doppler spread, spatial filter, etc.).

In an example, the one or more first RSs may comprise one or more first CSI-RSs. In an example, the one or more first RSs may comprise one or more first SS/PBCH blocks. In an example, the one or more configuration parameters may indicate a maximum beam failure instance (BFI) counter (e.g., beamFailureInstanceMaxCount) (e.g., for the second cell, or for the first cell or for the second downlink BWP of the second cell). In an example, the wireless device may assess the one or more first RSs to detect a beam failure for the second downlink BWP of the second cell. In an example, the one or more configuration parameters may indicate a first threshold (e.g., provided by rlmInSyncOutOfSyncThreshold, Qout,LR) (e.g., for the second cell, or for the first cell or for the second downlink BWP of the second cell).

In an example, the one or more configuration parameters may indicate one or more second RSs (e.g., candidateBeamRSList provided in IE BeamFailureRecoveryConfig) for the second downlink BWP of the second cell. In an example, the wireless device may assess the one or more second RSs to select a candidate RS among the one or more second RSs for a beam failure recovery procedure of the second downlink BWP of the second cell.

In an example, the one or more second RSs may comprise one or more second CSI-RSs. In an example, the one or more second RSs may comprise one or more second SS/PBCH blocks.

In an example, the one or more configuration parameters may indicate RS-specific indices (e.g., provided by a higher layer parameter ssb-index) for the one or more second RSs. In an example, each RS of the one or more second RSs may be identified by a respective one RS-specific index of the RS-specific indices. In an example, a first RS of the one or more second RSs may be identified by a first RS-specific index of the RS-specific indices. In an example, a second RS of the one or more second RSs may be identified by a second RS-specific index of the RS-specific indices.

In an example, at least one RS of the one or more second RSs may be configured/transmitted on/in the first cell. In an example, at least one RS of the one or more second RSs may be configured/transmitted on/in the second cell. In an example, at least one RS of the one or more second RSs may be configured/transmitted on/in at least one of the one or more secondary cells. In an example, configuring the at least one RS of the one or more second RSs on the first cell and/or the at least one of the one or more secondary cells may save overhead and save complexity of the wireless device for tracking a high number of RSs.

In an example, at least one RS of the one or more second RSs may be configured/transmitted on/in the first cell. In an example, the second cell and the first cell may share the at least one RS based on operating in intra-band and/or QCL-ed (e.g., cross-carrier QCL) and/or based on sharing similar channel characteristics (e.g., Doppler spread, spatial filter, etc.).

In an example, at least one RS of the one or more second RSs may be configured/transmitted on/in the second cell.

In an example, at least one RS of the one or more second RSs may be configured/transmitted on/in the at least one of the one or more secondary cells. In an example, the second cell and the at least one of the one or more secondary cells may share the at least one RS based on operating in intra-band and/or QCL-ed (e.g., cross-carrier QCL) and/or based on sharing similar channel characteristics (e.g., Doppler spread, spatial filter, etc.).

In an example, the one or more configuration parameters may indicate a second threshold (e.g., provided by rsrp-ThresholdSSB in the IE BeamFailureRecoveryConfig) for a beam failure recovery procedure of the second cell (or the second downlink BWP). In an example, the wireless device may use the second threshold in a candidate beam selection of the second cell (or the second downlink BWP).

In an example, the one or more configuration parameters may indicate a beam failure recovery timer (e.g., provided by beamFailureRecoveryTimer in the IE BeamFailureRecoveryConfig) for a beam failure recovery procedure of the second cell (or the second downlink BWP).

In an example, the base station may configure the second threshold in a BWP (e.g., UL BWP, DL BWP) of the first cell. In an example, the base station may configure the beam failure recovery timer in a BWP (e.g., UL BWP, DL BWP) of the first cell.

In an example, the base station may configure the second threshold in a BWP (e.g., UL BWP, DL BWP, the second downlink BWP) of the second cell. In an example, the base station may configure the beam failure recovery timer in a BWP (e.g., UL BWP, DL BWP, the second downlink BWP) of the second cell.

In an example, the base station may configure the second threshold in a BWP (e.g., UL BWP, DL BWP) of at least one of the one or more secondary cells. In an example, the base station may configure the beam failure recovery timer in a BWP (e.g., UL BWP, DL BWP) of at least one of the one or more secondary cells.

In an example, the base station may not provide the wireless device with reference signals for a candidate beam selection. In an example, the one or more configuration parameters may not indicate one or more second RSs (e.g., candidateBeamRSList provided in IE BeamFailureRecoveryConfig) for the second downlink BWP of the second cell. In an example, the wireless device may not assess the one or more second RSs to select a candidate RS among the one or more second RSs for a beam failure recovery procedure of the second downlink BWP of the second cell. In an example, the wireless device may not perform a candidate beam selection for a beam failure recovery procedure of the second downlink BWP of the second cell based on not being configured with the one or more second RSs.

In an example, the one or more configuration parameters may not indicate a second threshold (e.g., provided by rsrp-ThresholdSSB in the IE BeamFailureRecoveryConfig) for a beam failure recovery procedure of the second cell (or the second downlink BWP). In an example, the wireless device may not perform a candidate beam selection for a beam failure recovery procedure of the second downlink BWP of the second cell based on not being configured with the second threshold.

In an example, the one or more configuration parameters may indicate a search space set (e.g., provided by recovery-SearchSpaceID in the IE BeamFailureRecoveryConfig). In an example, the search space set may be linked/associated with a control resource set (coreset). In an example, the search space set may indicate the coreset. In an example, the wireless device may monitor the coreset for a beam failure recovery procedure of the second cell (or of the second downlink BWP). In an example, the base station may configure the coreset on the first cell. In an example, the base station may configure the coreset on the second cell. In an example, the base station may configure the coreset on at least one of the one or more secondary cells. In an example, the wireless device may monitor the search space set (e.g., linked to the coreset) for a beam failure recovery procedure of the second downlink BWP.

In an example, the second downlink BWP may be an active downlink BWP of the second cell. In an example, a physical layer in the wireless device may assess a first radio link quality of the one or more first RSs (for a beam failure detection of the second downlink BWP). The physical layer may provide a BFI indication to a higher layer (e.g. MAC) of the wireless device when the first radio link quality is worse (e.g., higher BLER, lower L1-RSRP, lower L1-SINR) than the first threshold.

In an example, the higher layer (e.g., MAC) of the wireless device may increment BFI_COUNTER by one in response to the physical layer providing the BFI indication (e.g., at time T, 2T, 5T in FIG. 18). The BFI_COUNTER may be a counter for a BFI indication. The wireless device may initially set the BFI_COUNTER to zero.

In an example, based on the incrementing the BFI_COUNTER, the BFI_COUNTER may be equal to or greater than the maximum BFI counter (e.g., beamFailureInstanceMaxCount). In an example, the wireless device may detect a beam failure of the second downlink BWP of the second cell based on the BFI_COUNTER being equal to or greater than the maximum BFI counter (time T1 in FIG. 19). In an example, the wireless device may initiate a beam failure recovery (BFR) procedure for the second downlink BWP of the second cell based on the detecting the beam failure of the second downlink BWP (time T1 in FIG. 19). In an example, based on the initiating the BFR procedure, the wireless device, if configured, may start the beam failure recovery timer.

In an example, based on the initiating the BFR procedure, the wireless device may initiate a candidate beam selection for the beam failure recovery procedure (time T1 in FIG. 19). In an example, the wireless device may initiate a candidate beam selection before initiating the beam failure recovery procedure (e.g., before time T1 in FIG. 19, between time T0 and T1 in FIG. 19). In an example, the wireless device may initiate a candidate beam selection before detecting the beam failure (e.g., before time T1 in FIG. 19, between time T0 and T1 in FIG. 19). In an example, the wireless device may initiate a candidate beam selection based on being configured with the one or more second RSs (time T0 in FIG. 19). In an example, the wireless device may perform beam failure detection and candidate beam selection in parallel. In an example, the wireless device may perform the candidate beam selection during the (ongoing) beam failure recovery procedure. In an example, the candidate beam selection may comprise selecting/identifying a candidate RS (e.g., CSI-RS, SS/PBCH blocks) in/among the one or more second RSs (with quality higher than the second threshold).

In an example, the wireless device may initiate the candidate beam selection for the beam failure recovery procedure before the initiating the BFR procedure. In an example, the wireless device may initiate a candidate beam selection for the beam failure recovery procedure before the detecting the beam failure of the second downlink BWP. In an example, the wireless device may perform one or more measurements on the one or more second RSs in parallel with estimating a first radio link quality of the one or more first RSs.

In an example, the initiating the candidate beam selection may comprise requesting, by the higher layer from the physical layer, one or more indices (of the RS-specific indices, for example, periodic CSI-RS configuration indexes and/or the SSB indexes provided by the one or more configuration parameters) associated with one or more candidate RSs among the one or more second RSs and/or one or more candidate measurements (e.g., L1-RSRP measurements) of the one or more candidate RSs. In an example, each measurement of the one or more candidate measurements may be better (e.g. lower BLER or higher L1-RSRP or higher L1-SINR) than the second threshold (e.g., rsrp-ThresholdSSB).

In an example, in the candidate beam selection, the physical layer of the wireless device may perform one or more measurements (e.g. L1-RSRP measurement) for the one or more second RSs. In an example, the wireless device may perform each measurement of one or more measurements for a candidate RS of the one or more second RSs. In an example, the physical layer may perform a first measurement of the one or more measurements for a first RS of the one or more second RSs. In an example, the physical layer may perform a second measurement of the one or more measurements for a second RS of the one or more second RSs. In an example, the physical layer may perform a third measurement of the one or more measurements for a third RS of the one or more second RSs, and so on.

In an example, based on the performing the one or more measurements, the wireless device may determine that the one or more candidate measurements, of the one or more measurements, of the one or more candidate RSs, of the one or more second RSs, are better (e.g. lower BLER or higher L1-RSRP or higher SINR) than the second threshold (e.g., rsrp-ThresholdSSB). In an example, each candidate RS of the one or more candidate RSs has a candidate measurement (e.g., L1-RSRP), of the one or more candidate measurements, better than the second threshold. In an example, the first measurement for the first RS may be better (higher L1-RSRP) than the second threshold. In an example, the second measurement for the second RS may be better (higher L1-RSRP) than the second threshold. In an example, the third measurement for the third RS may be worse (lower L1-RSRP) than the second threshold. The one or more candidate RSs may comprise the first RS and the second RS based on the first measurement and second measurement being better than the second threshold and the third measurement being worse than the second threshold. Based on the request, by the higher layer from the physical layer, the physical layer may provide the first measurement and a first RS-specific index of the first RS and the second measurement and a second RS-specific index of the second RS.

In an example, based on the request, the physical layer of the wireless device may provide, to the higher layer (e.g., MAC) of the wireless device, one or more indices of the one or more candidate RSs (e.g., the first RS, the second RS) and one or more candidate measurements (e.g., the first measurement, the second measurement) of the one or more candidate RSs.

In an example, in response to receiving the one or more indices and the one or more candidate measurements associated with the one or more candidate RSs, the higher layer (e.g., MAC) of the wireless device may select a candidate RS among the one or more candidate RSs. The higher layer may indicate the candidate RS to the physical layer of the wireless device. In an example, the candidate RS may be identified with a candidate RS index (e.g., periodic CSI-RS configuration indexes and/or the SSB indexes provided by the one or more configuration parameters) of the RS-specific indices (or of one or more indices of the RS-specific indices).

In an example, the one or more configuration parameters may indicate uplink physical channels (e.g., PUCCH, PRACH, PUSCH). In an example, the uplink physical channels may comprise physical random-access channels (PRACH) resources. In an example, the uplink physical channels may comprise physical uplink control channel (PUCCH) resources. In an example, the uplink physical channels may comprise physical uplink shared channel (PUSCH) resources.

In an example, the wireless device may use (or transmit via at least one uplink physical channel of) the uplink physical channels for a beam failure recovery procedure of the second cell. In an example, the uplink physical channels may be dedicated to the beam failure recovery procedure of the second cell. In an example, when the wireless device initiates a second beam failure recovery procedure for a third cell of the one or more secondary cells, the wireless may not transmit via the uplink physical channels for the second beam failure recovery procedure of the third cell based on the uplink physical channels being dedicated to the second cell.

In an example, the uplink physical channels may be shared for beam failure recovery procedure(s) of the one or more secondary cells. In an example, when the wireless device initiates a second beam failure recovery procedure for a third cell of the one or more secondary cells, the wireless may transmit via the uplink physical channels for the second beam failure recovery procedure of the third cell based on the uplink physical channels being shared for the one or more secondary cells.

In an example, the uplink physical channels may be dedicated for a beam failure recovery procedure. In an example, the wireless device may transmit an uplink signal based on initiating a beam failure recovery procedure. When the uplink physical channels are dedicated for the beam failure recovery procedure, the wireless device may transmit the uplink signal via the uplink physical channels based on the uplink signal being for the beam failure recovery procedure. In an example, the wireless device may not transmit a second uplink signal (e.g., SR) via the uplink physical channels for a procedure other than a beam failure recovery procedure. In an example, the wireless device may not transmit a second uplink signal (e.g., SR) via the uplink physical channels for requesting uplink resources to transmit a transport block (e.g., uplink data, UL-SCH, etc.).

In an example, the uplink physical channels may not be dedicated for a beam failure recovery procedure. In an example, the uplink physical channels may be shared for a beam failure recovery procedure and another procedure (e.g., scheduling request, random-access, etc.). In an example, the wireless device may transmit an uplink signal via the uplink physical channels for a beam failure recovery procedure. In an example, the wireless device may transmit a second uplink signal (e.g., SR) via the uplink physical channels for requesting uplink resources to transmit a transport block (e.g., uplink data, UL-SCH, etc.).

In an example, the uplink physical channels may be one-to-one associated with the one or more secondary cells. In an example, the wireless device may perform beam failure detection for a cell of the one or more secondary cells when the cell is active. Each cell of the one or more secondary cells may be associated with a respective uplink physical channel of the uplink physical channels. In an example, a first cell of the one or more secondary cells may be associated with a first uplink physical channel of the uplink physical channels. Based on the association, the wireless device may transmit a first uplink signal (e.g., SR, BFRQ, preamble, UCI, MAC CE, aperiodic CSI-RS, and the like) via the first uplink physical channel for a first BFR procedure of the first cell. Based on receiving the first uplink signal, the base station may be aware of the first BFR procedure of the first cell. In an example, a second cell of the one or more secondary cells may be associated with a second uplink physical channel of the uplink physical channels. Based on the association, the wireless device may transmit a second uplink signal via the second uplink physical channel for a second BFR procedure of the second cell. Based on receiving the second uplink signal, the base station may be aware of the second BFR procedure of the second cell.

In an example, the base station may configure the uplink physical channels on the first cell. In an example, the base station may configure the uplink physical channels on the second cell. In an example, the base station may configure the uplink physical channels on a third cell (e.g., SCell with PUCCH) of the one or more secondary cells. In an example, the third cell may be different from the second cell (e.g., a third cell-specific index of the third cell is different from a second cell-specific index of the second cell).

In an example, the uplink physical channels may be dedicated to the beam failure recovery procedure of the second cell. In response to being dedicated to the beam failure recovery procedure of the second cell, when the base station receives an uplink signal (e.g., preamble via PRACH, beam failure recovery request (BFRQ) transmission via PUCCH, scheduling request (SR) via PUCCH, BFR MAC-CE via PUSCH) via at least one uplink physical channel (e.g., PUSCH, PRACH or PUCCH) of the uplink physical channels, the base station may be informed of the beam failure recovery procedure of the second cell.

In an example, the uplink physical channels may not be dedicated to the beam failure recovery procedure. When a base station receives an uplink signal (e.g., the SR) via at least one uplink physical channel (e.g., PUCCH) of the uplink physical channels, the base station may not distinguish whether the uplink signal is transmitted for a beam failure recovery procedure or for requesting uplink shared channel (UL-SCH) resources for an uplink transmission.

In an example, the wireless device may transmit an uplink signal (e.g., preamble via PRACH, beam failure recovery request (BFRQ) transmission via PUCCH, scheduling request (SR) via PUCCH, MAC-CE via PUSCH, aperiodic CSI-RS via PUSCH) via at least one uplink physical channel (e.g., PRACH or PUCCH or PUSCH) of the uplink physical channels based on initiating the beam failure recovery procedure for the second cell (at time T2 in FIG. 19).

In an example, the one or more configuration parameters may indicate a response window for the second cell (or for the second downlink BWP of the second cell). In an example, the one or more configuration parameters may indicate a maximum transmission counter (e.g., sr-Trans-Max, bfrq-TransMax, preambleTransMax) for the second cell (or for the second downlink BWP of the second cell).

In an example, the one or more configuration parameters may comprise one or more coresets for the second downlink BWP of the second cell. In an example, the wireless device may monitor the one or more coresets prior to the initiating the BFR procedure. In an example, the wireless device may not monitor the coreset (e.g., dedicated for BFR procedure) prior to the initiating the BFR procedure. In an example, the wireless device may monitor the one or more coresets and the coreset during the BFR procedure. In an example, the wireless device may prioritize the coreset over the one or more coresets during the BFR procedure. In an example, the prioritizing the coreset over the one or more coresets may comprise that the wireless device monitors the coreset and depending on its capability, the wireless device may monitor at least one coreset of the one or more coresets.

In an example, the wireless device may start the response window (e.g., ra-responseWindow, sr-prohibit timer, bfrq-prohibit timer), for a downlink control information (e.g., an uplink grant, triggering aperiodic CSI-RS) from the base station, based on the transmitting the uplink signal. In an example, the wireless device may monitor, for the DCI from the base station, at least one PDCCH in the one or more coresets within the response window (or while the response window is running).

In an example, the wireless device may increment a transmission counter (e.g., preamble_transmission_counter, sr-counter, bfrq-counter) by one based on the transmitting the uplink signal. In an example, the wireless device may set the transmission counter to an initial value (e.g., zero, one) based on the initiating the BFR procedure. In an example, the wireless device may retransmit the uplink signal until the transmission counter reaches to the maximum transmission counter.

In an example, the response window may expire. In an example, the wireless device may not receive the DCI within the response window (e.g., before the response window expires). Based on the response window expiring and the transmission counter being lower than the maximum transmission counter, the wireless device may retransmit the uplink signal, via at least one uplink physical channel of the uplink physical channels, for the BFR procedure.

In an example, the transmission counter may be equal to or higher than the maximum transmission counter. Based on the transmission counter being equal to or higher than the maximum transmission counter, the wireless device may initiate a random-access procedure (e.g., contention-based random-access procedure).

In an example, based on the transmission counter being equal to or higher than the maximum transmission counter, the wireless device may stop/reset the beam failure recovery timer. In an example, based on the transmission counter being equal to or higher than the maximum transmission counter, the wireless device may reset BFI_COUNTER to zero.

In an example, the wireless device may receive the DCI from the base station at time T3 in FIG. 19. In an example, the wireless device may receive the DCI from the base station within the response window at time T3 in FIG. 19.

In an example, the DCI may indicate uplink resources. In an example, the uplink resources may comprise time resources. In an example, the uplink resources may comprise frequency resources.

In an example, the DCI may comprise an uplink grant. The uplink grant may indicate the uplink resources.

In an example, the DCI may trigger a CSI report (e.g., aperiodic CSI report). In an example, the DCI may comprise a CSI request field triggering the CSI report. In an example, the uplink resources may be associated with the CSI report.

In an example, the wireless device may transmit a second uplink signal (e.g., PUSCH, transport block, aperiodic CSI-report, UCI, PUCCH, MAC-CE, etc.) via uplink resources indicated by the DCI (at time T4 in FIG. 19).

In an example, the second uplink signal may be a MAC-CE (e.g., BFR MAC-CE, PHR MAC-CE, BSR, and the like). In an example, the second uplink signal may be a layer-1 report. In an example, the second uplink signal may be a CSI report (e.g., aperiodic CSI report).

In an example, the second uplink signal may comprise/indicate the second cell-specific index of the second cell.

In an example, the wireless device may select/identify a candidate RS (of the one or more second RSs) associated/identified with a candidate RS index of the RS-specific indices for the BFR procedure. In an example, the wireless device may select/identify the candidate RS through/in the candidate beam selection. In an example, based on selecting/identifying the candidate RS, the second uplink signal may indicate the candidate RS index of the candidate RS.

In an example, the wireless device may initiate a BFR procedure for a cell identified with a cell-specific index. The wireless device may, for the BFR procedure of the cell, select/identify a candidate RS identified with a candidate RS index. In an example, the second uplink signal may comprise the cell-specific index. In an example, the second uplink signal may comprise the candidate RS index.

In an example, the wireless device may not identify a candidate RS in the candidate beam selection prior to the (scheduled) uplink resources indicated by the DCI (e.g., before time T4 in FIG. 19).

In an example, based on assessing/measuring the one or more second RSs in the candidate beam selection, the wireless device may determine that a candidate RS, among the one or more second RSs, has not been identified prior to (scheduled) uplink resources indicated by the DCI (e.g., uplink grant).

In an example, in the candidate beam selection, the wireless device may measure/assess (e.g., perform one or more measurements (e.g. L1-RSRP measurement)) the one or more second RSs to select a candidate RS among the one or more second RSs for the beam failure recovery procedure of the second downlink BWP of the second cell. In an example, not identifying the candidate RS in the candidate beam selection may comprise that the wireless device may determine that each measurement (e.g. L1-RSRP measurement) of one or more measurements for a candidate RS of the one or more second RSs is worse (e.g. higher BLER or lower L1-RSRP or lower SINR) than the second threshold. In an example, not identifying the candidate RS in the candidate beam selection may comprise that none of the one or more second RSs has a candidate measurement/quality (e.g. L1-RSRP measurement) better than the second threshold. In an example, not identifying the candidate RS in the candidate beam selection may comprise that each candidate RS of the one or more second RSs has a candidate measurement/quality (e.g. L1-RSRP measurement) worse than the second threshold.

In an example, based on not identifying the candidate RS in the candidate beam selection prior to the (scheduled) uplink resources of the uplink grant, the wireless device may transmit the second uplink signal with a reserved index (e.g., 0000, 1111, etc.) at time T4 in FIG. 19. In an example, transmitting the second uplink signal with the reserved index may comprise that the second uplink signal may comprise/indicate the reserved index. The wireless device may transmit the second uplink signal with the reserved index instead of with the candidate RS index based on not identifying the candidate RS.

In an example, the one or more configuration parameters may not indicate one or more second RSs (e.g., candidateBeamRSList provided in IE BeamFailureRecoveryConfig) for the second downlink BWP of the second cell. In an example, when the wireless device receives the DCI, based on not being configured with the one or more second RSs, the wireless device may transmit the second uplink signal with a reserved index (e.g., time T4 in FIG. 19).

In an example, the one or more configuration parameters may not indicate a second threshold (e.g., provided by rsrp-ThresholdSSB in the IE BeamFailureRecoveryConfig) for a beam failure recovery procedure of the second cell (or the second downlink BWP). In an example, when the wireless device receives the DCI, based on not being configured with the second threshold, the wireless device may transmit the second uplink signal with a reserved index (e.g., time T4 in FIG. 19).

In an example, the reserved index may be preconfigured. In an example, the reserved index may be fixed. In an example, the one or more configuration parameters may indicate the reserved index. In an example, the wireless device may select (e.g., randomly) the reserved index. The reserved index may be different from the RS-specific indices. In an example, the RS-specific indices may not comprise the reserved index.

Based on receiving the second uplink signal with the reserved index, the base station may determine that the wireless device has not identified a candidate RS in the candidate beam selection. In an example, the base station may deactivate the second cell based on the determining. In an example, the base station may initiate a beam management (e.g., aperiodic beam management, aperiodic CSI-RS) for the second cell based on the determining.

In an example, the one or more configuration parameters may indicate a second response window for the second cell. In an example, the one or more configuration parameters may indicate a second maximum transmission counter (e.g., sr-TransMax, bfrq-TransMax, preambleTransMax, PUSCH-TransMax) for the second cell.

In an example, the wireless device may start the second response window (e.g., ra-responseWindow, sr-prohibit timer, bfrq-prohibit timer), for a beam failure recovery response from the base station, based on the transmitting the second uplink signal. In an example, the wireless device may monitor, for the beam failure recovery response from the base station, at least one PDCCH in the coreset (linked to the search space set) within the second response window (or while the second response window is running). In an example, at least one DM-RS of the at least one PDCCH may be associated (e.g., QCL-ed) with the candidate RS. In an example, the wireless device may monitor, for the beam failure recovery response from the base station, at least one PDCCH in at least one coreset of the one or more coresets within the second response window (or while the second response window is running). In an example, the wireless device may monitor, for the beam failure recovery response from the base station, at least one PDCCH in at least one coreset of the one or more coresets based on the transmitting the second uplink signal.

In an example, the beam failure recovery response may comprise a second downlink control information (DCI) indicating an uplink grant (e.g., for the second cell). In an example, the beam failure recovery response may comprise a second DCI indicating a downlink assignment (e.g., for the second cell). In an example, the beam failure recovery response may comprise a second downlink control information (DCI) indicating an ACK/NACK for the second uplink signal. In an example, the second DCI may be configured with CRC scrambled by a RNTI (e.g., C-RNTI, MCS-C-RNTI, CS-RNTI) of the wireless device. In an example, the second DCI may be addressed to the RNTI.

In an example, the wireless device may increment a second transmission counter (e.g., preamble_transmission_counter, sr-counter, bfrq-counter) by one based on the transmitting the second uplink signal. In an example, the wireless device may set the second transmission counter to an initial value (e.g., zero, one) based on the initiating the BFR procedure. In an example, the wireless device may set the second transmission counter to an initial value (e.g., zero, one) based on receiving the DCI (e.g., time T3 in FIG. 19).

In an example, the wireless device may retransmit the second uplink signal for the BFR procedure until the second transmission counter reaches to the second maximum transmission counter.

In an example, the second response window may expire. In an example, the wireless device may not receive the beam failure recovery response within the second response window (e.g., before the second response window expires). Based on the second response window expiring and the second transmission counter being lower than the second maximum transmission counter, the wireless device may retransmit an uplink signal (e.g., preamble, PUSCH, BSR, etc.) for the BFR procedure.

In an example, the second transmission counter may be equal to or higher than the second maximum transmission counter. Based on the second transmission counter being equal to or higher than the second maximum transmission counter, the wireless device may initiate a random-access procedure (e.g., contention-based random-access procedure).

In an example, based on the second transmission counter being equal to or higher than the second maximum transmission counter, the wireless device may stop/reset the beam failure recovery timer. In an example, based on the second transmission counter being equal to or higher than the second maximum transmission counter, the wireless device may reset BFI_COUNTER to zero.

In an example, the wireless device may complete the BFR procedure for the second cell successfully based on receiving the beam failure recovery response in the coreset (or in the search space set) within the second response window.

In an example, the wireless device may complete the BFR procedure for the second cell successfully based on receiving the beam failure recovery response.

In an example, the wireless device may receive the DCI from the base station at time T3 in FIG. 19.

In an example, the wireless device may complete the BFR procedure based on the receiving the DCI (e.g., time T3 in FIG. 19).

In an example, the wireless device may complete the BFR procedure based on transmitting the second uplink signal via the uplink resources indicated by the DCI (at time T4 in FIG. 19).

In an example, based on the completing the beam failure recovery procedure, the wireless device may stop/reset the beam failure recovery timer. In an example, based on the completing the beam failure recovery procedure, the wireless device may reset BFI_COUNTER to zero.

Figure 20:
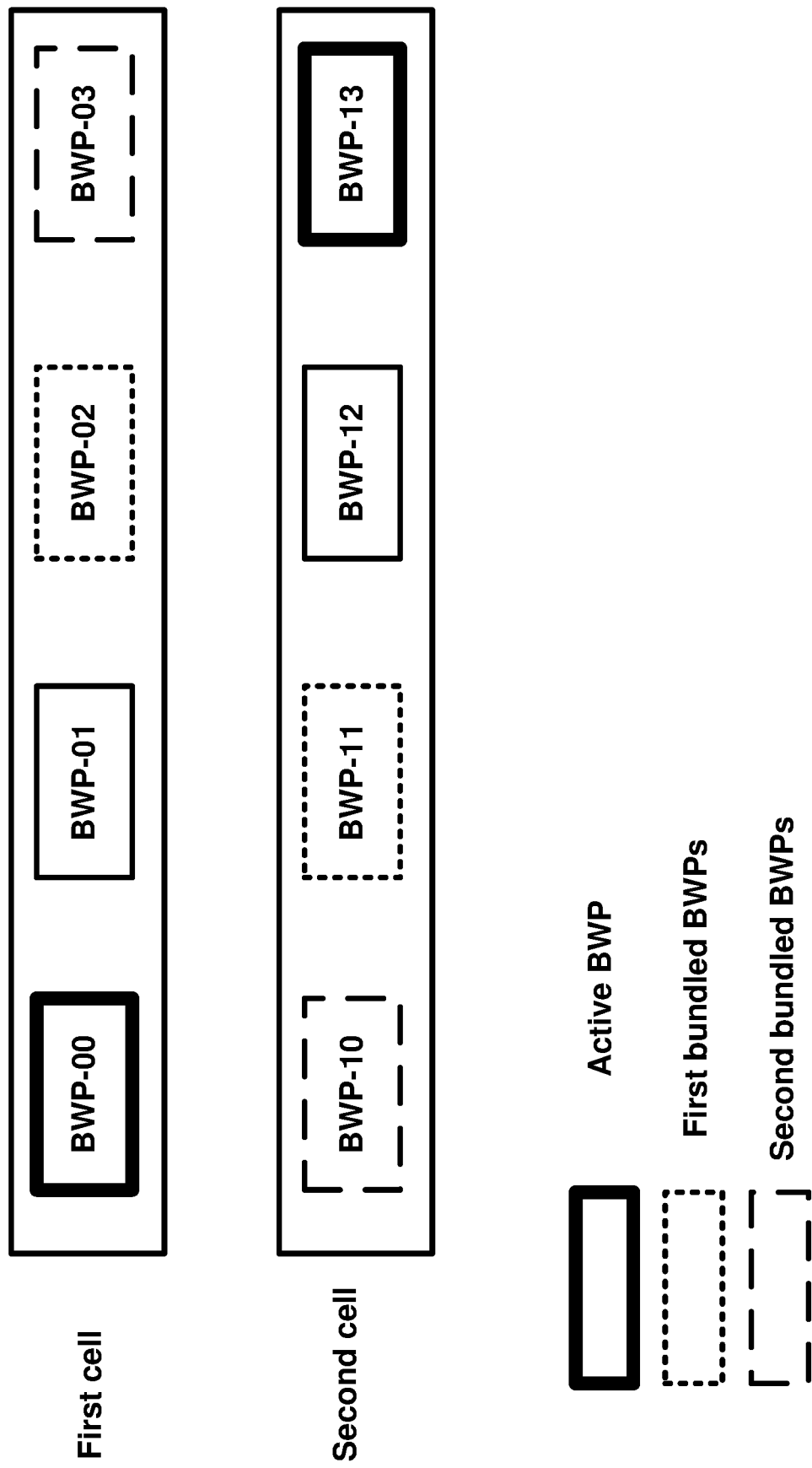
FIG. 20 is an example of downlink beam failure recovery procedure as per an aspect of an embodiment of the present disclosure.

FIG. 20 shows an example of a BWP operation as per an aspect of an embodiment of the present disclosure.

In an example, a wireless device may receive, from a base station, one or more messages. The one or more messages may comprise one or more configuration parameters of a plurality of cells.

In an example, the plurality of cells may comprise a first cell (e.g., First cell in FIG. 20) and a second cell (e.g., Second cell in FIG. 20).

In an example, a first plurality of BWPs (e.g., the first plurality of DL BWPs or the first plurality of UL BWPs) of the first cell may comprise first BWPs (e.g., BWP-00, BWP-01, BWP-02, BWP-03 in FIG. 20). In an example, a second plurality of BWPs (e.g., the second plurality of DL BWPs or the second plurality of UL BWPs) of the second cell may comprise second BWPs (e.g., BWP-10, BWP-11, BWP-12, BWP-13 in FIG. 20).

In an example, a first BWP of the first BWPs of the first cell may be bundled with a second BWP of the second BWPs of the second cell. In an example, the first BWP being bundled with the second BWP may comprise that when the wireless device sets the first BWP as a first active BWP of the first cell, the wireless device sets the second BWP as a second active BWP of the second cell. In an example, when the wireless device switches to the first BWP of the first cell, based on the first BWP being bundled with the second BWP, the wireless device may switch to the second BWP of the second cell.

In an example, the first BWP may be a default downlink BWP of the first cell. In an example, the second BWP may be a default downlink BWP of the second cell. In an example, the first BWP may be an initial BWP (e.g., initial uplink BWP or initial downlink BWP) of the first cell. In an example, the second BWP may be an initial BWP (e.g., initial uplink BWP or initial downlink BWP) of the second cell.

In an example, the base station may transmit a first downlink signal (e.g., DCI, MAC CE, RRC) to switch the wireless device to the first BWP for the first cell and a second downlink signal (e.g., DCI, MAC CE, RRC) to switch the wireless device to the second BWP for the second cell. In an example, the base station may not transmit a second downlink signal (e.g., DCI, MAC CE, RRC) to switch the wireless device to the second BWP for the second cell based on the first BWP being bundled with the second BWP. This may save overhead and reduce battery consumption power.

In an example, the first cell may be a leader cell. In an example, the second cell may be a follower cell. In an example, when the wireless device switches to the first BWP of the first cell, based on the first BWP being bundled with the second BWP and the first cell being the leader cell, the wireless device may switch to the second BWP of the second cell. In an example, when the wireless device switches to the second BWP of the second cell, based on the second cell being the follower cell, the wireless device may not switch to the first BWP of the first cell. In an example, when the wireless device switches to the second BWP of the second cell, based on the first cell being the leader cell, the wireless device may not switch to the first BWP of the first cell (even though/regardless of the first BWP and the second BWP are/being bundled).

In an example, in FIG. 20, the first BWP may be BWP-03 and the second BWP may be BWP-10 (Second bundled BWPs in FIG. 20).

In an example, in FIG. 20, the first BWP may be BWP-02 and the second BWP may be BWP-11 (First bundled BWPs in FIG. 20).

In an example, the wireless device may operate on a third BWP (e.g., BWP-00) of the first BWPs of the first cell. In an example, the operating on the third BWP may comprise setting the third BWP as a first active BWP of the first cell. In an example, the third BWP may be active (or activated). In an example, the wireless device may operate on a fourth BWP (e.g., BWP-13) of the second BWPs of the second cell. In an example, the operating on the fourth BWP may comprise setting the fourth BWP as a second active BWP of the second cell. In an example, the fourth BWP may be active (or activated).

In an example, the wireless device may switch from the third BWP to the first BWP (e.g., BWP-03) of the first cell. Based on the first BWP being bundled with the second BWP of the second cell, the wireless device may switch from the fourth BWP to the second BWP (e.g., BWP-10) based on the switching to the first BWP. In an example, the first cell may be a leader cell. In an example, the first cell may be a follower cell. In an example, the second cell may be a leader cell. In an example, the second cell may be a follower cell. In an example, the third BWP and the fourth BWP may be bundled. In an example, the third BWP and the fourth BWP may not be bundled.

In an example, the wireless device may switch from the third BWP to a fifth BWP (e.g., BWP-01) of the first BWPs of the first cell. In an example, the fifth BWP of the first cell may not be bundled with a BWP of the second BWPs of the second cell. In an example, the fifth BWP of the first cell may not be bundled with any BWP of the second BWPs of the second cell. In an example, the fifth BWP of the first cell may be bundled with none of the second BWPs of the second cell. In an example, in FIG. 20, BWP-01 of the first cell is not bundled with BWP-10, BWP-11, BWP-12, and BWP-13 of the second cell.

In an example, based on the fifth BWP not being bundled with the BWP of the second cell, the wireless device may not switch from the fourth BWP of the second cell when the wireless device switches to the fifth BWP for the first cell. In an example, the first cell may be a leader cell. In an example, the first cell may be a follower cell. In an example, the second cell may be a leader cell. In an example, the second cell may be a follower cell. In an example, the third BWP and the fourth BWP may be bundled. In an example, the third BWP and the fourth BWP may not be bundled.

In an example, the base station may configure the bundles between the first BWPs of the first cell and the second BWPs of the second cell. In an example, the one or more configuration parameters may indicate/comprise a BWP bundling parameter indicating the first BWP (e.g., BWP-03) of the first cell and the second BWP (e.g., BWP-10) of the second cell. In an example, based on receiving the BWP bundling parameter, the wireless device may determine that the first BWP and the second BWP are bundled.

Figure 21:
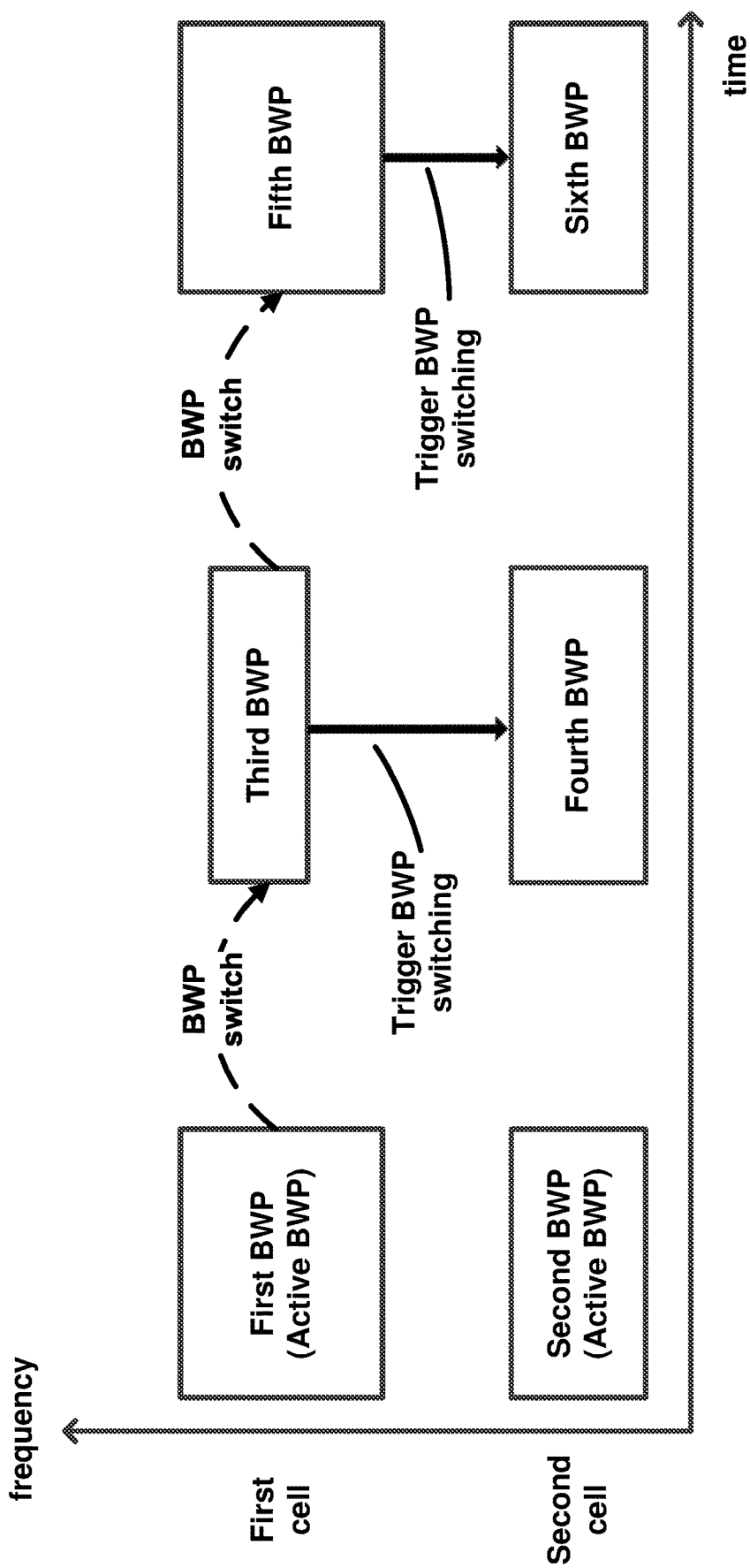
FIG. 21 is an example of downlink beam failure recovery procedure as per an aspect of an embodiment of the present disclosure.
Figure 22:
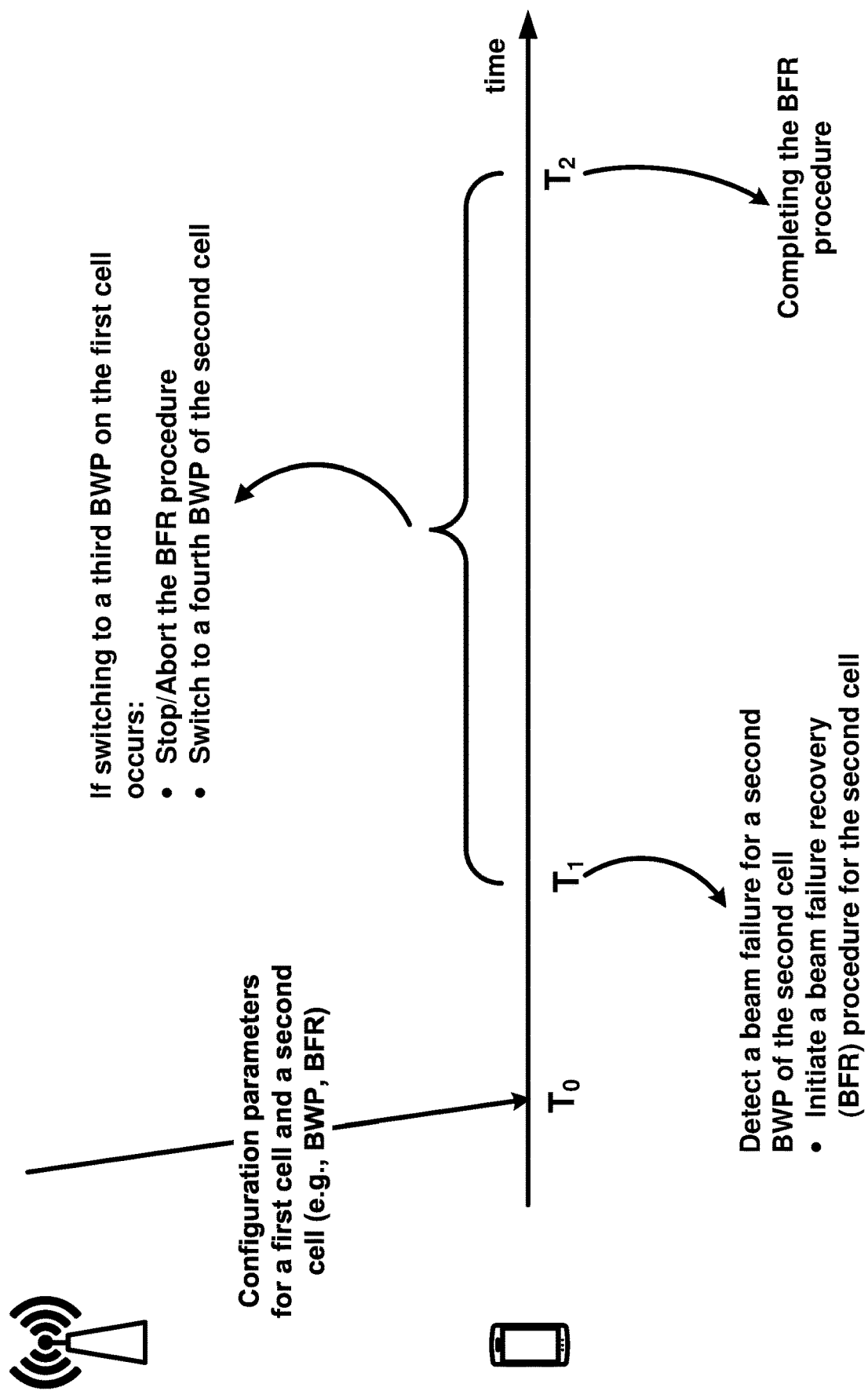
FIG. 22 is an example of downlink beam failure recovery procedure as per an aspect of an embodiment of the present disclosure.
Figure 23:
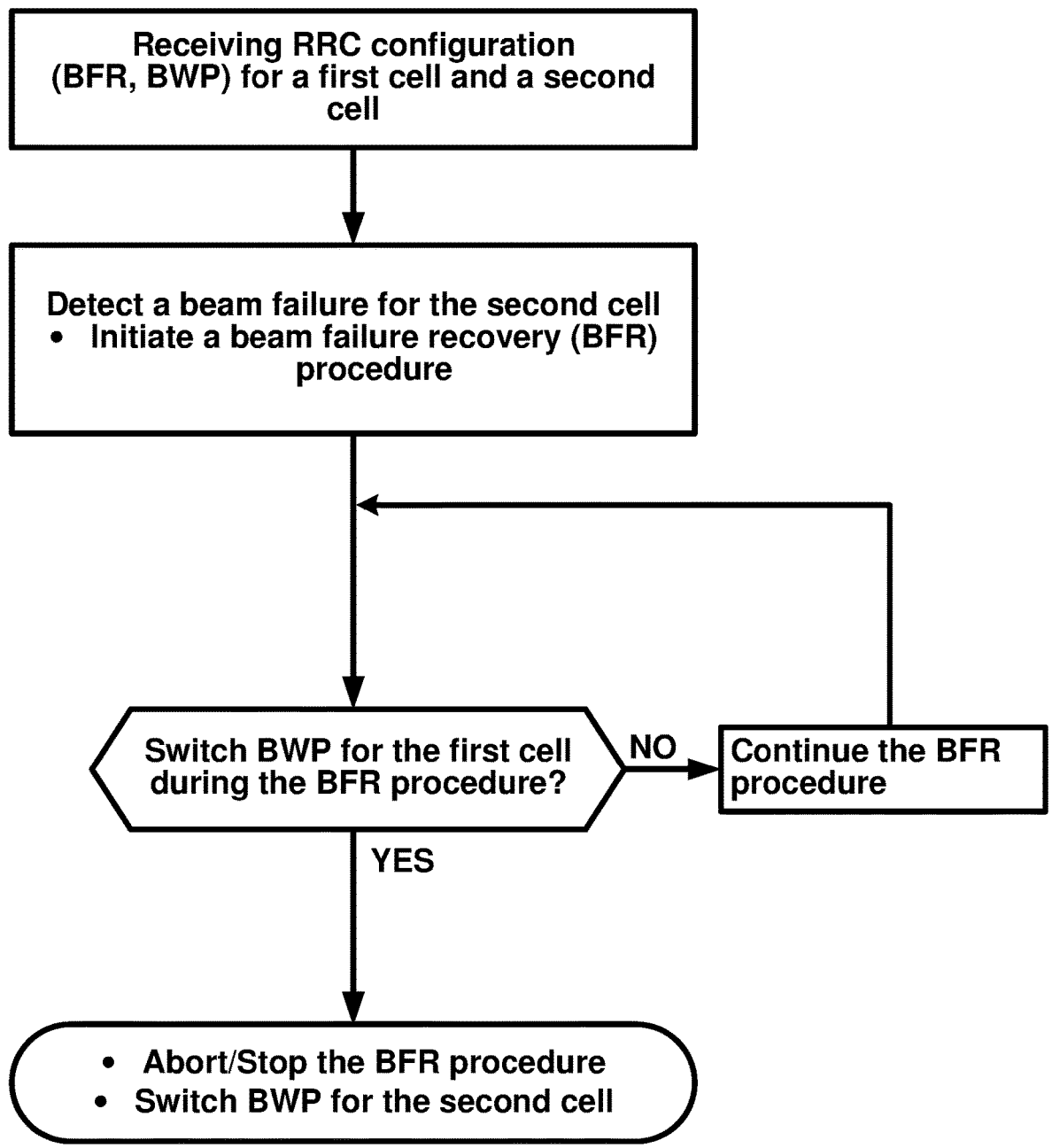
FIG. 23 is an example flowchart of a downlink beam failure recovery procedure as per an aspect of an embodiment of the present disclosure.

FIG. 21 and FIG. 22 show examples of a BWP operation as per an aspect of an embodiment of the present disclosure. FIG. 23 is a flow diagram of the BWP operation disclosed in FIG. 21 and FIG. 22.

In an example, a wireless device may receive one or more messages (e.g., time T0 in FIG. 22). The one or more messages may comprise one or more configuration parameters for a plurality of cells. The plurality of cells may comprise a first cell and a second cell.

In an example, the wireless device may be active on a first downlink BWP (e.g., First BWP in FIG. 21) of the first plurality of DL BWPs of the first cell. In an example, the first downlink BWP may be an active BWP of the first cell. In an example, the wireless device may operate on the first downlink BWP of the first cell. In an example, the wireless device may activate the first downlink BWP at a first time (e.g., symbol, slot, subframe, etc.).

In an example, the wireless device may be active on a second downlink BWP (e.g., Second BWP in FIG. 21) of the second plurality of DL BWPs of the second cell. In an example, the second downlink BWP may be an active BWP of the second cell. In an example, the wireless device may operate on the second downlink BWP of the second cell. In an example, the wireless device may activate the second downlink BWP at a second time (e.g., symbol, slot, subframe, etc.).

In an example, the first time and the second time may be different. In an example, the first time and the second time may be the same.

In an example, at time T1 in FIG. 22, the wireless device may initiate a beam failure recovery procedure for the second downlink BWP of the second cell based on detecting a beam failure of the second downlink BWP (discussed for time T1 in FIG. 19).

In an example, at time T2 in FIG. 22, the wireless device may complete the beam failure recovery procedure for the second downlink BWP of the second cell (completing the beam failure recovery procedure for the second downlink BWP discussed in FIG. 19).

In an example, the one or more configuration parameters may indicate a BWP inactivity timer for the first cell.

In an example, the wireless device may switch from the first downlink BWP to a third downlink BWP (Third BWP in FIG. 21) of the first cell. In an example, the first plurality of DL BWPs of the first cell may comprise the third downlink BWP. In an example, the wireless device may switch from the first downlink BWP to the third downlink BWP during the beam failure recovery procedure of the second cell (e.g., between T1 and T2 in FIG. 22). In an example, the switching to the third downlink BWP may be based on receiving a downlink signal (e.g., DCI, RRC, MAC CE) indicating the third downlink BWP (e.g., a third BWP specific index of the third BWP). In an example, the switching to the third downlink BWP may be based on an expiry of the BWP inactivity timer of the first cell. In an example, the switching from the first downlink BWP to the third downlink BWP may comprise deactivating the first downlink BWP (or the active BWP of the first cell). In an example, the switching from the first downlink BWP to the third downlink BWP may comprise activating the third downlink BWP. In an example, the switching from the first downlink BWP to the third downlink BWP may comprise setting the third downlink BWP as a second active BWP of the first cell.

In an example, the third downlink BWP of the first cell and a fourth downlink BWP (e.g., Fourth BWP in FIG. 21) of the second cell may be bundled (e.g., similar to the first BWP and the second BWP being bundled discussed in FIG. 20. For example, the first BWP discussed for FIG. 20 may be the third downlink BWP in FIG. 21 and the second BWP discussed for FIG. 20 may be the fourth downlink BWP in FIG. 21). In an example, the second plurality of DL BWPs of the second cell may comprise the fourth downlink BWP. In an example, the fourth BWP may be a default downlink BWP of the second cell.

In an example, based on the switching from the first downlink BWP to the third downlink BWP of the first cell during the beam failure recovery procedure of the second cell, the wireless device may stop/abort the beam failure recovery procedure for the second downlink BWP of the second cell. In an example, based on the switching from the first downlink BWP to the third downlink BWP of the first cell during the beam failure recovery procedure, the wireless device may stop/abort the beam failure recovery procedure for the second downlink BWP of the second cell and switch from the second downlink BWP to the fourth downlink BWP of the second cell. In an example, based on the third downlink BWP and the fourth downlink BWP being bundled, the wireless device may switch from the second downlink BWP to the fourth downlink BWP of the second cell. In an example, based on the switching from the second downlink BWP to the fourth downlink BWP, the wireless device may stop/abort the BFR procedure for the second downlink BWP of the second cell.

In an example, the wireless device may switch from the third downlink BWP to a fifth downlink BWP (e.g., Fifth BWP in FIG. 21) of the first cell. In an example, the first plurality of DL BWPs of the first cell may comprise the fifth downlink BWP. In an example, based on the switching from the third downlink BWP to the fifth downlink BWP, the wireless device may switch from the fourth downlink BWP to a sixth downlink BWP (e.g., Sixth BWP in FIG. 21) of the second cell. In an example, the second plurality of DL BWPs of the second cell may comprise the sixth downlink BWP. In an example, the fifth downlink BWP and the sixth downlink BWP may be bundled. In an example, the sixth downlink BWP may be a first active downlink BWP of the second cell (e.g., indicated by the firstActiveDownlinkBWP-ID). The sixth downlink BWP being the first active downlink BWP may comprise that a sixth BWP specific index of the sixth downlink BWP and the firstActiveDownlinkBWP-ID are the same. In an example, the sixth downlink BWP may be the same as the second downlink BWP based on the second downlink BWP being the latest active downlink BWP of the second cell prior to switching to the fourth downlink BWP of the second cell.

In an example, based on the stopping/aborting the beam failure recovery procedure, the wireless device may stop/reset the beam failure recovery timer. In an example, based on the stopping/aborting the beam failure recovery procedure, the wireless device may reset BFI_COUNTER to zero.

FIG. 23 is a flow diagram of the BWP operation disclosed in FIG. 21 and FIG. 22, where the wireless device stops/aborts the beam failure recovery procedure for the second downlink BWP of the second cell and switches from the second downlink BWP to the fourth downlink BWP of the second cell.

In an example, the wireless device may switch from the first downlink BWP to the third downlink BWP (Third BWP in FIG. 21) of the first cell. In an example, the wireless device may determine to switch from the second downlink BWP to the fourth downlink BWP of the second cell based on whether the switching from the first downlink BWP to the third downlink BWP of the first cell occurs during the beam failure recovery procedure.

In an example, the wireless device may switch from the first downlink BWP to the third downlink BWP before the initiating the BFR procedure (e.g., before time T1 in FIG.

22). In an example, the wireless device may switch from the first downlink BWP to the third downlink BWP after the completing the BFR procedure (e.g., after time T2 in FIG. 22). In an example, based on the determining that the switching from the first downlink BWP to the third downlink BWP of the first cell occurs when there is not an ongoing BFR procedure (e.g., before or after the BFR procedure), the wireless device may switch from the second downlink BWP to the fourth downlink BWP.

In an example, based on the determining that the switching from the first downlink BWP to the third downlink BWP of the first cell occurs during the BFR procedure, the wireless device may not perform switching from the second downlink BWP to the fourth downlink BWP. In an example, based on the determining that the switching from the first downlink BWP to the third downlink BWP of the first cell occurs during the BFR procedure, the wireless device may not perform switching from the second downlink BWP to the fourth downlink BWP in response to the switching from the first downlink BWP to the third downlink BWP of the first cell. In an example, based on the determining that the switching from the first downlink BWP to the third downlink BWP of the first cell occurs during the BFR procedure, the wireless device may not switch from the second downlink BWP to the fourth downlink BWP. In an example, based on the determining that the switching from the first downlink BWP to the third downlink BWP of the first cell occurs during the BFR procedure, the wireless device may continue performing the BFR procedure for the second downlink BWP of the second cell. In an example, the wireless device may continue performing the BFR procedure for the second downlink BWP of the second cell on the second downlink BWP.

In an example, the not (performing) switching from the second downlink BWP to the fourth downlink BWP may comprise keeping activating the second downlink BWP. In an example, the not (performing) switching from the second downlink BWP to the fourth downlink BWP may comprise keeping the second downlink BWP active. In an example, the not performing switching from the second downlink BWP to the fourth downlink BWP may comprise keeping maintaining the second downlink BWP as the active BWP of the second cell. In an example, the not performing switching from the second downlink BWP to the fourth downlink BWP may comprise keeping maintaining the fourth downlink BWP as a deactivated BWP of the second cell. In an example, the not performing switching from the second downlink BWP to the fourth downlink BWP may comprise not activating the fourth downlink BWP.

In an example, the continuing performing the BFR procedure may comprise the steps discussed at time T2, T3 and T4 of FIG. 19. In an example, the continuing performing the BFR procedure may comprise transmitting an uplink signal (e.g., preamble via PRACH, beam failure recovery request (BFRQ) transmission via PUCCH, scheduling request (SR) via PUCCH, MAC-CE via PUSCH, aperiodic CSI-RS via PUSCH) via at least one uplink physical channel (e.g., PRACH or PUCCH or PUSCH) of uplink physical channels (e.g., T2 in FIG. 19) for the BFR procedure.

In an example, the continuing performing the BFR procedure may comprise monitoring for a DCI (e.g., an uplink grant, triggering aperiodic CSI-RS) from the base station, based on the transmitting the uplink signal (e.g., T3 in FIG. 19).

In an example, the continuing performing the BFR procedure may comprise performing a candidate beam selection. In an example, the wireless device may assess/measure one or more second RSs in the candidate beam selection. In an example, the wireless device may select/identify a candidate RS among the one or more second RSs through/in the candidate beam selection.

In an example, the continuing performing the BFR procedure may comprise transmitting a second uplink signal via uplink resources indicated by the DCI (at time T4 in FIG. 19) for the BFR procedure.

In an example, the continuing performing the BFR procedure may comprise monitoring for a beam failure recovery response (e.g., second DCI, uplink grant, downlink assignment, ACK, NACK) for the second uplink signal.

In an example, based on the determining that the switching from the first downlink BWP to the third downlink BWP of the first cell occurs during the BFR procedure, the wireless device may not perform switching from the second downlink BWP to the fourth downlink BWP in response to the switching from the first downlink BWP to the third downlink BWP of the first cell. In an example, based on the determining that the switching from the first downlink BWP to the third downlink BWP of the first cell occurs during the BFR procedure, the wireless device may not switch from the second downlink BWP to the fourth downlink BWP. In an example, based on the determining that the switching from the first downlink BWP to the third downlink BWP of the first cell occurs during the BFR procedure, the wireless device may continue performing the BFR procedure for the second downlink BWP of the second cell.

Figure 24:
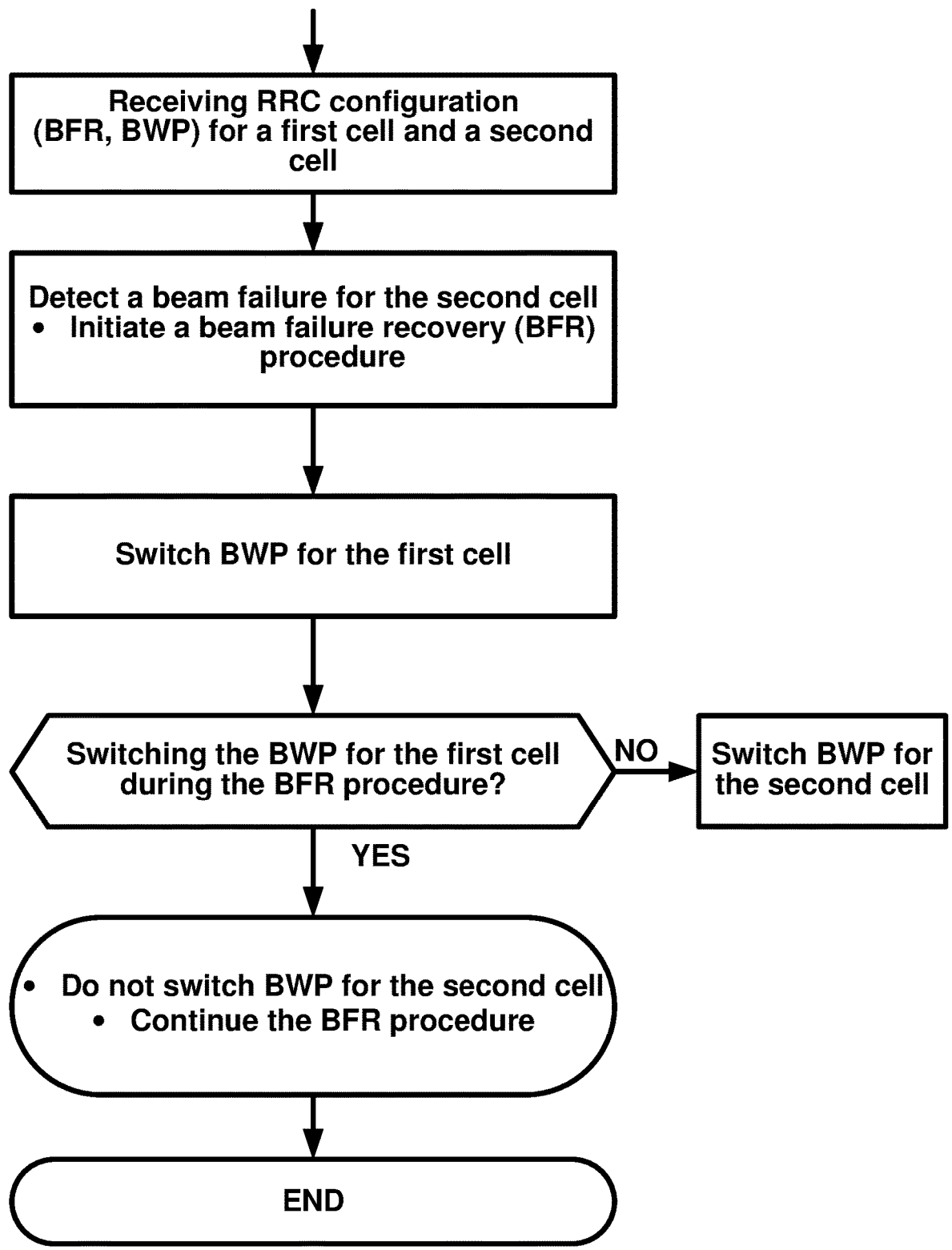
FIG. 24 is a flowchart of a downlink beam failure recovery procedure as per an aspect of an example embodiment of the present disclosure.

FIG. 24 is a flow diagram of the BWP operation disclosed, where the wireless device does not switch from the second downlink BWP to the fourth downlink BWP and continue performing the BFR procedure.

In an example, based on the switching from the first downlink BWP to the third downlink BWP of the first cell during the beam failure recovery procedure, the wireless device may not stop/abort the BFR procedure for the second downlink BWP of the second cell. In an example, based on the switching from the first downlink BWP to the third downlink BWP of the first cell, the wireless device may switch from the second downlink BWP to the fourth downlink BWP of the second cell. In an example, the wireless device may not stop/abort the BFR procedure for the second downlink BWP of the second cell based on the switching from the second downlink BWP to the fourth downlink BWP. In an example, the wireless device may continue performing the BFR procedure for the second downlink BWP of the second cell on the fourth downlink BWP.

In an example, the continuing performing the BFR procedure may comprise transmitting an uplink signal for the BFR procedure when the fourth downlink BWP is an active BWP of the second cell. In an example, the continuing performing the BFR procedure may comprise monitoring for a DCI (e.g., an uplink grant, triggering aperiodic CSI-RS) via the fourth downlink BWP, based on the transmitting the uplink signal (e.g., T3 in FIG. 19). In an example, the continuing performing the BFR procedure may comprise monitoring, via the fourth downlink BWP, for a beam failure recovery response (e.g., second DCI, uplink grant, downlink assignment, ACK, NACK) for the second uplink signal.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 25:
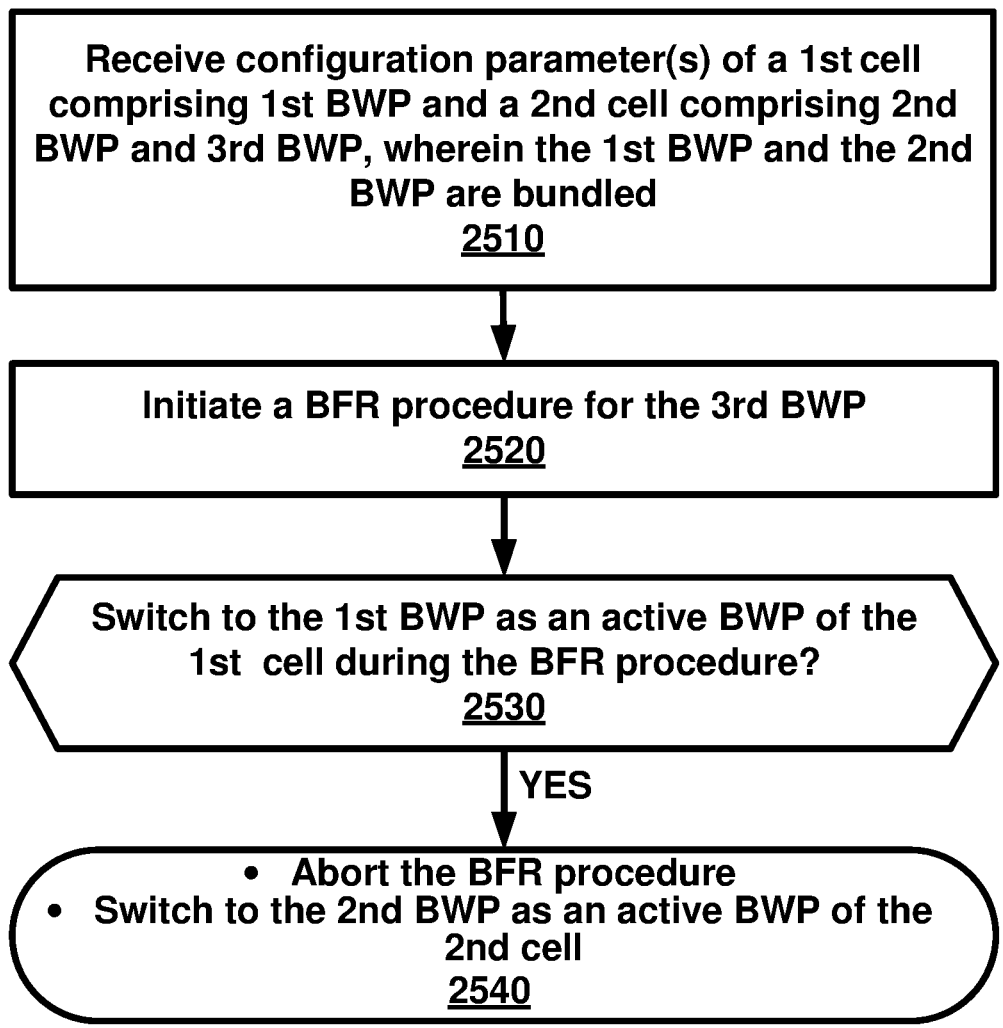
FIG. 25 is a flow diagram of an aspect of an example embodiment of the present disclosure.

FIG. 25 is a flow diagram as per an aspect of an example embodiment of the present disclosure. At 2510, a wireless device may receive one or more messages. The one or more messages may comprise one or more configuration parameters of a plurality of cells. The plurality of cells may comprise a first cell comprising a first bandwidth part (BWP). The plurality of cells may comprise a second cell comprising a second BWP and a third BWP. The first BWP and the second BWP may be bundled. At 2520, the wireless device may initiate a beam failure recovery (BFR) procedure for the third BWP. At 2530, the wireless device may switch to the first BWP as an active BWP of the first cell during the BFR procedure. At 2540, based on the switching to the first BWP, the wireless device may switch to the second BWP as an active BWP of the second cell and abort the BFR procedure.

According to an example embodiment, a wireless device may receive one or more messages. The one or more messages may comprise one or more configuration parameters of a plurality of cells. The plurality of cells may comprise a first cell comprising a first bandwidth part (BWP). The plurality of cells may comprise a second cell comprising a second BWP and a third BWP. The first BWP and the second BWP may be bundled. According to an example embodiment, the wireless device may initiate a beam failure recovery (BFR) procedure for the third BWP. According to an example embodiment, the wireless device may switch to the first BWP as an active BWP of the first cell during the BFR procedure. According to an example embodiment, based on the switching to the first BWP, the wireless device may switch to the second BWP as an active BWP of the second cell and abort the BFR procedure.

According to an example embodiment, the one or more configuration parameters may indicate the first BWP and the second BWP being bundled. According to an example embodiment, the switching to the second BWP may be further based on the first BWP and the second BWP being bundled. According to an example embodiment, the first BWP and the second BWP being bundled may comprise activating the second BWP as an active BWP of the second cell based on activating the first BWP as an active BWP of the first cell. According to an example embodiment, the first BWP and the second BWP being bundled may comprise switching to the second BWP as an active BWP of the second cell based on switching to the first BWP as an active BWP of the first cell. According to an example embodiment, the first BWP may be a default downlink BWP of the first cell. According to an example embodiment, the first BWP may be an initial downlink BWP of the first cell. According to an example embodiment, the second BWP may be a default downlink BWP of the second cell. According to an example embodiment, the second BWP may be an initial downlink BWP of the second cell. According to an example embodiment, the switching to the first BWP may be based on receiving a downlink control information indicating the first BWP. According to an example embodiment, the switching to the first BWP may be based on receiving a radio resource control message indicating the first BWP. According to an example embodiment, the switching to the first BWP may be based on an expiry of a BWP inactivity timer of the first cell. According to an example embodiment, the one or more configuration parameters may indicate a value for the BWP inactivity timer of the first cell. According to an example embodiment, the initiating the BFR procedure may be based on detecting a beam failure of the third BWP of the second cell. According to an example embodiment, the detecting the beam failure may comprise a beam failure instance counter reaching a value. According to an example embodiment, the one or more configuration parameters may indicate the value. According to an example embodiment, the wireless device may reset the beam failure instance counter based on the aborting the BFR procedure.

According to an example embodiment, the wireless device may start a beam failure recovery timer based on the initiating the BFR procedure. According to an example embodiment, the one or more configuration parameters may indicate a value for the beam failure recovery timer. According to an example embodiment, the wireless device may reset the beam failure recovery timer based on the aborting the BFR procedure.

According to an example embodiment, the first cell may further comprise a fourth BWP. According to an example embodiment, the wireless device may switch from the first BWP to the fourth BWP as an active BWP of the first cell. According to an example embodiment, the wireless device may keep the second BWP as the active BWP of the second cell based on the fourth BWP not being bundled with any BWP of the second cell.

According to an example embodiment, a wireless device may receive one or more messages. The one or more messages may comprise one or more configuration parameters of a plurality of cells. The plurality of cells may comprise a first cell and a second cell. According to an example embodiment, the wireless device may initiate a beam failure recovery (BFR) procedure for a third bandwidth part (BWP) of the second cell. According to an example embodiment, the wireless device may switch to a first BWP of the first cell as an active BWP of the first cell during the BFR procedure. According to an example embodiment, the wireless device may determine that the first BWP of the first cell is bundled to a second BWP of the second cell. According to an example embodiment, the wireless device may abort the BFR procedure based on the determining that the first BWP is bundled to the second BWP. According to an example embodiment, the wireless device may switch to the second BWP as an active BWP of the second cell based on the determining that the first BWP is bundled to the second BWP. According to an example embodiment, based on the determining that the first BWP is bundled to the second BWP. the wireless device may switch to the second BWP as an active BWP of the second cell and abort the BFR procedure.

According to an example embodiment, a wireless device may receive one or more messages. The one or more messages may comprise one or more configuration parameters of a plurality of cells. The plurality of cells may comprise a first cell and a second cell. According to an example embodiment, the wireless device may initiate a beam failure recovery (BFR) procedure for the second cell. According to an example embodiment, the wireless device may switch to a first BWP of the first cell as an active BWP of the first cell during the BFR procedure. According to an example embodiment, based on the switching to the first BWP, the wireless device may switch to a second BWP of the second cell as an active BWP of the second cell and abort the BFR procedure.

According to an example embodiment, a wireless device may receive one or more messages. The one or more messages may comprise one or more configuration parameters of a plurality of cells. The plurality of cells may comprise a first cell and a second cell. According to an example embodiment, the wireless device may initiate a beam failure recovery (BFR) procedure for the second cell. According to an example embodiment, the wireless device may switch to a first BWP of the first cell as an active BWP of the first cell. According to an example embodiment, the wireless device may determine that the switching to the first BWP occurs during the BFR procedure of the second cell. According to an example embodiment, based on the determining that the switching to the first BWP occurs during the BFR procedure, the wireless device may not switch to a second BWP of the second cell as an active BWP of the second cell in response to the switching to the first BWP and continue performing the BFR procedure.

According to an example embodiment, the first BWP of the first cell and the second BWP of the second cell may be bundled. According to an example embodiment, the one or more configuration parameters may indicate the first BWP and the second BWP being bundled. According to an example embodiment, the first BWP and the second BWP being bundled may comprise activating the second BWP as an active BWP of the second cell based on activating the first BWP as an active BWP of the first cell.

According to an example embodiment, the initiating the BFR procedure for the second cell may comprise initiating the BFR procedure for a third BWP of the second cell. According to an example embodiment, the continuing performing the BFR procedure may comprise continuing performing the BFR procedure via the third BWP of the second cell.

According to an example embodiment, a wireless device may receive one or more messages. The one or more messages may comprise one or more configuration parameters of a plurality of cells. The plurality of cells may comprise a first cell and a second cell. According to an example embodiment, the wireless device may initiate a beam failure recovery (BFR) procedure for the second cell. According to an example embodiment, the wireless device may switch to a first BWP of the first cell as an active BWP of the first cell. According to an example embodiment, the wireless device may determine that the switching to the first BWP occurs during the BFR procedure of the second cell. According to an example embodiment, based on the determining that the switching to the first BWP occurs during the BFR procedure, the wireless device may switch to a second BWP of the second cell as an active BWP of the second cell in response to the switching to the first BWP and continue performing the BFR procedure via the second BWP.

According to an example embodiment, the initiating the BFR procedure for the second cell may comprise initiating the BFR procedure for a third BWP of the second cell. According to an example embodiment, the continuing performing the BFR procedure may comprise continuing performing the BFR procedure of the third BWP.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, one or more messages comprising one or more configuration parameters of a plurality of cells comprising:
      a first cell comprising a first bandwidth part (BWP); and
      a second cell comprising a second BWP and a third BWP, wherein the first BWP and the second BWP are bundled;
   initiating a beam failure recovery (BFR) procedure for the third BWP;
   switching to the first BWP as an active BWP of the first cell during the BFR procedure; and
   based on the switching:
      aborting the BFR procedure; and
      switching to the second BWP as an active BWP of the second cell.

2. The method of claim 1, wherein the one or more configuration parameters indicate the first BWP and the second BWP being bundled.

3. The method of claim 1, wherein the switching to the second BWP is further based on the first BWP and the second BWP being bundled.

4. The method of claim 1, wherein the first BWP and the second BWP being bundled comprises activating the second BWP as an active BWP of the second cell based on activating the first BWP as an active BWP of the first cell.

5. The method of claim 1, wherein the initiating the BFR procedure is based on detecting a beam failure of the third BWP of the second cell.

6. The method of claim 5, wherein the detecting the beam failure comprises a beam failure instance counter reaching a value.

7. The method of claim 6, further comprising starting a BFR timer based on the initiating the BFR procedure.

8. The method of claim 7, further comprising resetting, based on the aborting the BFR procedure, at least one of the beam failure instance counter and the BFR timer.

9. The method of claim 1, further comprising:
switching from the first BWP to a fourth BWP as an active BWP of the first cell; and
keeping the second BWP as the active BWP of the second cell based on the fourth BWP not being bundled with any BWP of the second cell.

10. The method of claim 1, wherein the switching to the first BWP is based on an expiry of a BWP inactivity timer of the first cell.

11. A wireless device comprising:
one or more processors; and
memory storing instructions that, when executed by the one or more processors, cause the wireless device to:
 receive one or more messages comprising one or more configuration parameters of a plurality of cells comprising:
  a first cell comprising a first bandwidth part (BWP); and
  a second cell comprising a second BWP and a third BWP, wherein the first BWP and the second BWP are bundled;
 initiate a beam failure recovery (BFR) procedure for the third BWP;
 switch to the first BWP as an active BWP of the first cell during the BFR procedure; and
 based on the switching:
  abort the BFR procedure; and
  switch to the second BWP as an active BWP of the second cell.

12. The wireless device of claim 11, wherein the one or more configuration parameters indicate the first BWP and the second BWP being bundled.

13. The wireless device of claim 11, wherein the switching to the second BWP is further based on the first BWP and the second BWP being bundled.

14. The wireless device of claim 11, wherein the first BWP and the second BWP being bundled comprises activation of the second BWP as an active BWP of the second cell based on activation of the first BWP as an active BWP of the first cell.

15. The wireless device of claim 11, wherein the initiation of the BFR procedure is based on detection of a beam failure of the third BWP of the second cell.

16. The wireless device of claim 15, wherein the detection of the beam failure comprises a beam failure instance counter reaching a value.

17. The wireless device of claim 16, wherein the instructions, when executed by the one or more processors, further cause the wireless device to start a BFR timer based on the initiation of the BFR procedure.

18. The wireless device of claim 17, wherein the instructions, when executed by the one or more processors, further cause the wireless device to reset, based on the abortion the BFR procedure, at least one of the beam failure instance counter and the BFR timer.

19. The wireless device of claim 11, wherein the instructions, when executed by the one or more processors, further cause the wireless device to:
switch from the first BWP to a fourth BWP as an active BWP of the first cell; and
keep the second BWP as the active BWP of the second cell based on the fourth BWP not being bundled with any BWP of the second cell.

20. A system comprising:
a base station; and
a wireless device comprising:
 one or more processors; and
 memory storing instructions that, when executed by the one or more processors, cause the wireless device to:
  receive, from the base station, one or more messages comprising one or more configuration parameters of a plurality of cells comprising:
   a first cell comprising a first bandwidth part (BWP); and
   a second cell comprising a second BWP and a third BWP, wherein the first BWP and the second BWP are bundled;
  initiate a beam failure recovery (BFR) procedure for the third BWP;
  switch to the first BWP as an active BWP of the first cell during the BFR procedure; and
  based on the switching:
   abort the BFR procedure; and
   switch to the second BWP as an active BWP of the second cell.

* * * * *